US008960835B2

(12) United States Patent
Yamazaki et al.

(10) Patent No.: US 8,960,835 B2
(45) Date of Patent: Feb. 24, 2015

(54) IMAGE FORMING APPARATUS, PATTERN POSITION DETERMINING METHOD, AND IMAGE FORMING SYSTEM

(75) Inventors: Atsushi Yamazaki, Saitama (JP); Tatsuhiko Okada, Saitama (JP); Mamoru Yorimoto, Kanagawa (JP); Daisaku Horikawa, Saitama (JP); Makoto Moriwaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 104 days.

(21) Appl. No.: 13/558,627

(22) Filed: Jul. 26, 2012

(65) Prior Publication Data
US 2013/0027457 A1 Jan. 31, 2013

(30) Foreign Application Priority Data

Jul. 29, 2011 (JP) .................................. 2011-167769
Jun. 11, 2012 (JP) .................................. 2012-131994

(51) Int. Cl.
*B41J 29/38* (2006.01)
*H04N 1/047* (2006.01)
(52) U.S. Cl.
CPC ................. *B41J 29/38* (2013.01); *H04N 1/047* (2013.01); *H04N 2201/0471* (2013.01); *H04N 2201/04767* (2013.01)
USPC .................... 347/14; 347/9; 347/19
(58) Field of Classification Search
CPC ...................................................... B41J 29/38
See application file for complete search history.

(56) References Cited

U.S. PATENT DOCUMENTS

| 7,771,001 | B2* | 8/2010 | Miyamoto | 347/19 |
| 7,992,953 | B2 | 8/2011 | Yorimoto et al. | |
| 2007/0091130 | A1* | 4/2007 | Endo | 347/9 |
| 2008/0225066 | A1* | 9/2008 | Yorimoto et al. | 347/14 |
| 2009/0115809 | A1* | 5/2009 | Endo | 347/14 |
| 2009/0184993 | A1* | 7/2009 | Yorimoto et al. | 347/14 |
| 2010/0214606 | A1* | 8/2010 | Kato | 358/1.15 |

FOREIGN PATENT DOCUMENTS

| JP | 2001-129980 | 5/2001 |
| JP | 2005-148299 | 6/2005 |
| JP | 2008-229915 | 10/2008 |

* cited by examiner

*Primary Examiner* — Manish S Shah
*Assistant Examiner* — Jeremy Delozier
(74) *Attorney, Agent, or Firm* — IPUSA, PLLC

(57) ABSTRACT

A disclosed image forming apparatus includes a reading unit including a light emitting element for emitting light to a record medium, and a light receiving element for receiving reflected light; a print data storing unit storing print data of a uniform pattern which has a color different from a color of the test pattern and is provided in an area including the test pattern, a pattern forming unit printing the test pattern on the uniform pattern after the uniform pattern is printed, a relatively moving unit moving the record medium or the reading unit relatively at a constant speed, a first detection data obtaining unit obtaining first detection data received as the reflection light while the light moves and impinges on the test pattern, and a position detecting unit providing a calculation for determining a position of a line of the test pattern to detect the test pattern.

7 Claims, 41 Drawing Sheets

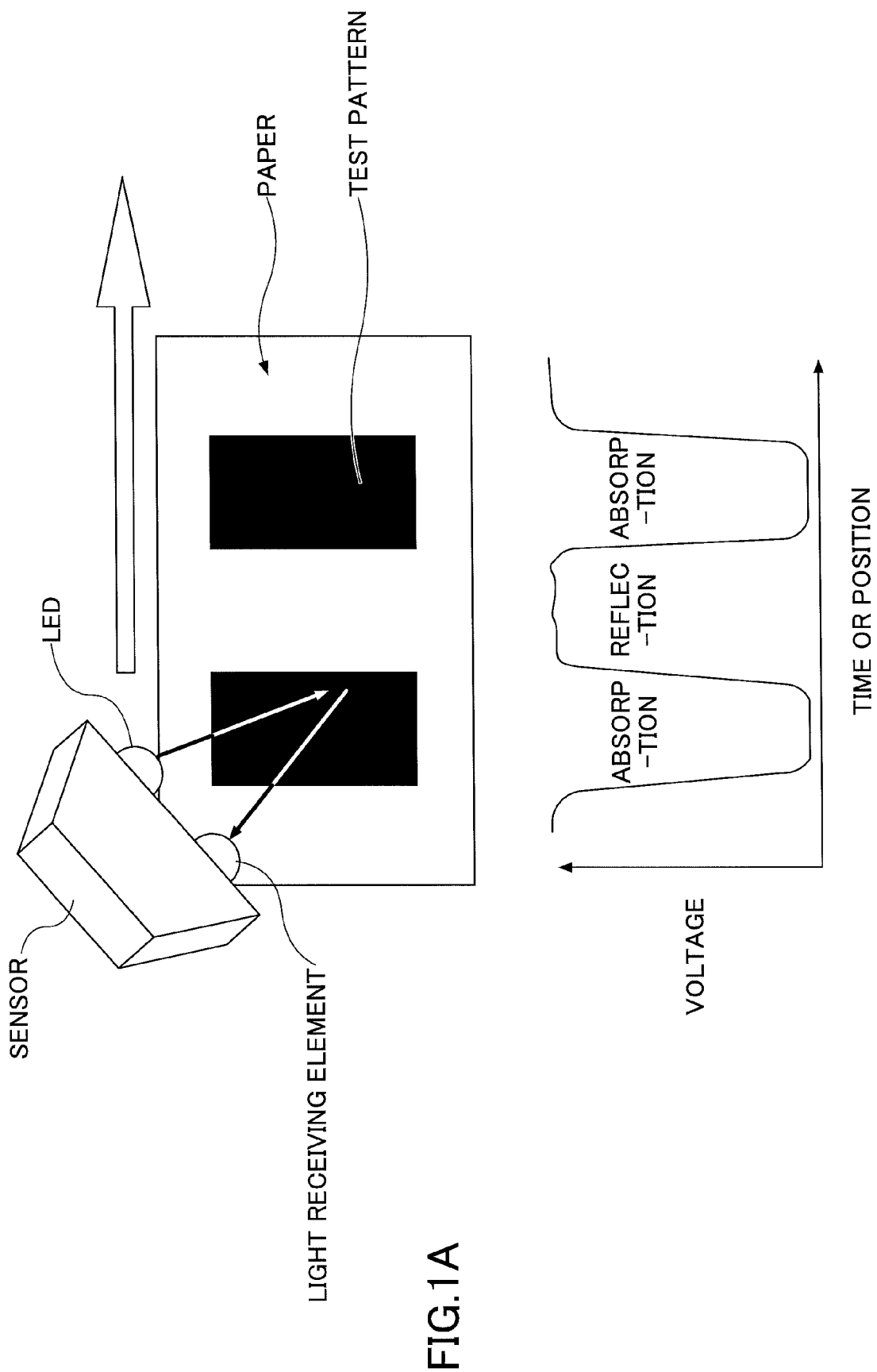

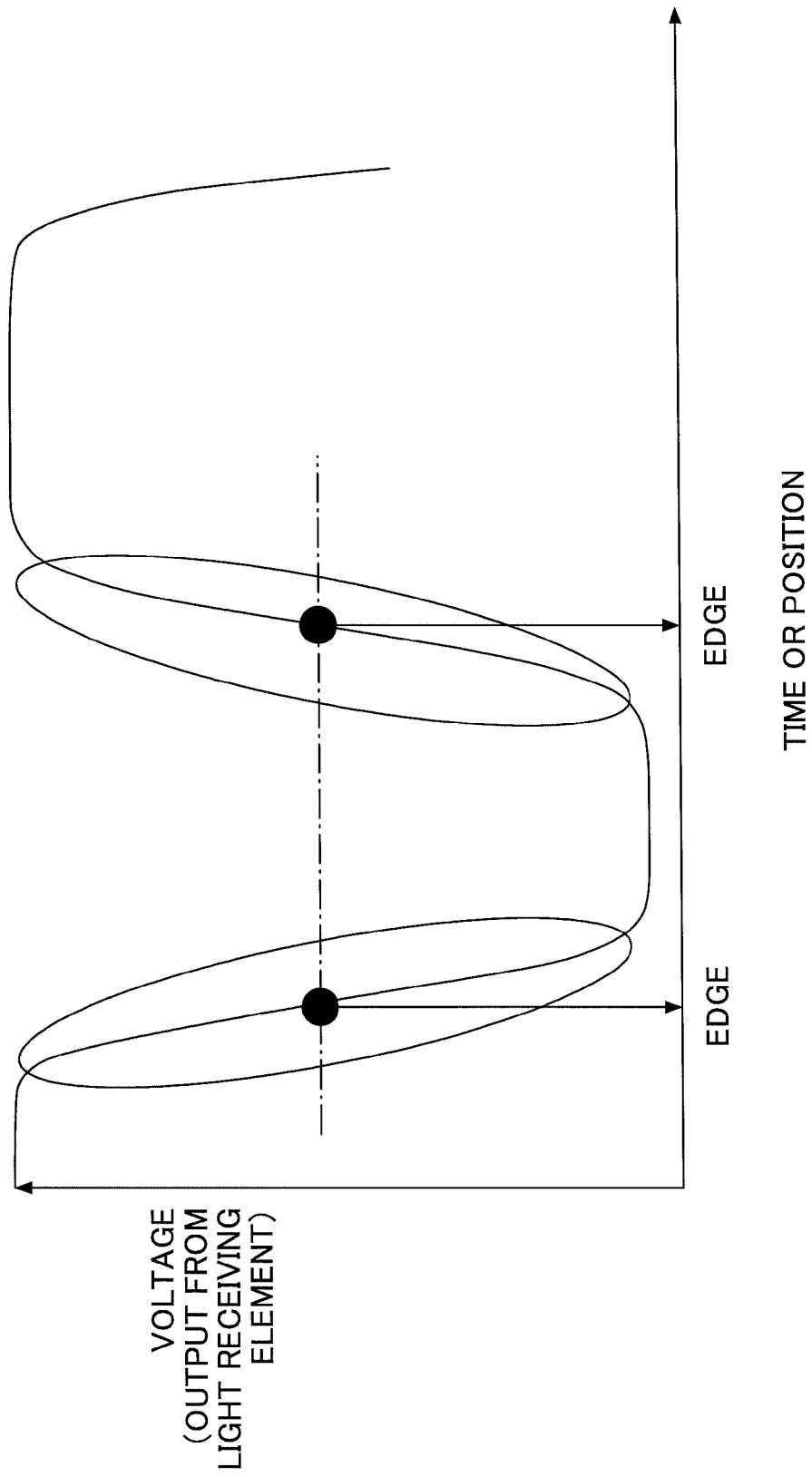

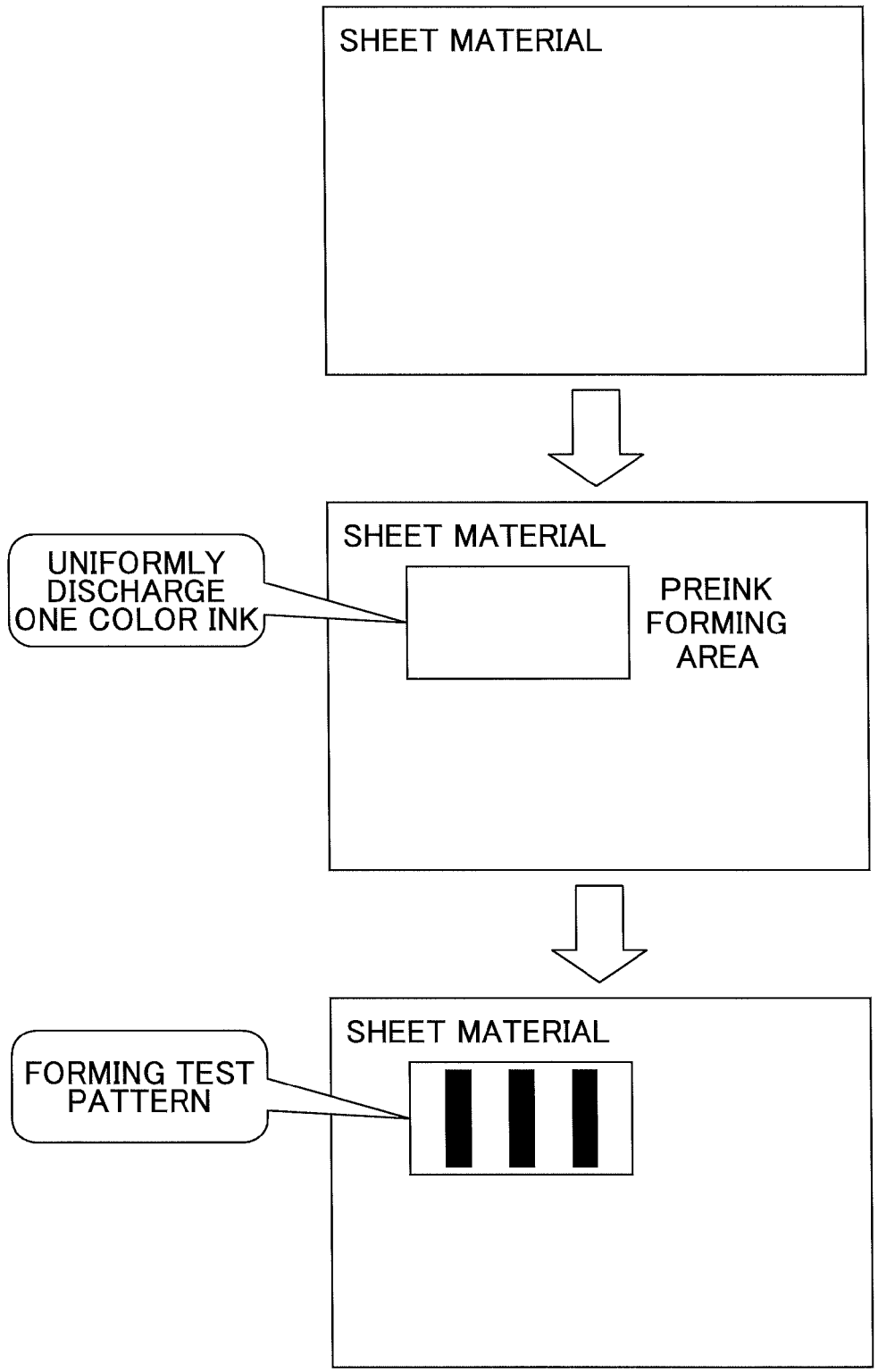

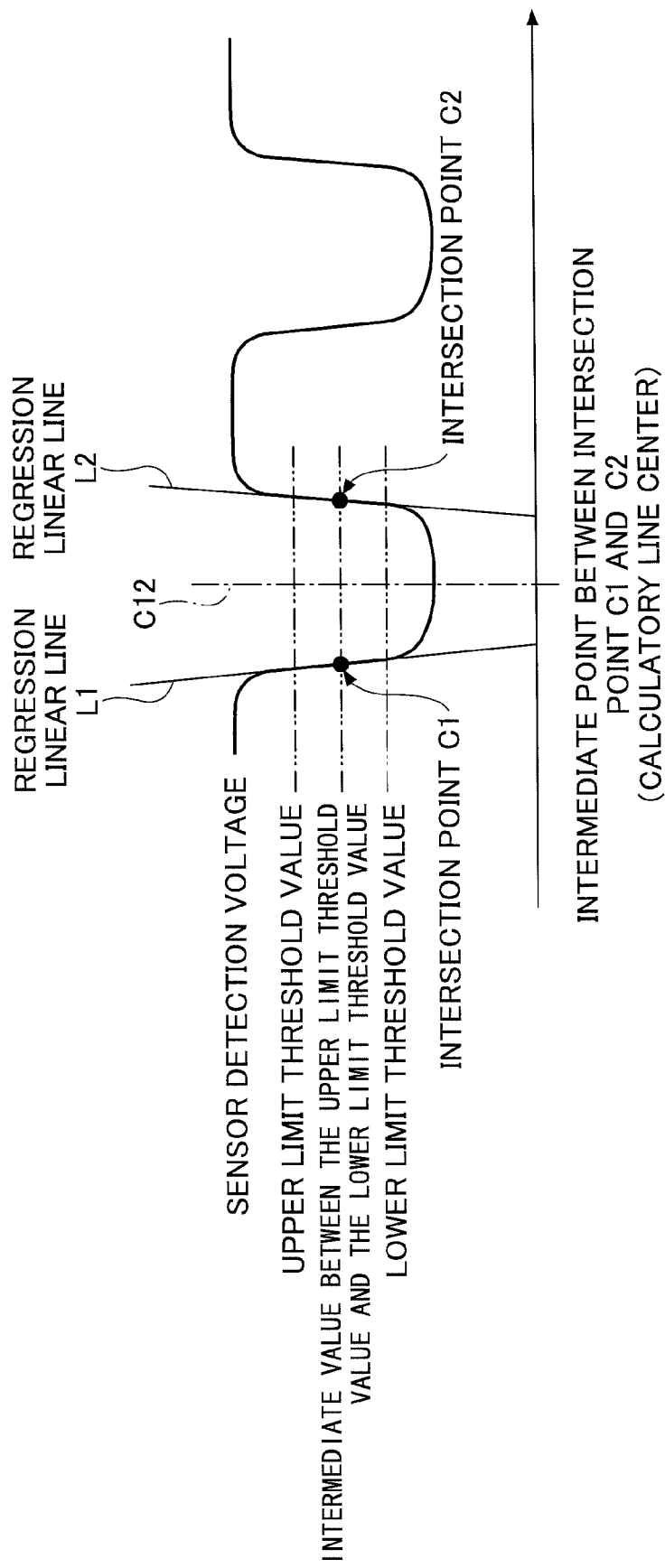

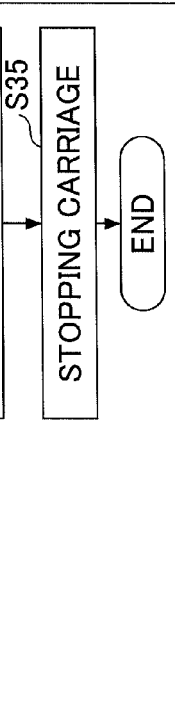
FIG.20A
FIG.20B
FIG.20C

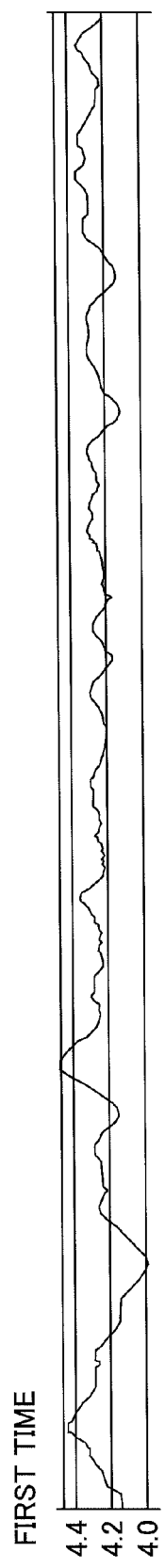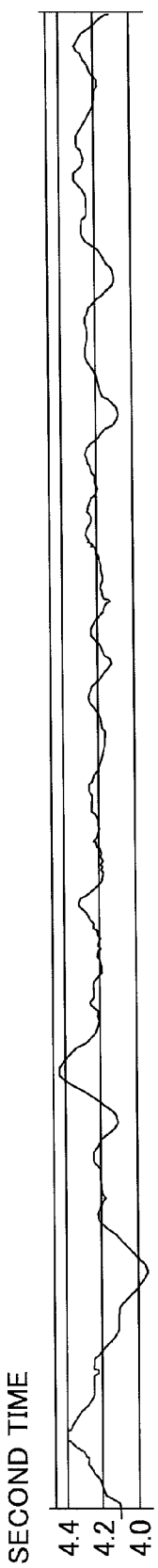

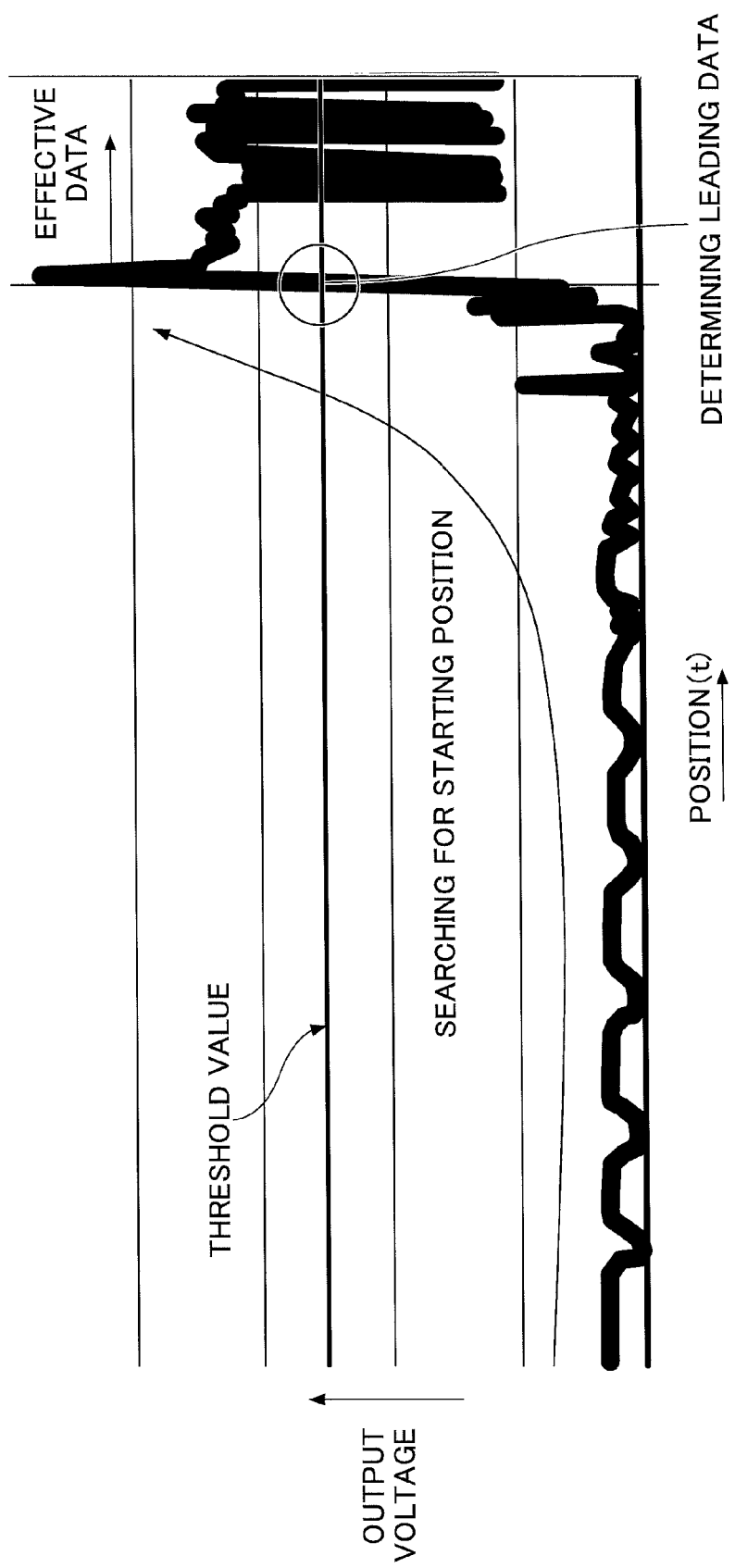

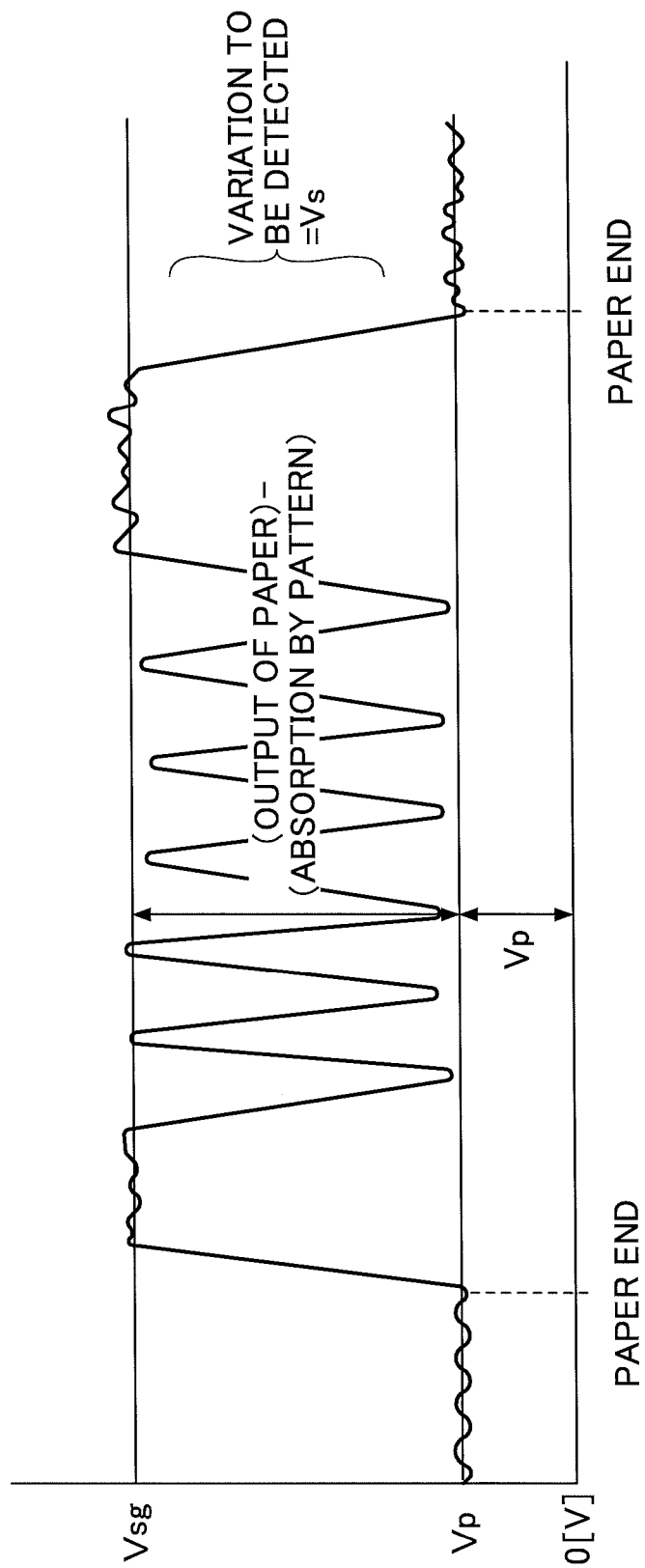

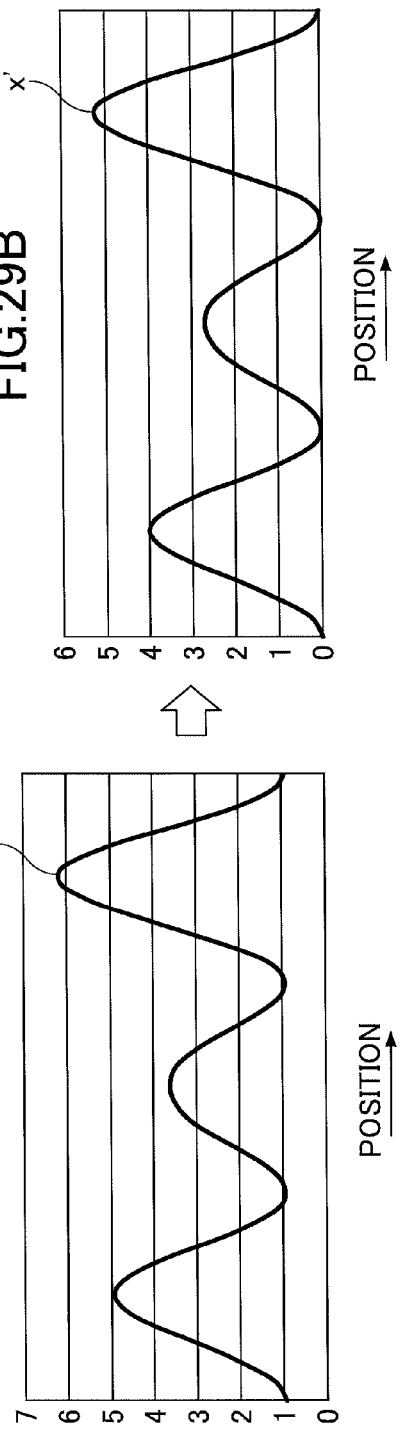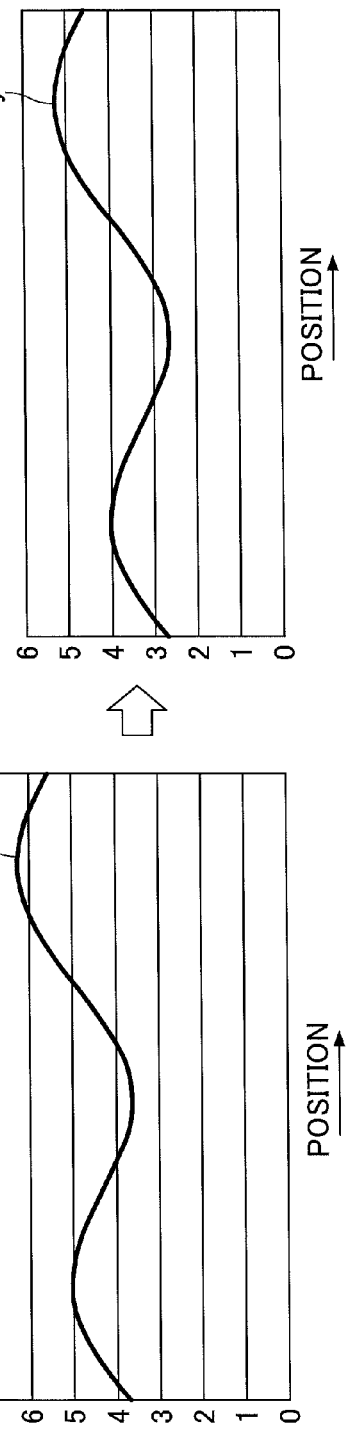

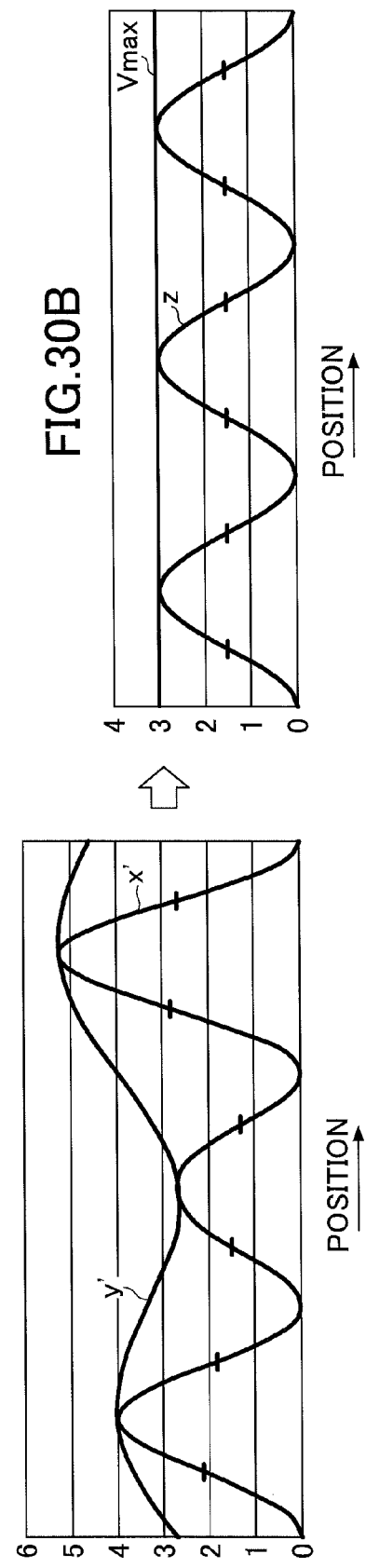

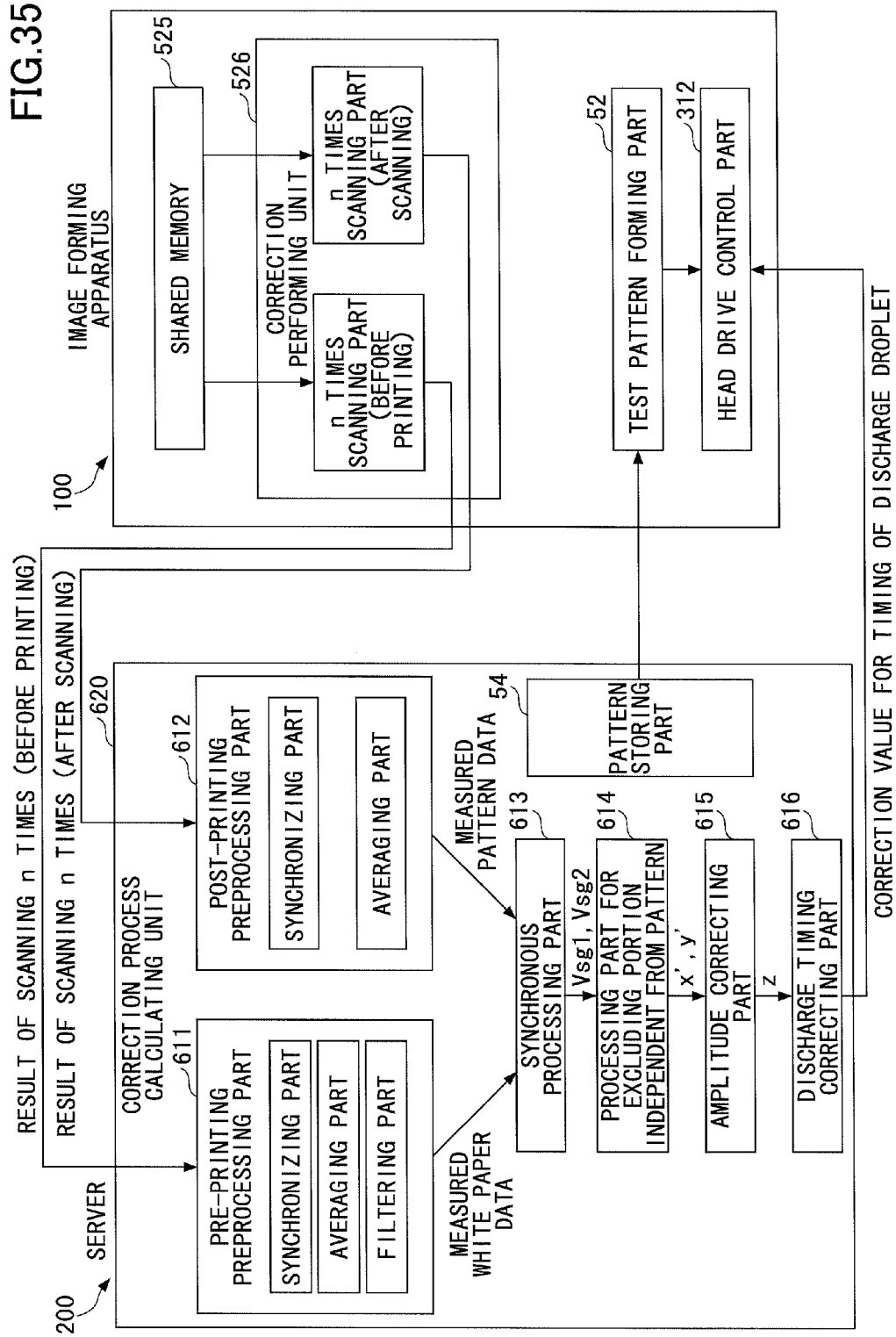

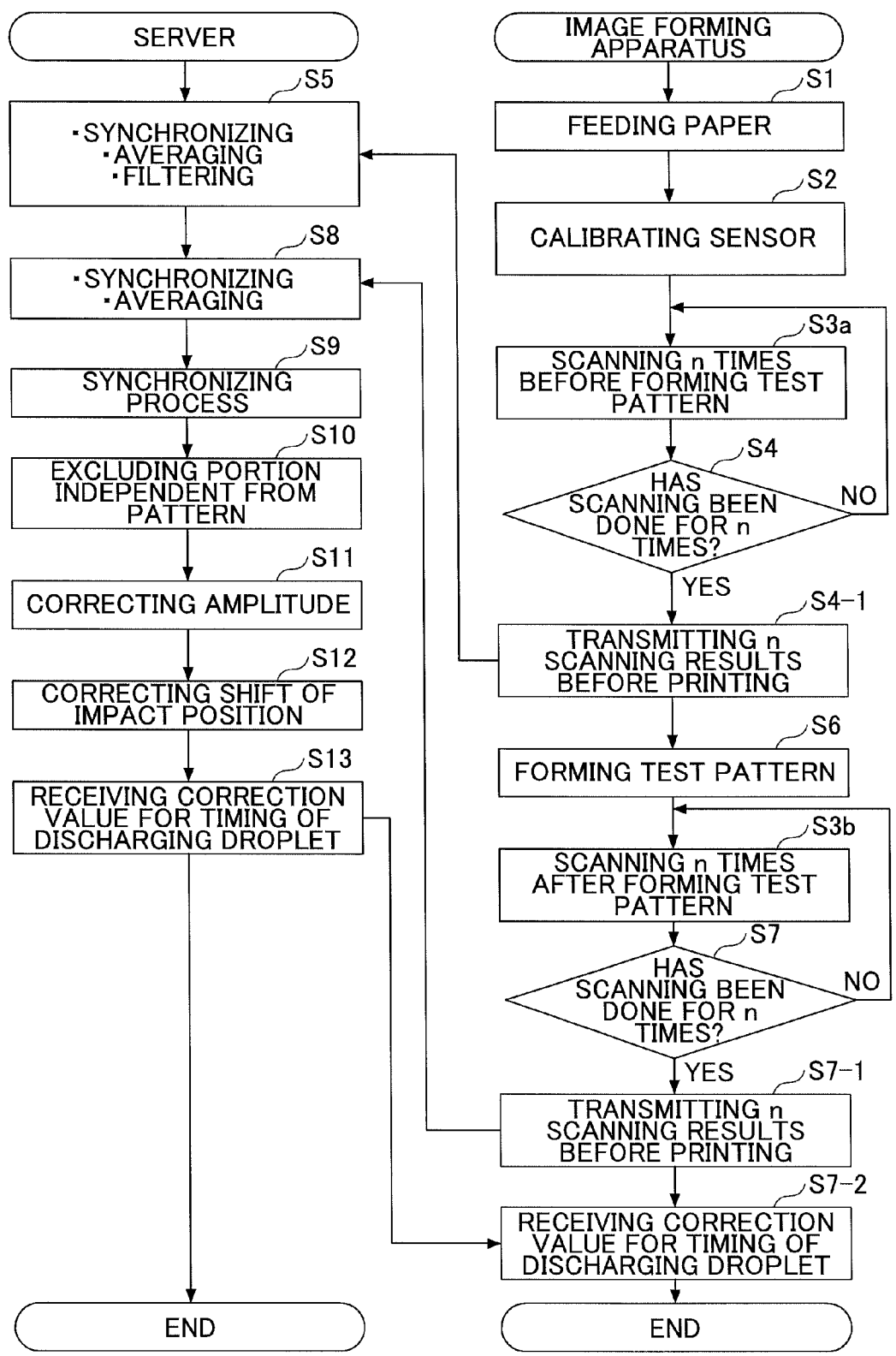

IMAGE FORMING APPARATUS, PATTERN POSITION DETERMINING METHOD, AND IMAGE FORMING SYSTEM

BACKGROUND OF THE INVENTION

1. Field of the Invention

The present invention generally relates to an image forming apparatus, a pattern position determining method, and an image forming system which reads a test pattern formed in a record medium and adjusts a timing of discharging droplets.

2. Description of the Related Art

Patent Document 1 discloses an image forming apparatus including a pattern forming section that forms on a water-repellent member, a reference pattern having plural independent liquid droplets and a pattern to be measured having plural independent liquid droplets ejected under an ejection condition different from that of the reference pattern so as to be arranged parallel to a scanning direction of a recording head, a scanning section composed of a light emitting section that emits light to the patterns and a light receiving section that receives regular reflection light from the patterns, and a correcting section that measures a distance between the patterns based on a scanned result of the scanning section and corrects liquid droplet ejection timing of the recording head based on the measured distance.

Patent Document 1: Japanese Laid-Open Patent Application No. 2008-229915

SUMMARY OF THE INVENTION

Accordingly, embodiments of the present invention provide a novel and useful image forming apparatus, a pattern position determining method, and an image forming system solving one or more of the problems discussed above.

One aspect of the embodiments of the present invention may be to provide an image forming apparatus that reads a test pattern which includes a line and is formed on a record medium and adjusts a discharge timing of a droplet, including a reading unit including a light emitting element for emitting light to the record medium, and a light receiving element for receiving reflected light reflected on the record medium; a print data storing unit configured to store print data of a uniform pattern which has a color different from a color of the test pattern and is provided in an area including the test pattern; a pattern forming unit configured to print the test pattern on the uniform pattern after the uniform pattern is printed on the record medium; a relatively moving unit configured to move the record medium or the reading unit relatively at a constant speed; a first detection data obtaining unit configured to obtain first detection data received as the reflection light by the light receiving element while the light moves and impinges on the test pattern; and a position detecting unit configured to provide a calculation for determining a position of the line to detect a position of the test pattern.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 1A schematically illustrates a light receiving element for reading a test pattern;

FIG. 1B is a graph for illustrating an output of the light receiving element;

FIG. 3 schematically illustrates a test pattern used by an image forming apparatus;

FIGS. 13A and 13B schematically illustrate a process of specifying an edge position of the test pattern;

FIGS. 20A through 20C are flowcharts illustrating an exemplary procedure of correcting a signal by a correction performing unit;

FIGS. 23A and 23B illustrate exemplary n times scanning measurement result;

FIG. 24 illustrates synchronous processing;

FIG. 28 illustrates Vsg and Vp;

FIGS. 29A and 29B are exemplary output waveforms of measured pattern data;

FIGS. 29C and 29D are exemplary output waveforms of measured white paper data;

FIGS. 30A and 30B schematically illustrate data to be calculated z obtained from x' and y';

FIG. 35 is an exemplary functional block diagram of the image forming system; and FIG. 36 is an exemplary flow chart illustrating an operation procedure of the image forming system.

DETAILED DESCRIPTION OF THE PREFERRED EMBODIMENTS

Figure 2A:
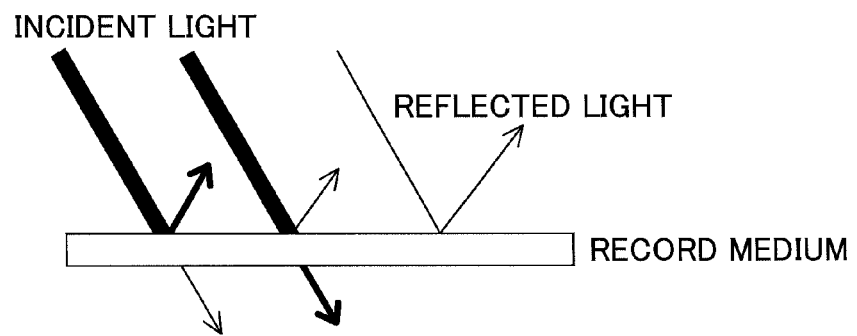
FIGS. 2A to 2C illustrate incident light and reflected light on exemplary record media.

There is an image forming apparatus which forms an image by discharging droplets on a sheet material such as a paper. Hereinafter, this image forming apparatus is referred to as an image forming apparatus of a liquid discharging type. The image forming apparatus can be classified into a serial type and a line head type. The image forming apparatus of the serial type forms an image on an entire paper when a recording head reciprocates in a main scanning direction, which is perpendicular to a paper feeding direction, while papers are fed in the paper feeding direction. The image forming apparatus of the line head type has nozzles arranged substantially along the maximum paper width. The nozzles in the line head forms an image by discharging droplets at a timing of discharging the droplets after a paper is fed.

However, in a case where a ruled line is printed by the image forming apparatus of the serial type in two directions of one and the opposite directions, the ruled line may shift between the one direction and the opposite direction. Further, in an image forming apparatus using plural heads, the impact position of ink may shift due to differences of distances among plural heads. In an image forming apparatus of the line head type, parallel lines may appear in the paper feeding direction if there is a nozzle constantly causing a shift in an impact position of ink due to a processing accuracy of the nozzle or an installation error of the nozzle.

Therefore, in an image forming apparatus of a liquid discharging type, a test pattern for automatically adjusting impact positions of droplets may be printed on a sheet material. The test pattern may be optically read so as to be used for adjusting a timing for discharging the droplets.

However, this correction method for the timing of discharging the droplets may cause the following problems.

FIG. 1A schematically illustrates a light receiving element for reading a test pattern. If a spotting light emitted from a LED impinges on the test pattern and is reflected by the test pattern as illustrated by arrows so as to scan the test pattern, a reflected light having intensity corresponding to the density of the test pattern on a scanned position may be detected by the light receiving element. Since light is well absorbed by a black color, if a sheet material is white and the test pattern is black, the spotting light impinging on the test pattern may not be easily reflected by the test pattern. By expressing the reflected light received by the light receiving element, a voltage from the light receiving element when the spotting light impinges on the test pattern is much smaller than a voltage from the light receiving element when the spotting light impinges on the sheet material except for the test pattern as illustrated in FIG. 1A.

FIG. 1B is an enlarged view of the voltage for showing a change of the voltage. The abscissa represents a scanning position of the spotting light in proportion to a scanning time. Ellipses in FIG. 1B indicate regions where the voltage abruptly changes. It is assumed that edges of the test pattern on the seat material reside in these regions. For example, it may be determined that a center of the spotting light scans the edge of the test pattern when the voltage value is a center value between the local maximum value and the local minimum value. Therefore, if the voltage value is, for example, the center value of the amplitude of the voltage, the image forming apparatus determines that the edge of the test pattern is positioned at the scanning position and specifies the position of the test pattern.

However, if the sheet material has a low reflectance (a high transmittance) like tracing paper, the output voltage of the light receiving element may not stabilize. Therefore, the edge position may not be accurately specified.

FIG. 2A illustrates an example that a record medium has a low reflectance (a high transmittance). When the transmittance of the record medium is high, incident light partly transmits through the record medium and the incident light partly reflects on the record medium. Therefore, the reflectance is apt to vary.

Figure 2B:
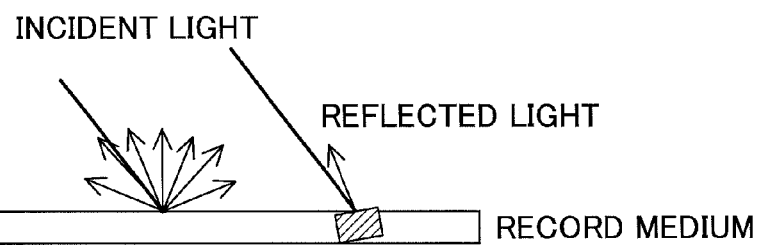

Referring to FIG. 2B, an exemplary crystal structure of the record medium is schematically illustrated. In a case where the record medium has the crystal structure, specific directionality is observed in a direction of reflected light. Therefore, the output voltage of the light receiving element is not easily stabilized to thereby prevent the edge position from being accurately specified.

Figure 2C:
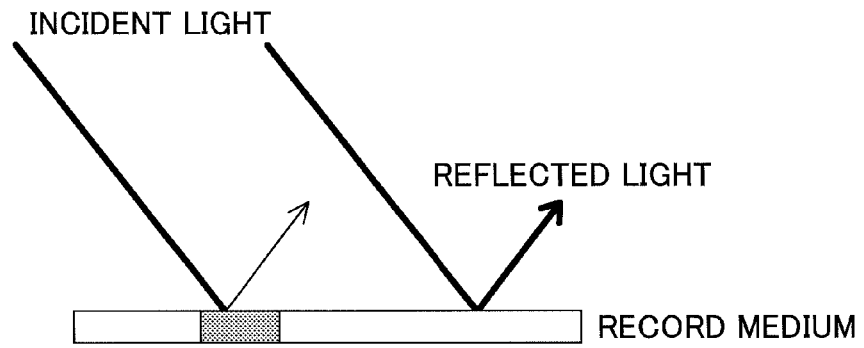

Referring to FIG. 2C, an exemplary crystal structure of the record medium is schematically illustrated. If there is color variability in the record medium, light absorbability partly varies to thereby cause variation in the reflectance. Then, the output voltage of the light receiving element does not easily stabilize. Thus, the output voltage of the light receiving element may not be easily stabilized to thereby prevent the edge position from being accurately specified.

Further, in a case where the sheet material has a high ratio of reflecting light in specular reflection like a film or an OHP sheet, light can be diffused by a diffuse structure formed in the sheet material as illustrated by the left arrow in FIG. 2C and reflected. If this diffused and reflected light is detected, a sufficient input into the light receiving element may not be obtainable because the diffused and reflected light is weak. Therefore, the output voltage of the light receiving element may not be sufficient. Meanwhile, if specular reflection is used to detect the seat material, the specular reflection may be too strong to exceed an allowable detection range of the sensor. Then, the edge position may not be accurately specified.

Said differently, there may be cases where the output voltage of the light receiving element is insufficient. If the output is not stabilized or is too large or too small, the accuracy of specifying the edge position of the test pattern (the line) may be lowered. Then, an accuracy of adjusting the timing of discharging droplets is degraded.

The object of embodiments of the present invention is to provide an image forming apparatus, a pattern position determining method, and an image forming system which reads a test pattern formed in a record medium and adjusts a timing of discharging droplets while restricting an influence caused by properties of a sheet material of the record medium and accurately specifying the position of the test pattern.

A description is given below, with reference to the FIG. 3 through FIG. 36 of embodiments of the present invention.

Where the same reference symbols are attached to the same parts, repeated description of the parts is omitted.

REFERENCE SYMBOLS TYPICALLY DESIGNATE AS FOLLOWS

1: guide rod;
2: sub guide;
5: carriage;
7: driving pulley;
8: main scanning motor;
9: timing belt;
21-24: recording head;
30: print position shift sensor;
41: encoder sheet;
42: encoder sensor;
100: image forming apparatus;
200: server;
301: CPU;
310: main control unit;
312: head drive control part;
313: main scanning drive part;
314: sub scanning drive part;
402: light emitting element;
403: light receiving element;
500: image forming system;
525: shared memory;
526: correction performing unit;
611: pre-printing preprocessing part;
612: post-printing preprocessing part;
613: synchronous processing part;
614: processing part for excluding portion independent from pattern;
615: amplitude correcting part; and
616: discharge timing correcting part.
First Embodiment FIG. 3 schematically illustrates a test pattern which is formed on a record medium and used by an image forming apparatus of a first embodiment. Referring to FIG. 3, the record medium may be made of a sheet material of which reflection intensity is unstable. A pattern position determining method of the first embodiment is applicable to this sheet material and also to a paper or the like of which reflection intensity is relatively stable.

The image forming apparatus forms a uniform pattern using ink of suppressing variation of light reflectance on an area including an entire test pattern forming position of the sheet material. Hereinafter, this area is referred to as a "pre-ink forming area". The ink of suppressing the reflectance of light may be white ink. However, the color is not limited to white as long as good reflectance is obtainable.

The image forming apparatus forms the test pattern on the pre-ink forming area on which the uniform pattern is formed. Since variation of the reflectance of the pre-ink forming area is restricted, an inflection point of an output voltage between the pre-ink forming area and the test pattern can become stably detectable. Therefore, it is prospected that the inflexion point is detected inside a threshold region (described below). Therefore, the image forming apparatus can be accurately determine the position of the test pattern even when the test pattern is printed on the record medium of which light reflectance is variable. Thus, a discharge timing of the droplets can be accurately adjusted.
[Example of Structure]

Figure 4:
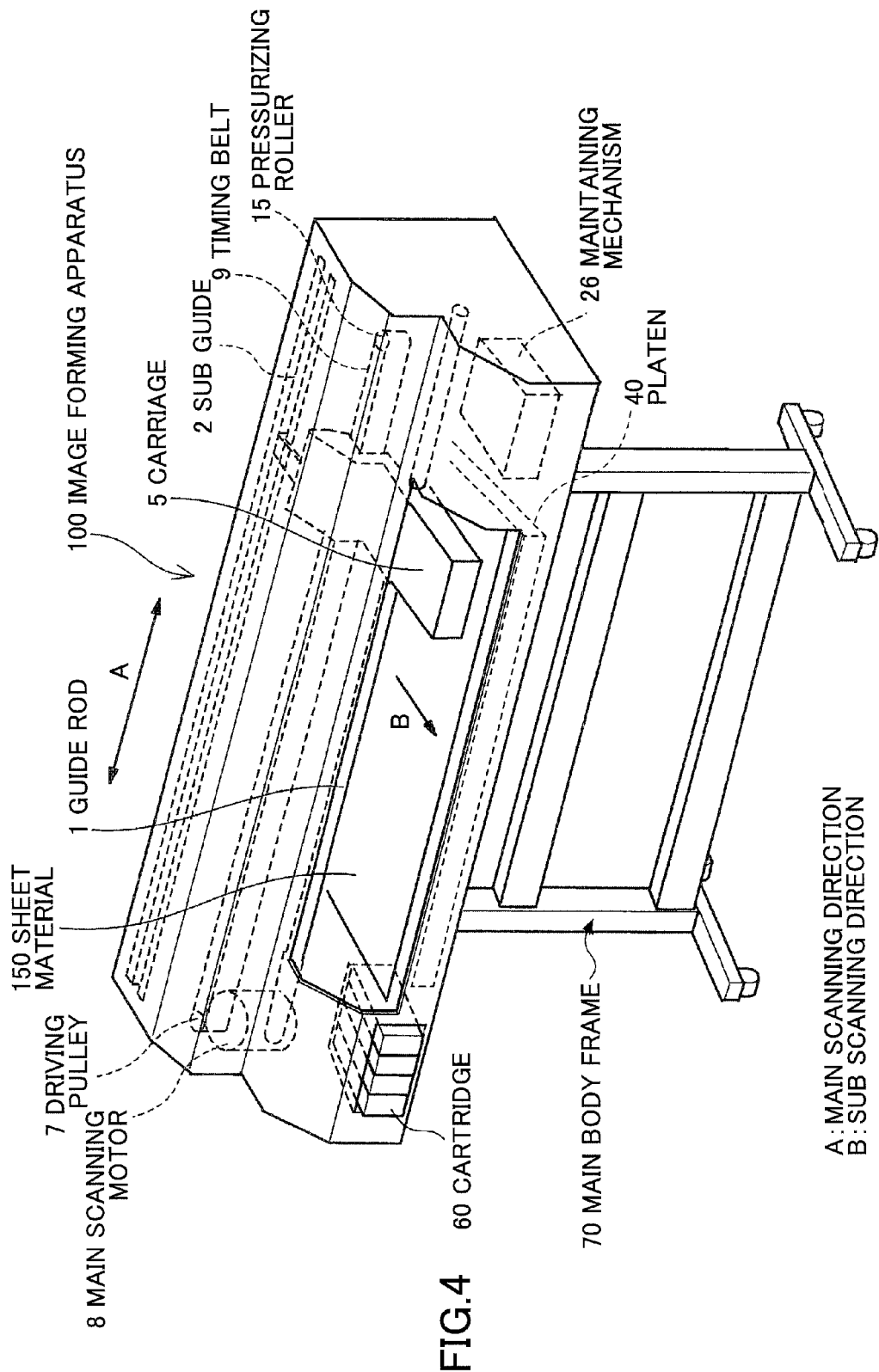
FIG. 4 schematically illustrates a perspective view of an image forming apparatus of a serial type.

FIG. 4 illustrates an exemplary entire structure of an image forming apparatus 100 of a serial type. The image forming apparatus 100 is supported by a main body frame 70. A guide rod 1 and a sub guide 2 extend in a longitudinal direction of the image forming apparatus 100. A carriage 5 is held by the guide rod 1 and the sub guide 2 so that the carriage 5 reciprocates in a direction A.

A timing belt 9 is an endless belt. The timing belt 9 is laid (stretched) across in a tensioned condition between a driving pulley 7 and a pressurizing roller 15. A part of the timing belt 9 is fixed to the carriage 5. The driving pulley 7 is rotated by a main scanning motor 8. By the rotation, the timing belt 9 moves in the main scanning direction to reciprocate the carriage in response to the movement of the timing belt. The timing belt 9 is applied with tensile force by a pressurizing roller 15 to enable the timing belt 9 to drive the carriage 5 without sag in the timing belt 9.

Further, the image forming apparatus 100 includes a maintaining mechanism 26 for maintaining and cleaning a cartridge 60 and a recording head to.

The sheet material 150 is intermittently fed on a platen 40 below the carriage 5 in a direction B (i.e., a sub scanning direction) by a roller (not illustrated). The sheet material 150 of the record medium may be any as long as droplets can adhere to it. The sheet material is, for example, a plain paper, a glossy paper, a film, an electronic substrate or the like. At every feeding position of the sheet material 150, the carriage 5 moves in the main scanning direction and the recording head installed in the carriage 5 discharges droplets. After the droplets are discharged by the recording head, the sheet material 150 is fed again. Then, droplets are discharged while the carriage 5 is moved in the main scanning direction. By repeatedly feeding the sheet material and discharging the droplets, an image is formed on an entire surface of the sheet material 150.

Figure 5:
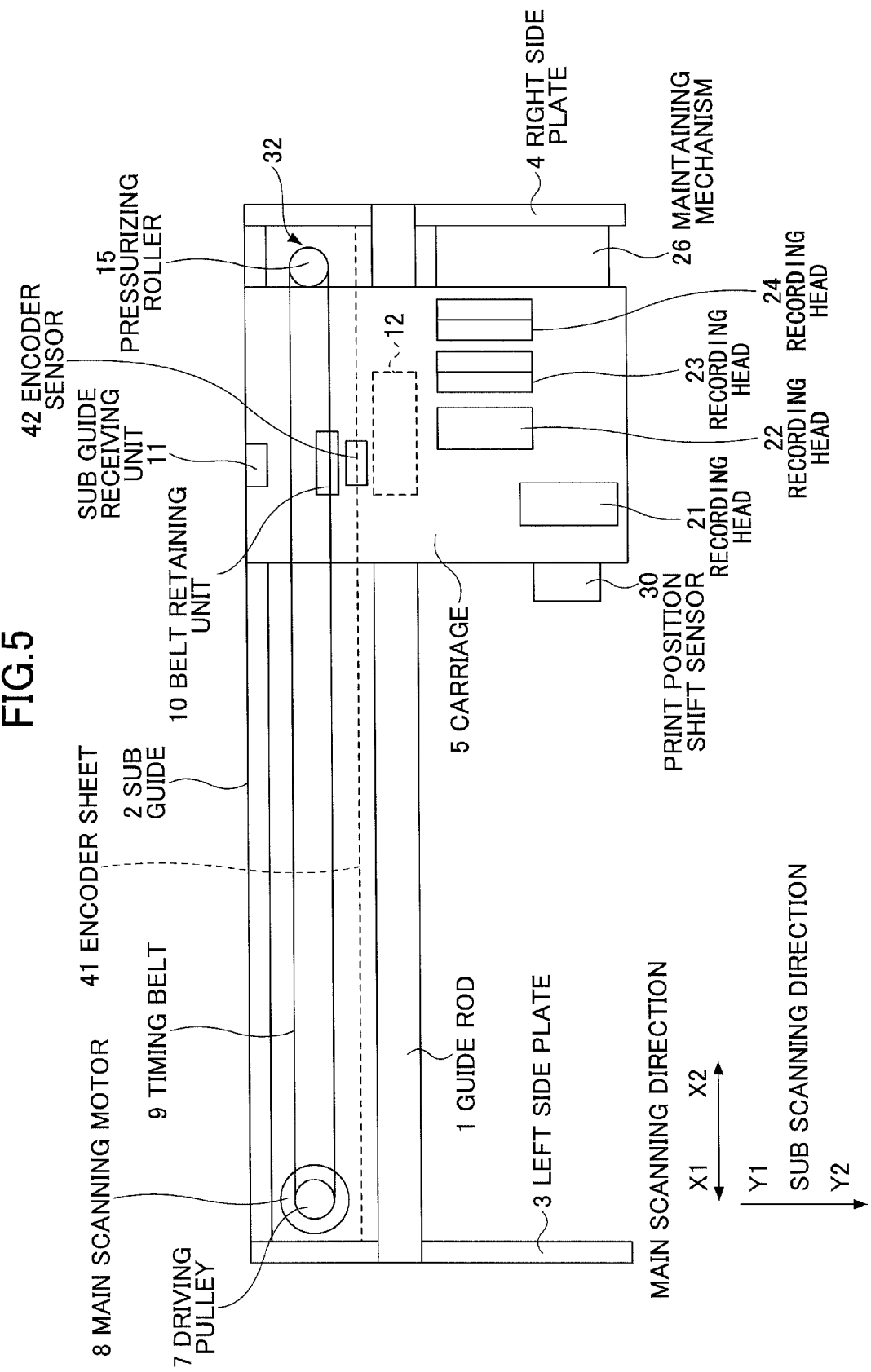
FIG. 5 illustrates an exemplary detailed operation of a carriage.

FIG. 5 illustrates an exemplary detailed operation of the carriage 5. The guide rod 1 and the sub guide 2 bridge between a left side plate 3 and a right side plate 4. The carriage 5 is held by a bearing 12 and a sub guide receiving unit 11 so that the carriage 5 can slide on the guide rod 1 and the sub guide 2 in directions of arrows X1 and X2 (a main scanning direction).

The carriage 5 has recording heads 21 and 22 for discharging ink droplets of black (K) and recording heads 23, 24, . . . for discharging ink droplets of various colors such as cyan (C), magenta (M), and yellow (Y). The recording head 21 is additionally provided since black is frequently used. However, the recording head 21 may be omitted.

The recording heads 21 to 24 may be of a piezo type, a thermal type, or an electrostatic type. In the piezo type, a piezoelectric element as an actuator unit is used to generate a pressure for pressurizing ink inside an ink flow path and ink droplets are discharged by deforming vibrating plate forming the ink flow path to change a capacity inside the ink flow path.

In the thermal type, ink is heated inside an ink flow path by a thermal resistor to thereby generate air bubbles. The ink droplets are discharged by pressure of the air bubbles.

In the electrostatic type, a vibrating plate forming a wall surface of an ink flow path and an electrode are placed opposite to each other and the vibrating plate is deformed by electrostatic force generated between the vibrating plate and the electrode. Thus, the capacity of the ink flow path is changed to discharge ink droplets.

A main scanning mechanism 32 for scanning by moving the carriage 5 includes the main scanning motor 8 arrange on one side of the main scanning direction, the driving pulley 7 driven by the main scanning motor 8, the pressurizing roller 15 arranged on the other side of the main scanning direction, and the timing belt 9 are laid (stretched) across in a tensioned condition between the driving pulley 7 and the pressurizing roller 15. The pressuring roller 15 is outwardly biased by a tension spring (not illustrated) in a direction of separating from the driving pulley 7.

The timing belt 9 is partly fixed to and retained by a belt retaining unit 10 provided on a back surface side of the carriage 5. Therefore, the carriage 5 is pulled by the timing belt 9 in the main scanning direction when the timing belt 9 moves.

An encoder sheet 41 is arranged along the main scanning direction of the carriage. By reading slits formed in the encoder sheet 41 by an encoder sensor 42 which is provided in the carriage 5, it is possible to detect the position of the main scanning direction of the carriage 5. While the carriage 5 exists in a recording region inside a main scanning region, the sheet material 150 is intermittently fed in directions Y1 and Y2 (sub scanning directions) perpendicular to the main scanning direction of the carriage 5 by a paper feeding mechanism (not illustrated).

In the image forming apparatus of the first embodiment, the carriage 5 is moved in the main scanning direction and the sheet material 150 is intermittently fed while ink droplets are discharged by the recording heads 21 to 24 driven in response to image information. Thus, a predetermined image can be formed on the sheet material 150.

On one side surface of the carriage 5, a print position shift sensor 30 is installed for detecting a shift of an impact position of ink by reading the test pattern. The print position shift sensor 30 includes a light emitting element such as an LED and a light receiving element including a reflection type photo sensor. The print position shift sensor 30 reads the test pattern for detecting the impact position formed on the sheet material 150. For example, the print position shift sensor 30 corresponds to a reading unit in the claims and the carriage 5 corresponds to a relatively moving unit in the claims.

The print position shift sensor 30 is provided for the recording head 21. Therefore, it is preferable to install other print position shift sensors 30 parallel to the recording heads 22 to 24 in order to adjust timings of discharging droplets from the recording heads 22 to 24. Further, if the carriage 5 has a mechanism of sliding the print position shift sensor 30 parallel to any one of the recording heads 22 to 24, timings of discharging droplets from the recording heads 22 to 24 can be adjusted using only one print position shift sensor 30. Even if the image forming apparatus 100 feeds the sheet material 150 in the inverse direction, the timings of discharging droplets from the recording heads 22 to 24 can be adjusted by the one print position shift sensor 30.

Figure 6:
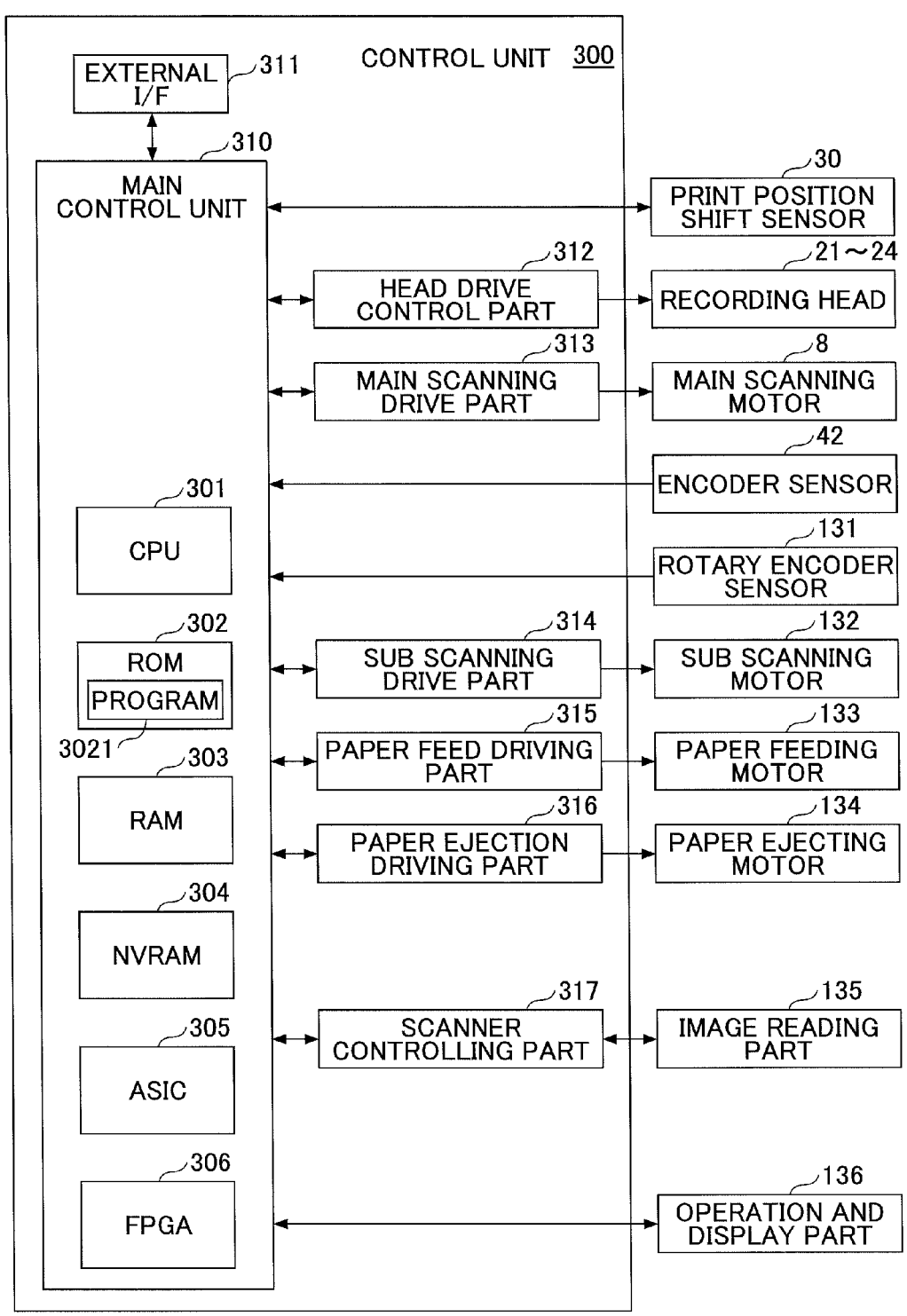
FIG. 6 is an exemplary hardware block diagram of a control unit of the image forming apparatus.

FIG. 6 is an exemplary hardware block chart of a control unit 300 of the image forming apparatus 100. The control unit 300 includes a main control unit 310 and an external I/F 311. The main control unit 310 includes a CPU 301, a ROM 302, a RAM 303, a NVRAM 304, an ASIC 305, and a Field Programmable Gate Array (FPGA) 306. The CPU 301 executes a program 3021 stored in the ROM 302 to control the entire image forming apparatus 100. The ROM 302 stores fixed data such as an initial value and a parameter for the control in addition to the program 3021. The RAM 303 is a working memory for temporarily storing the program, the image data or the like. The NVRAM 304 is a non-volatile memory for holding data such as setup conditions while the power of the image forming apparatus is shut off. The ASIC 305 performs various signal processing such as sorting or the like for the image data, and controlling various engines. The FPGA 306 processes input and output signals for controlling the entire image forming apparatus.

The main control unit 310 controls the entire image forming apparatus, formation of the test pattern, detection of the test pattern, adjustment (correction) of the impact positions of droplets, or the like. As described later, within the first embodiment, the CPU 301 mainly detects the edge position by executing the program 3021 stored in the ROM 302. However, it is possible for a LSI such as the FPGA 306 and the ASIC 305 to execute the program 3021 to detect the edge position.

The external I/F 311 includes a communication device for communicating with another apparatus connected to the network, and a bus or a bridge for connecting with another apparatus having an interface of USB or IEEE 1394. The external I/F 311 transmits data from the outside to the main control unit 310. Further, the external I/F 311 outputs data generated by the main control unit 310 to the outside. An attachable and detachable recording medium 320 may be installed in the external I/F 311. The program 3021 may be delivered from the recording medium 320 via the external I/F 311 or from an outer communication device.

Further, the control unit 300 includes a head drive control part 312, a main scanning drive part 313, a sub scanning drive part 314, a paper feed driving part 315, a paper ejection driving part 316, and a scanner controlling part 317. The head drive control part 312 determines whether droplets are discharged from the respective recording heads 21 to 24, the timings of discharging droplets, and the amounts of the droplets to be discharged. The head drive control part 312 includes an ASIC for generating head data and converting arrangement of the head data (a head driver) used for controlling driving of the recording heads 21 to 24. The head drive control part 312 generates a drive signal indicative of discharging of a droplet and the size of the droplet based on print data (e.g., dot data provided with dithering) for each of the recording heads 21 to 24, and supplies the drive signal to the recording heads 21 to 24. The recording heads 21 to 24 include switches corresponding to the nozzles. The switches are turned on or off depending on the drive signal. Thus, the recording heads 21 to 23 cause droplets having sizes designated by the print data at positions designated by the print data. The head driver of the head drive control part 312 may be provided on the side of the recording heads 21 to 23, or the head drive control part 312 and the recording heads 21 to 24 may be integrated. The structure illustrated in FIG. 6 is only one example.

The main scanning drive part (motor driver) 313 drives the main scanning motor 8 used for scanning by moving the carriage. The above-described encoder sensor 42 for detecting the position of the carriage is connected to the main control unit 310. The main control unit 310 detects the position of the carriage 5 in the scanning direction based on the output signal from the encoder sensor 42. By controlling driving of the main scanning motor 8 via the main scanning drive part 313, the carriage 5 may be reciprocated in the main scanning directions.

The sub scanning drive part (motor driver) 314 drives the sub scanning motor 132 for feeding paper or the like. The output signal (pulse) from the rotary encoder sensor 131 which detects a moving distance in the sub scanning directions is input into the main control unit 310. The main control unit 310 detects the paper feeding amount based on the output signal and controls driving the sub scanning motor 132 via the sub scanning drive part 314 thereby feeding the sheet material via a conveyance roller (not illustrated).

The paper feed driving part 315 drives a paper feeding motor 133 for feeding the sheet materials from a paper feed tray. The paper ejection driving part 316 drives a paper ejecting motor 134 which drives a roller for ejecting printed sheet materials 150 onto a platen. The paper ejection driving part 316 may be substituted for the sub scanning drive part 314.

The scanner controlling part 317 controls an image reading part 135. The image reading part 135 optically reads an original and generates readout image data.

The main control unit 310 is connected to an operation and display part 136 including various keys such as numeric keypads and a print start key. The main control unit 310 receives key inputs operated by a user via the operation and display part 136 and displays menus in the operation and display part 136.

Further, although not illustrated in figures, a restoring system driving part for driving maintaining and restoring motor for driving the maintaining mechanism 26, a solenoid driving part (driver) for driving various solenoids (SOL) or the like, or a clutch driving part for driving an electromagnetic clutch or the like may be provided. Further, detection signals from various sensors (not illustrated) may be input into the main control unit 310. However, these detection signals are omitted in the figures.

The main control unit 310 forms the test pattern on the sheet material, and then controls light emission to the test pattern by a light emitting element of a print position shift sensor 30 which is installed in the carriage 5. Then, the main control unit 310 obtains the output signal from the light receiving element to thereby electrically read a reflected light from the test pattern. A shift amount of an impact position of a droplet is detected based on the output signal from the light receiving element. Further, the main control unit 310 controls correcting the timings of discharging droplets from the recording heads 21 to 24 based on the shift amount of the impact position of a droplet so as to cancel the shift amount.

[Forming the Test Pattern]

The CPU 301 starts correcting shifts of the impact positions of droplets at a predetermined timing. This predetermined timing may be when a user instructs correction of the shifts of the impact positions of droplets using the operation and display part 136, when an object to be fed is determined by the CPU 301 to be a specific sheet material 150 because the light emitting element 402 emits light before discharging ink and the intensity of a reflected light is equal to or less than a predetermined value, when it is determined that a temperature or a humidity, stored at a time of correcting the shifts of the impact positions of droplets, changes by a value equal to or greater than a threshold value, and when periodical times such as every day, every week, and every month come.

The CPU 301 instructs the control unit 300 to reciprocate the carriage 5 and instructs the head drive control part 312 to discharge droplets based on print data of a predetermined uniform pattern and print data of the test pattern.

Figure 7:
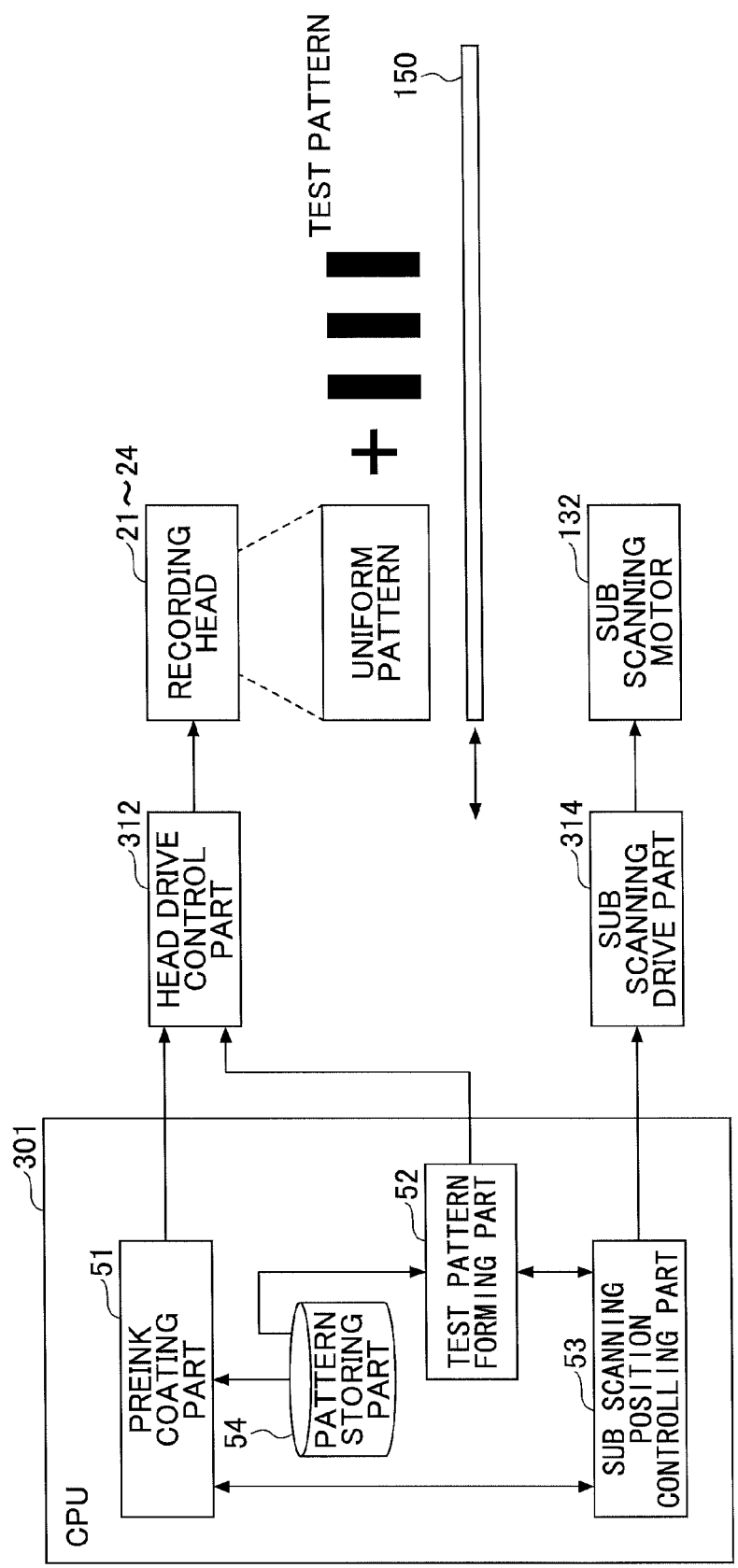
FIG. 7 schematically illustrates formation of a test pattern.

FIG. 7 schematically illustrates formation of the test pattern. At the above timing, the image forming apparatus corrects the shifts of the impact positions after forming the test pattern.

The CPU 301 executes the program for correcting the shifts of the impact positions of droplets to realize a pre-ink coating part 51, a test pattern forming part 52, a pattern storing part 54, and a sub scanning position controlling part 53. The pattern storing part 54 stores the print data of the uniform pattern and the print data of the test pattern. For example, the pattern storing part 54 corresponds to a print data storing unit of the claims.

The pre-ink coating part 51 forms the uniform pattern on a pre-ink forming area after reading the uniform pattern from the pattern storing part 54. The test pattern forming part 52 reads the print data of the test pattern from the pattern storing part 54 and forms the test pattern on the pre-ink forming area. For example, the test pattern forming part 52 corresponds to a pattern forming unit of the claims.

The sub scanning position controlling part 53 controls the position of the sheet material in the sub scanning direction so that the test pattern is formed on the pre-ink forming area. The uniform pattern and the test pattern may be formed as follows.

A. Process of Independently Forming the Uniform Pattern and the Test Pattern (i) The sub scanning position controlling part 53 controls the sub scanning drive part 314 while monitoring the position of the sheet material detected by the rotary encoder sensor. Then, the sub scanning drive part 314 drives the sub scanning motor 132 to feed a leading end of the pre-ink forming area of the sheet material to reach a position below the recording head.

(ii) The pre-ink coating part 51 prints the contents of predetermined print data on the pre-ink forming area when the pre-ink forming area is fed to reach the position below the recording head. The print data has contents of making the pre-ink forming area be completely coated with a uniform color by the printer head. It is preferable that the light transmittance of the ink of the uniform pattern is lower than the light transmittance of the ink of the test pattern. Therefore, the color of the ink of the uniform pattern is preferably white. However, if the image forming apparatus does not have the white ink, a color of the ink of the uniform pattern different from a color of the ink of the test pattern is acceptable. The color of the ink of the uniform pattern is, for example, yellow.

(iii) After the uniform pattern is completely formed, the pre-ink coating part 51 requests the sub scanning position controlling part 53 to feed the sheet material in the inverse direction. The sub scanning position controlling part 53 waits for a predetermined time period for drying the ink for the uniform pattern after forming the uniform pattern. Thereafter, the sub scanning position controlling part 53 feeds the sheet material in the inverse direction until the leading end of the pre-ink forming area reaches the position below the recording head.

(iv) The test pattern forming part 52 prints the contents of predetermined print data on the pre-ink forming area when the pre-ink forming area is fed to reach the position below the recording head. These print data are different from the print data of the test pattern.

B. Process of Simultaneously Forming the Uniform Pattern and the Test Pattern (i) The sub scanning position controlling part 53 controls the sub scanning drive part 314 while monitoring the position of the sheet material detected by the rotary encoder sensor. Then, the sub scanning drive part 314 drives the sub scanning motor 132 to feed a leading end of the pre-ink forming area to reach a position below the recording head.

(ii) The test pattern forming part 52 prints the contents of predetermined print data on a pre-ink forming area when the pre-ink forming area is fed to reach the position below the recording head. These print data have contents in which the test pattern is included on a background of a unique color.

Figure 8:
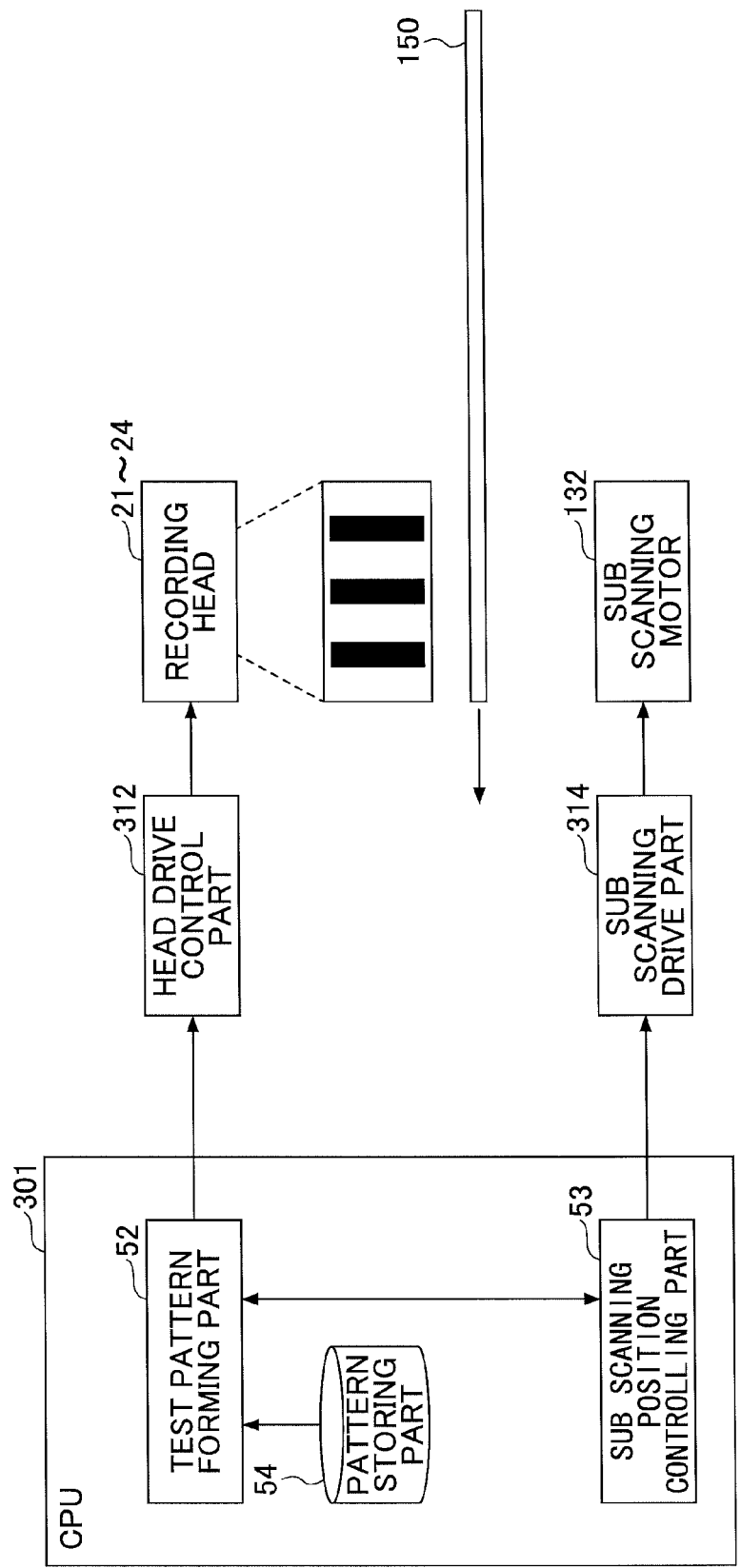
FIG. 8 schematically illustrates formation of a uniform pattern and a test pattern as integrated print data.

FIG. 8 schematically illustrates formation of a uniform pattern and a test pattern as integrated print data. For example, the pixel values of a background color uniformly correspond to white, and the pixel values of the test pattern uniformly correspond to black. By preparing the integrated background and test pattern as described, it is possible to shorten a feeding time of the sheet material and omit or shorten a drying time for drying the ink of the uniform pattern.

[Correction of Shift of Impact Position]

Figure 9:
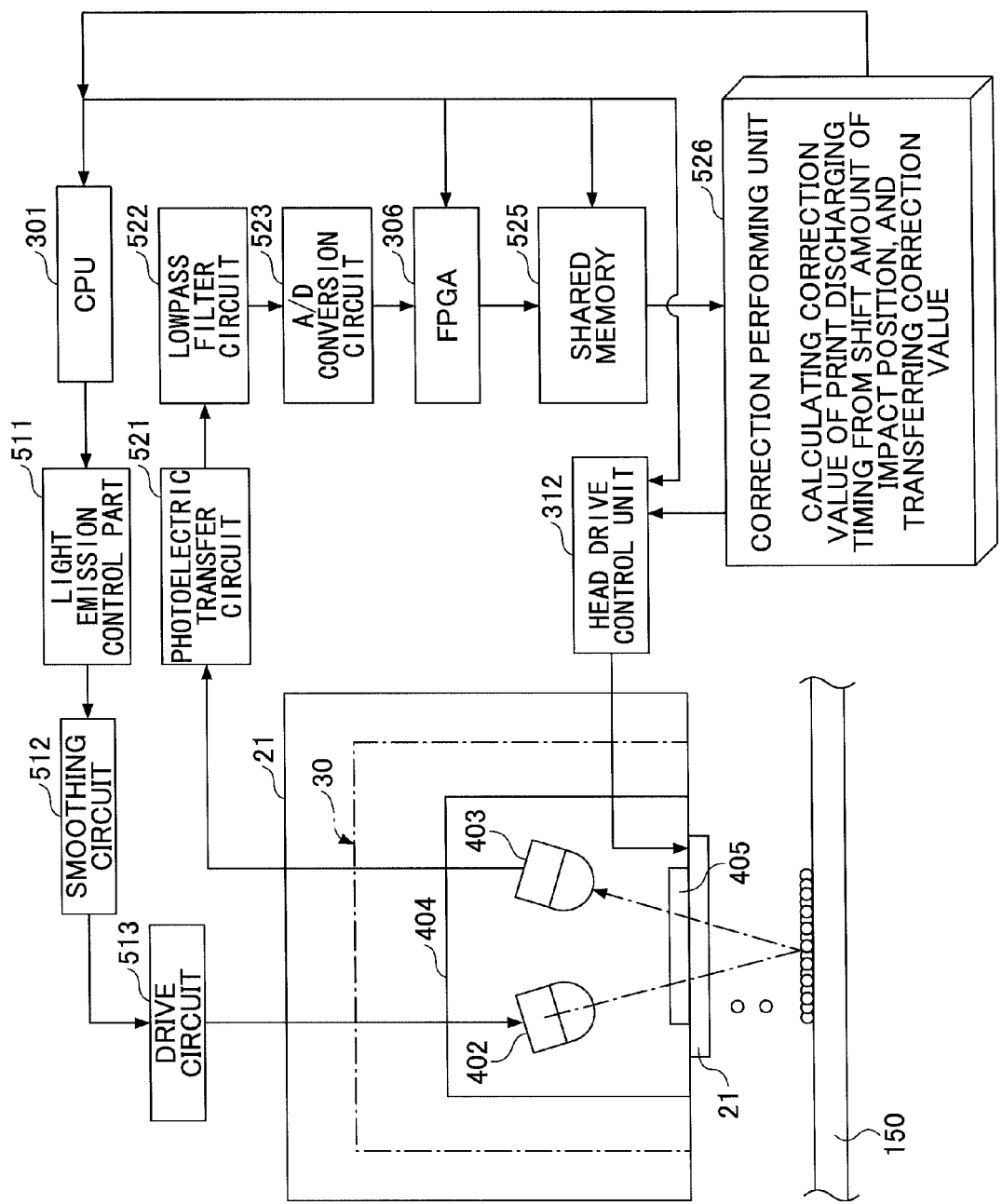
FIG. 9 schematically illustrates a structure of detecting an edge of the test pattern using a print position shift sensor.

FIG. 9 schematically illustrates a structure of detecting an edge of the test pattern using a print position shift sensor 30. FIG. 9 is a side view of the recording head 21 and the print position shift sensor 30 viewed from the right side plate 4.

The print position shift sensor 30 includes a light emitting element 402 and a light receiving element 403 which are arranged in a direction perpendicular to the main scanning direction. The positions of the light emitting element 401 and the light receiving element 403 can be substituted. The light emitting element 401 emits spotting light (described below) onto the test pattern 400. The light receiving element 403 receives light reflected on the sheet material 150, light reflected on the platen 40, other scattering light or the like. The light emitting element 402 and the light receiving element 403 are fixed inside a casing 404. A surface of the print position shift sensor 30 facing the platen 40 is shielded by a lens 405 from the outside. As described, the print position shift sensor 30 is packaged so as to be independently distributed in the marketplace.

Inside the print position shift sensor 30, the light emitting element 402 and the light receiving element 403 are arranged in a direction perpendicular to the scanning direction of the carriage 5, which is parallel to the sub scanning direction. With this arrangement, an influence on the detection result by the print position sensor 30 can be lowered.

For example, the light emitting element 402 is a LED. However, the light emitting element is not limited to the LED and may be sufficient to be a light source which can emit visible light such as laser and various lamps. The visible light is preferable because it is better that the spotting light is absorbed by the test pattern. Although the wavelength of the light emitting element is fixed in the above, it is also possible to install plural print position shift sensors including light emitting elements 402 emitting light having different wavelengths.

Further, a spot diameter of the spotting light formed by the light emitting element 402 may be in a precise level of millimeter so as to be able to use a low cost lens without using a lens having high accuracy. The spot diameter relates to a detection accuracy of the edge of the test pattern. If the spot diameter is in the precise level of millimeter, the edge can be highly accurately detectable by the method of the first embodiment. On the contrary, the spot diameter can be reduced.

The CPU 301 controls reading the test pattern formed on the sheet material 150 by the print position shift sensor 30. Specifically, the CPU 301 sets a PWM value for driving the light emitting element 402 of the print position shift sensor 30 to a light emission control part 511. The light emission control part 511 outputs a signal to a smoothing circuit 512. The signal is smoothed by the smoothing circuit 512 and the smoothed signal is supplied to a drive circuit 513. The drive circuit 513 drives the light emitting element 402 so as to emit light. The spotting light may be emitted from the light emitting element 402 to the test pattern on the sheet material 150. The light emission control part 511, the smoothing circuit 512, the drive circuit 513, a photoelectric transfer circuit 521, a low pass filter 522, an A/D conversion circuit 523, and a correction performing unit 526 are installed in the main control unit 310 or the control unit 300. A shared memory 525 is, for example, RAM 303.

When the spotting light is emitted from the light emitting element 402 onto the test pattern on the sheet material, reflected light reflected by the test pattern impinges on the light receiving element 403. The light receiving element 403 outputs an intensity signal of the reflected light to the photoelectric transfer circuit 521. Specifically, the photoelectric transfer circuit 521 performs photoelectric conversion to convert the intensity signal to a photoelectric conversion signal (a sensor output voltage) to the lowpass filter circuit 522. The lowpass filter circuit 522 removes high frequency noise from the photoelectric conversion signal (the sensor output voltage) and outputs this noise removed photoelectric conversion signal to the A/D conversion circuit 523. The A/D conversion circuit 523 converts the photoelectric conversion signal from analog to digital and outputs this A/D converted photoelectric conversion signal to FPGA 306, which is a signal processing circuit. The signal processing circuit (FPGA) 306 stores output voltage data, which are digital values of the output voltage (the A/D converted output voltage) to the shared memory 525.

The correction performing unit 526 reads out the output voltage data stored in the shared memory to correct the shifts of the impact positions of droplets. A correction amount is output from the correction performing unit 526 and input into the head drive control part 312. Said differently, the correction performing unit 526 detects edge positions of the test pattern and compares the detected edge positions with a proper distance between the two lines to thereby calculate a shift amount of an impact position of a droplet.

The correction performing unit 526 calculates the correction amounts of the timings of discharging droplets during driving of the recording head so as to cancel the shifts of the impact positions. Then, the correction performing unit 526 sets the calculated correction amounts of the timings of discharging droplets to the head drive control part 312. Thus, since the head drive control part 312 drives the recording head 21 after correcting the timings of discharging droplets based on the correction amount during driving of the recording head 21, it is possible to reduce the shifts of the impact positions of droplets.

Figure 10:
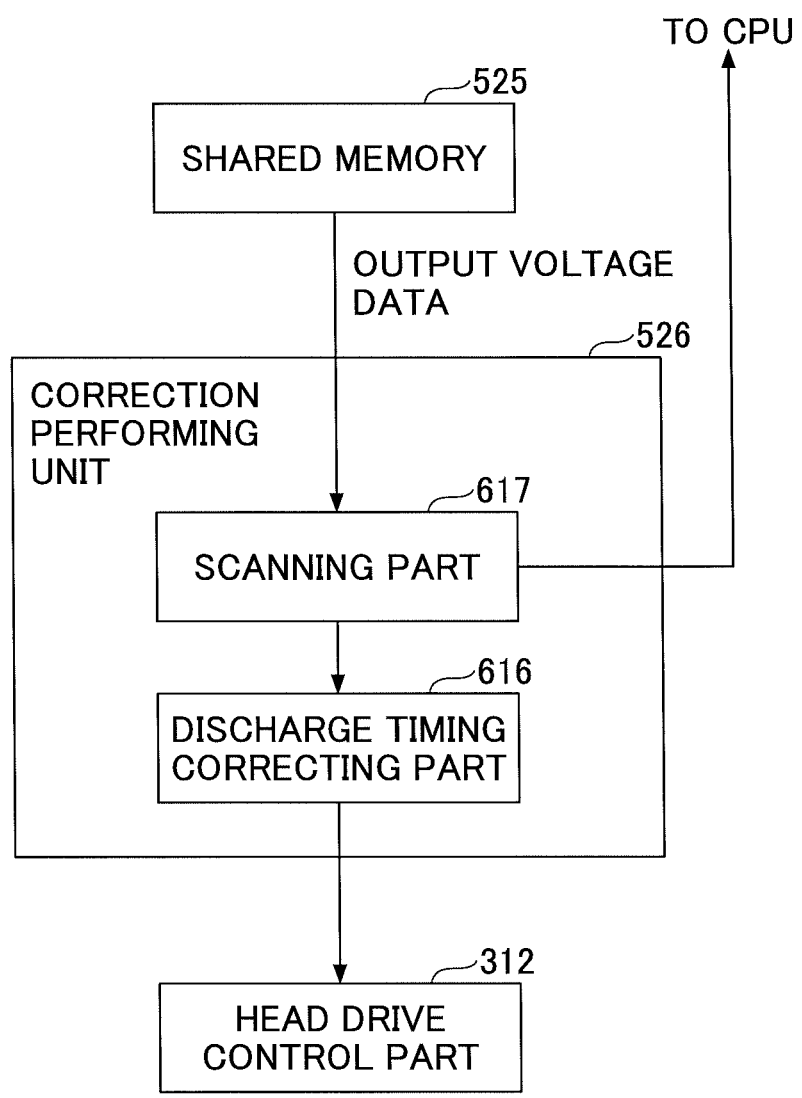
FIG. 10 illustrates an exemplary functional block diagram of a correction performing unit.

FIG. 10 is an exemplary functional block diagram of the correction performing unit 526. The correction performing unit 526 includes a scanning part 617 and a discharge timing correcting part 616. The scanning part 617 drives the light emitting element 402 and the light receiving element 403 so as to read the reflected light from the test pattern and generate output voltage data. The discharge timing correcting part 616 corrects the timings of discharging droplets based on the shift amounts of the impact positions of droplets which are obtained from the edge positions of the test pattern. For example, the scanning part 617 corresponds to a first detection data obtaining unit of the claims, and the discharge timing correcting part 616 corresponds to a position detecting unit of the claims. Detailed description of the correction is described later.

[Position of Spotting Light and Position of Edge]

Figure 11:
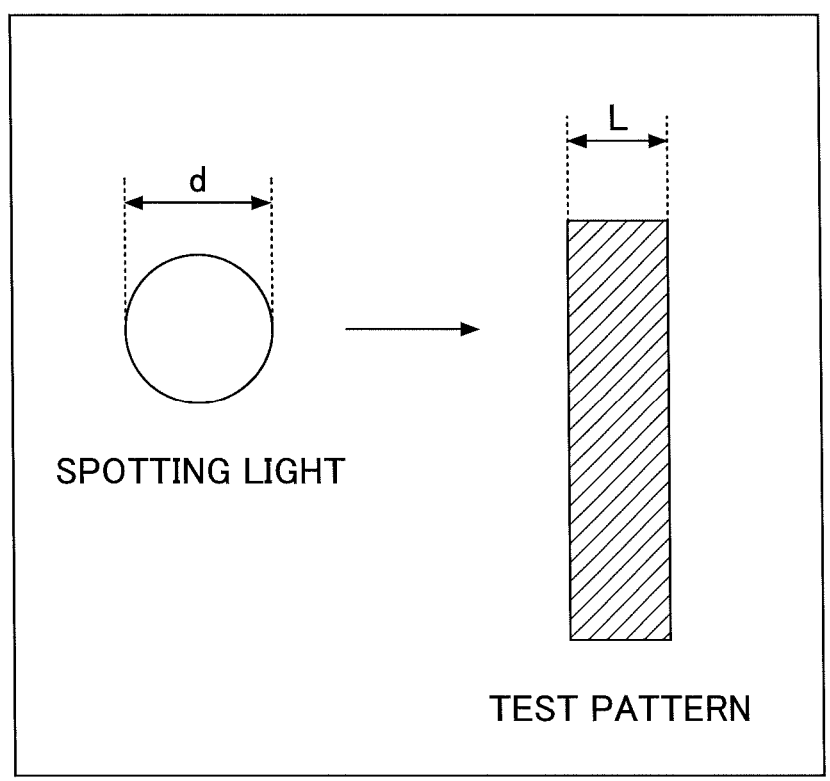
FIG. 11 illustrates exemplary spotting light and an exemplary test pattern.
Figure 12A:
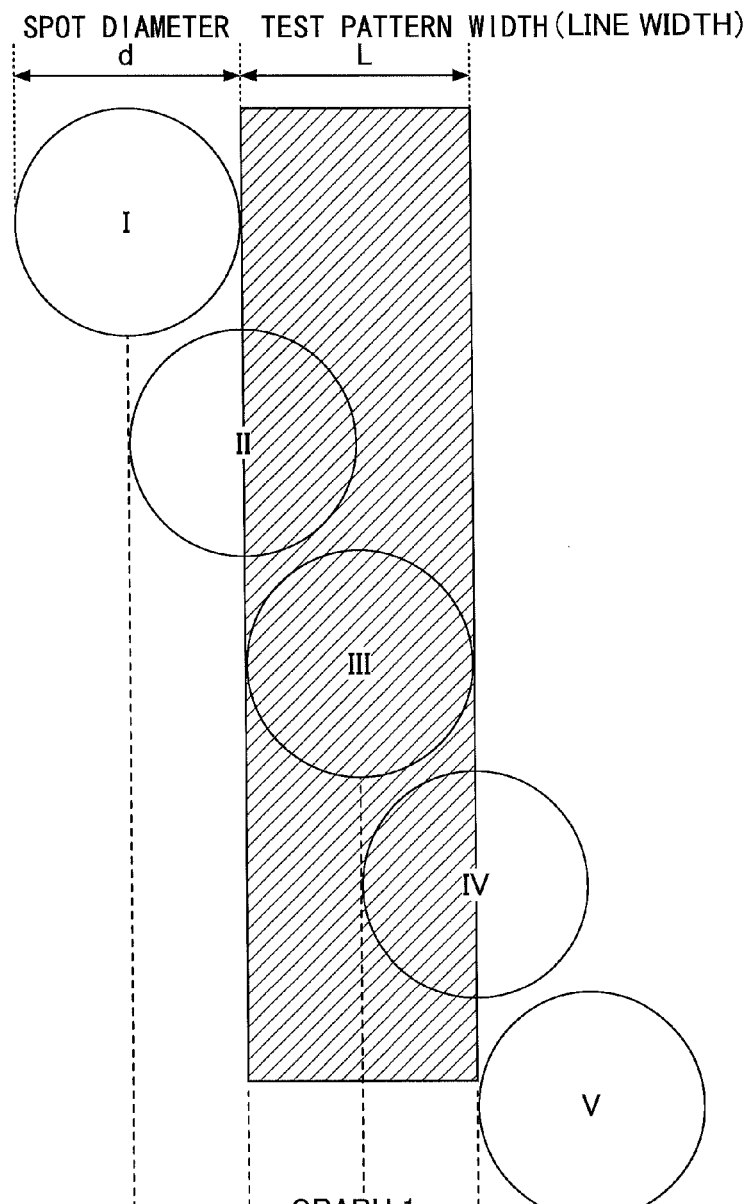
FIG. 12A illustrates an exemplary relationship between the spotting light and the test pattern.

Next, referring to FIG. 11 and FIG. 12A, a relationship between the spotting light and the edge position is described. FIG. 11 illustrates an exemplary spotting light and an exemplary test pattern. The spotting light moves across one or plural lines forming the test pattern at a predetermined speed (a constant speed). Hereinafter, the test pattern and the line are not strictly distinguished. The speed can be previously changed.

However, during crossing the test pattern or the line, the speed is constant. Since the sheet material such as a paper moves in a longitudinal direction of the line by being fed, the spotting light obliquely moves relative to the line. Here, even if the sheet material does not move, the process of specifying the edges is the same as the case where the sheet material moves. Ordinarily, as an overlapping area of the test pattern and the spotting light increases more, the reflected light of the spotting light becomes weaker because the spotted light is absorbed more by the test pattern in the overlapping area.

Referring to FIG. 11 and FIG. 12A, the spot diameter d is equal to the line width L of the test pattern. Specifically, the spotting light may be shaped like an ellipse. However, the ellipse may have its long axis parallel to a longitudinal axis of the test pattern. Therefore, the shape of the spotting light scarcely affects the accuracy in detecting the edge position.

FIG. 12A to FIG. 12D illustrates specifying the edge positions in the first embodiment. The Roman numerals I to V designate time points starting from I and ending at V. Referring to FIG. 12A, the spotting lights are designated by I to V along with elapse of the time.

At a time I, the spotting light does not overlap the test pattern.

At a time II, half of the spotting light overlaps the test pattern. At this moment, the decreasing rate of the reflected light becomes maximum because the overlapping area changes to the greatest positive value per a unit time period.

At a time III, an entire area of the spotting light overlaps the test pattern. At this moment, the intensity of the reflected light becomes the smallest.

At a time IV, half of the spotting light overlaps the test pattern. At this moment, the increasing rate of the reflected light becomes maximum because the overlapping area changes to the greatest negative value per a unit time period.

The center of the spotting light coincides with the edge positions of the test pattern (the line) at the times II and IV. Therefore, if it is possible to detect the positional relationships at the times II and IV between the spotting light and the line from the reflected light, it is possible to accurately specify the edge positions.

Figure 12B:
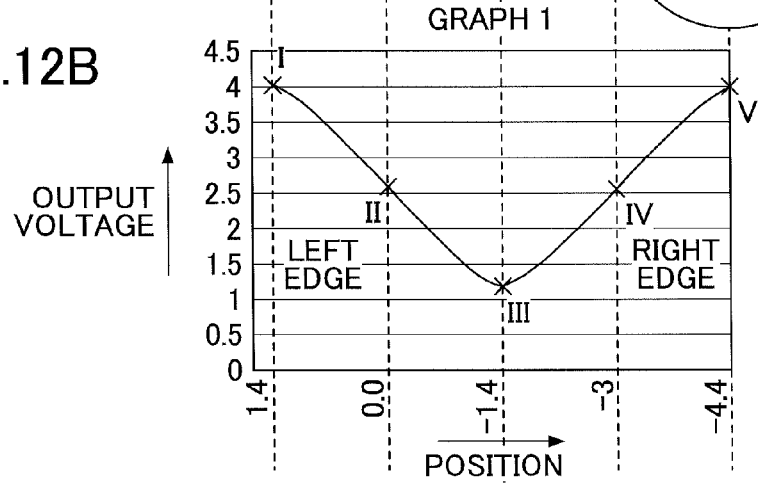
FIGS. 12B to 12D are graphs of an output voltage, an absorption area and an increasing rate obtained depending on positions of the spotting light relative to the test pattern.
Figure 12C:
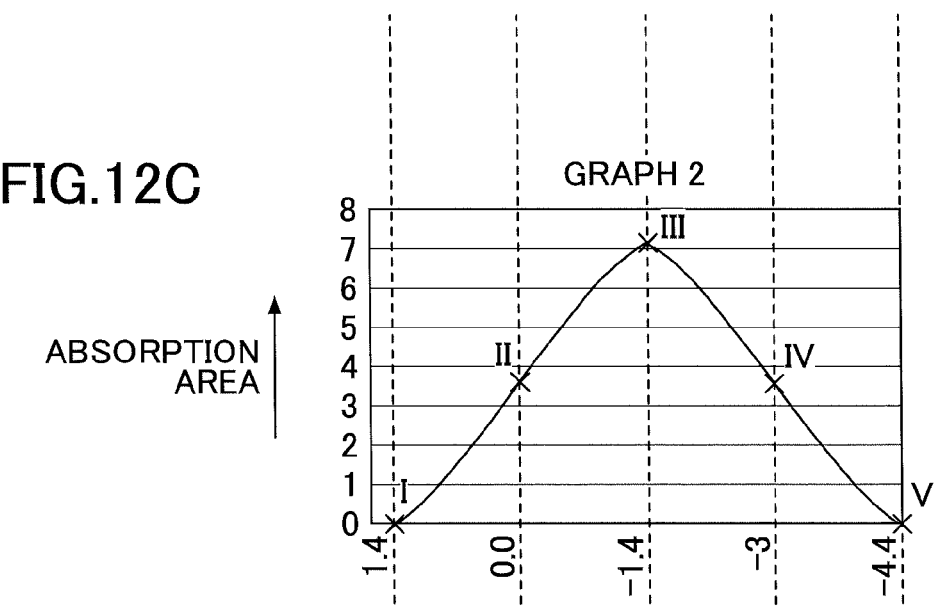
Figure 12D:
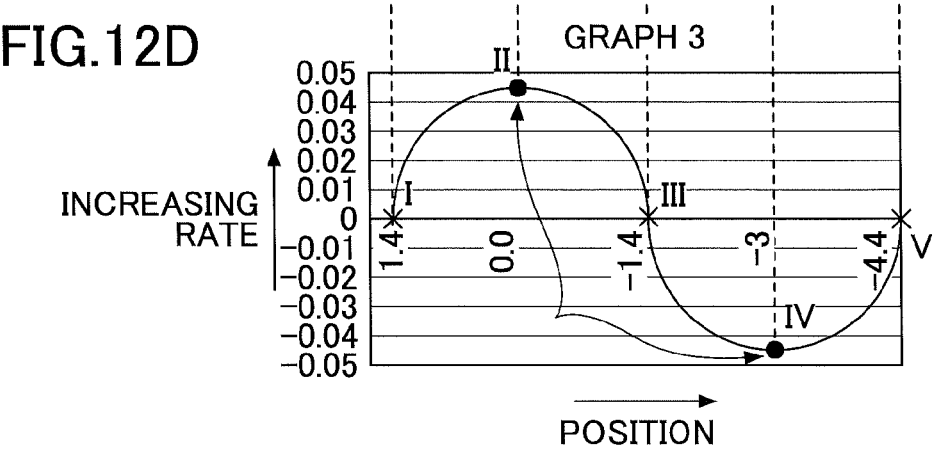

FIG. 12B illustrates an exemplary output voltage from the light receiving element 403. FIG. 12C illustrates an exemplary absorption area as an overlapping area of the spot light on the test pattern. FIG. 12D illustrates an exemplary increasing rate of the absorption area obtained by differentiating the absorption area illustrated in FIG. 12C. The information illustrated in FIG. 12D is obtainable by differentiating an output waveform illustrated in FIG. 12B. Further, although the absorption area is calculated from the output voltage, the output voltage may not be an absolute value. By subtracting the output voltage illustrated in FIG. 12B from a predetermined value, a waveform similar to the absorption area may be obtained.

As described, the decreasing rate of the reflected light becomes the maximum at the time II because the overlapping area changes most greatly to a negative value in a unit time period. The increasing rate of the reflected light becomes the maximum at the time IV because the overlapping area changes most greatly to a positive value in the unit time period. Referring to FIG. 12D, a time point when the increasing rate changes from incremental to decremental coincides with the time II, and a time point when the increasing rate changes from decremental to incremental coincides with the time IV.

The point where incremental changes to decremental and the point where decremental changes to incremental are inflection points where directions of tangent lines change beyond the abscissa. As described, if the output signal has an inflection point, it is determined that the sides of the spotting light coincide with the edges of the test pattern. Therefore, if the inflection point is accurately detected, the edge positions are also accurately specified.

[Specifying the Edge Position]

Figure 13B:
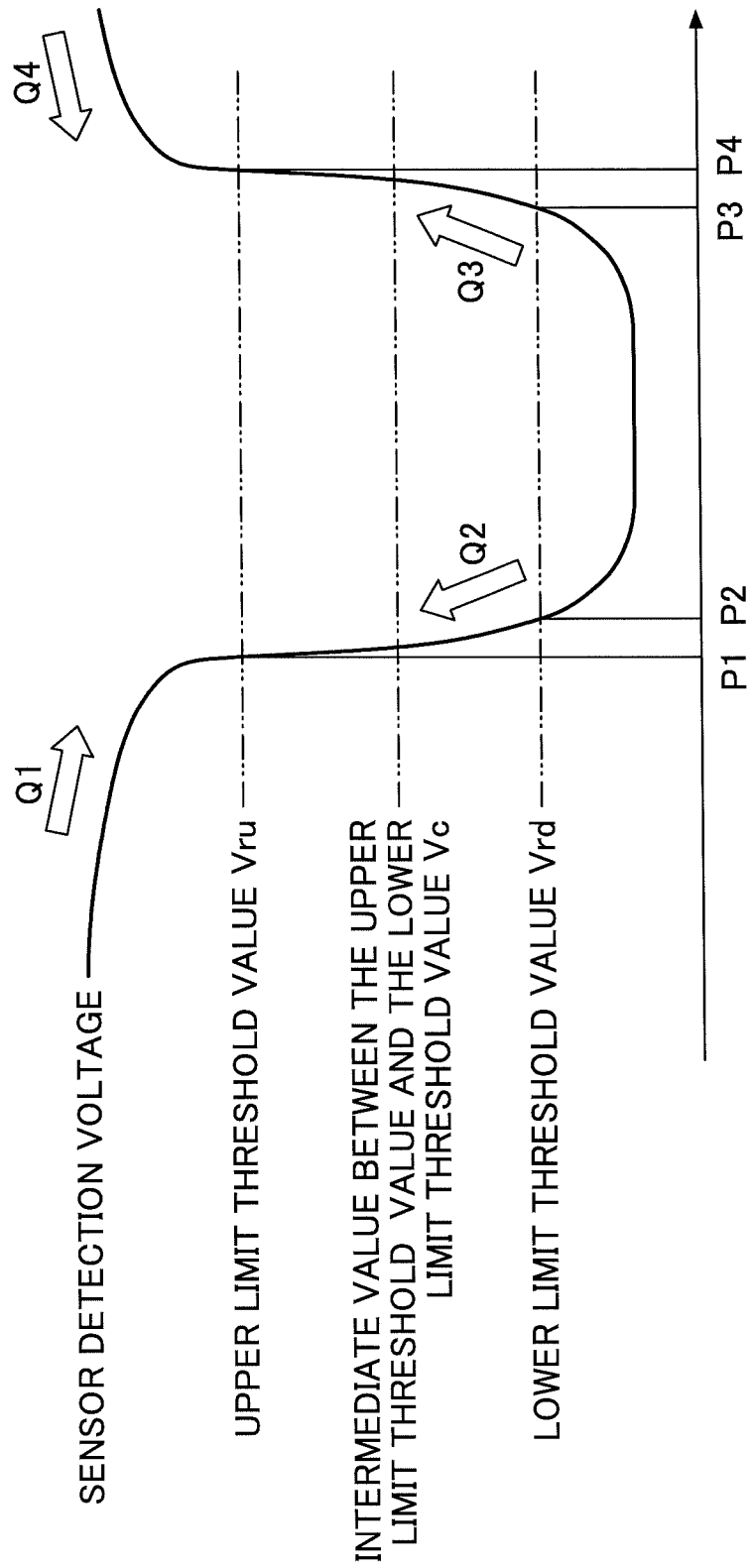

FIG. 13A and FIG. 13B schematically illustrate a process of specifying edge positions of the test pattern. FIG. 13A schematically illustrates the output voltage. FIG. 13B is an enlarged view of the output voltage. Approximate values of the inflexion points can be obtained by the correction performing unit 526. The approximate values of the inflexion points can also be obtained by an implementer of the image forming apparatus of the first embodiment on an experimental basis. As described above, the inflexion point exists in the position where the differential value of the output voltage or the absorption area is closest to zero.

The upper limit threshold value Vru and the lower limit threshold value Vrd are predetermined so as to include the inflection point between the upper limit threshold value Vru and the lower limit threshold value Vrd. As described below, the CPU 301 calibrates the output from the light emitting element 402 and the sensitivity of the light receiving element 403 so that the output voltage for an area without the test pattern becomes a substantially constant value (4 [V] as described below). An amplitude correcting process may make local maximum values of the output voltage be a substantially constant value. Therefore, even if the output voltage is instable, the inflexion point is included between the upper limit threshold value Vru and the lower limit threshold value Vrd.

The discharge timing correcting part 616 searches for a falling edge of the output voltage along an arrow Q1 and a point where the output voltage becomes the lower limit threshold value Vrd or smaller is stored as a point P2 in the discharge timing correcting part 616. The discharge timing correcting part 616 searches for a point where the output voltage exceeds the upper limit threshold value Vru along an arrow Q2 from the point P2. The point where the output voltage exceeds the upper limit threshold value Vru is stored in the discharge timing correcting part 616 as a point P1.

Then, by the discharge timing correcting part 616, a regression linear line L1 is calculated using plural output voltage data between the points P1 and P2. Then, an intersection point between the regression linear line L1 and the intermediate value Vc between the upper and lower limit values is calculated. The calculated intersection point Vc is determined as an intersection point C1.

The discharge timing correcting part 616 searches for a rising edge of the output voltage along an arrow Q3 and a point where the output voltage becomes the lower limit threshold value Vru or greater is stored as a point P4 in the discharge timing correcting part 616. The discharge timing correcting part 616 searches for a point where the output voltage becomes the upper limit threshold value Vrd or smaller along an arrow Q4 from the point P4. The point where the output voltage becomes the upper limit threshold value Vrd or smaller is stored in the discharge timing correcting part 616 as a point P3.

Then, by the discharge timing correcting part 616, a regression linear line L2 is calculated using plural output voltage data between the points P3 and P4. Then, an intersection point between the regression linear line L2 and the intermediate value Vc between the upper and lower limit values is calculated. The calculated intersection point Vc is determined as an intersection point C2. The discharge timing correcting part 616 specifies the intersection points C1 and C2 as the edge positions of the line. As described, the intersection points C1 and C2 may coincide with the inflection points.

Thereafter, the discharge timing correcting part 616 calculates an ideal distance between the two lines and a difference of the ideal distance from the distance between the intersection points C1 and C2. This difference is the actual shift amount of the impact position of a droplet relative to the position of the ideal line. The discharge timing correcting part 616 calculates a correction value for correcting a timing of discharging droplets from the recording head based on the calculated shift amount of the impact position and sends this correction value to the head drive control part 312. Then, the head drive control part 312 drives the recording head 21 at the corrected timing of discharging a droplet. Therefore, the shifts of the impact positions of droplets may be reduced.

[Accuracy Lowering Factor]

As described, when the edge is detected by using the output voltage data between the upper limit threshold value and the lower limit threshold value, the edge is not detected if the inflexion point does not exist between the upper limit threshold value and the lower limit threshold value. Hereinafter, a width between the upper limit threshold value and the lower limit threshold value is referred to as a "threshold region". Although the threshold region is determined by the output voltage, the threshold region may be determined by an absorption area corresponding to the absorption area.

Figure 14:
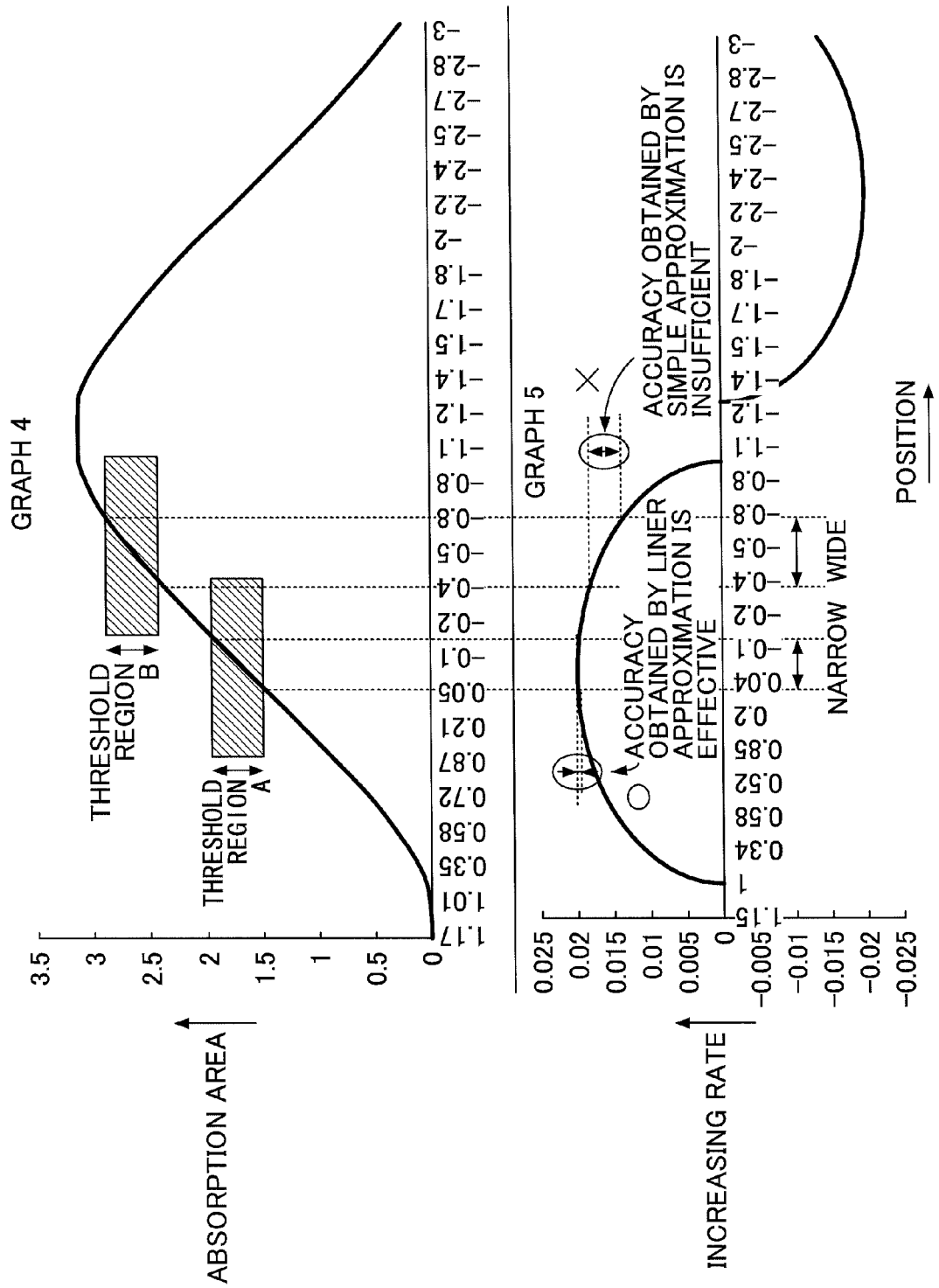
FIG. 14 illustrates an exemplary absorption area and an exemplary increasing rate of the absorption area.

FIG. 14 illustrates an exemplary absorption area and an exemplary increasing rate of the absorption area. Referring to FIG. 14, if the inflexion point exists in a threshold region A, the discharge timing correcting part 616 can accurately detect the edge positions as illustrated in FIG. 11.

On the contrary, if the inflexion point exists in a threshold region B, even if the regression linear line is obtained from the threshold region A, the discharge timing correcting part 616 may not detect an accurate edge position. Further, if it is known that the inflection point exists in the threshold region B, the threshold region B is adopted instead of the threshold region A. Then, the discharge timing correcting part 616 can effectively obtain the regression linear line. However, if there is a great shift in the position of the inflexion point, the curve of the output voltage or the absorption area may be deformed. For example, when the discharge timing correcting part 616 obtains the regression linear line from the threshold region in which the gradient of the curve is large, the intersection points C1 and C2 may greatly shift. Referring to the lower part of FIG. 14, this great shift is proved by facts in which the width of the position including the apex can be assumed in a sufficiently narrow range in the threshold region A, and the width of the position including the apex can hardly be assumed in a sufficiently narrow range in the threshold region B.

Therefore, in a case where the inflexion point is changed so as not to be included in the threshold region A, it is not preferable to determine the edge positions by specifying the edge positions from the threshold region A, obtaining the inflexion point, moving the threshold region, and determining the edge positions.

The image forming apparatus of the first embodiment forms the test pattern after forming the uniform pattern. Therefore, the inflexion point of the output voltage can be substantially included in the threshold region. Therefore, the edge positions can be accurately detected.

Figure 15A:
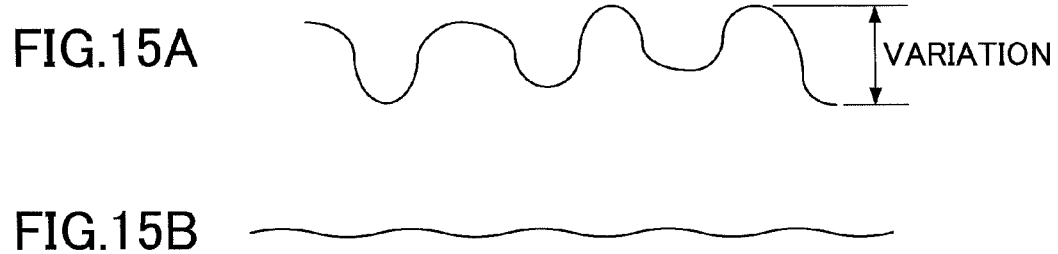
FIGS. 15A and 15B illustrate an effect of restricting variation of the output voltage using the uniform pattern.
Figure 15B:
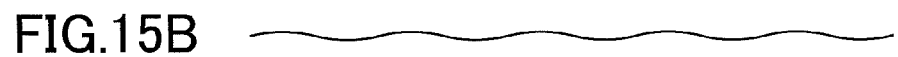

FIGS. 15A and 15B illustrate an effect of restricting variation of the output voltage using the uniform pattern. Referring to FIG. 15A, the amplitude of the output voltage from the light receiving element 403 is schematically illustrated in a case where the test pattern is formed without forming the uniform pattern on the recording medium having a high transmittance such as a tracing paper. Because there is a deviation in transmitting from the sheet material, there occurs a great variation in the amplitude of the output voltage.

Referring to FIG. 15B, the amplitude of the output voltage from the light receiving element 403 is schematically illustrated in a case where the test pattern is formed after forming the uniform pattern on the recording medium having a high transmittance such as a tracing paper. The uniform pattern prevents the light from being transmitted. Therefore, the surface of the sheet material becomes a uniform state in which transmission unevenness does not exist. As a result, the variation generated in the amplitude of the output voltage can be drastically reduced.

Figure 16A:
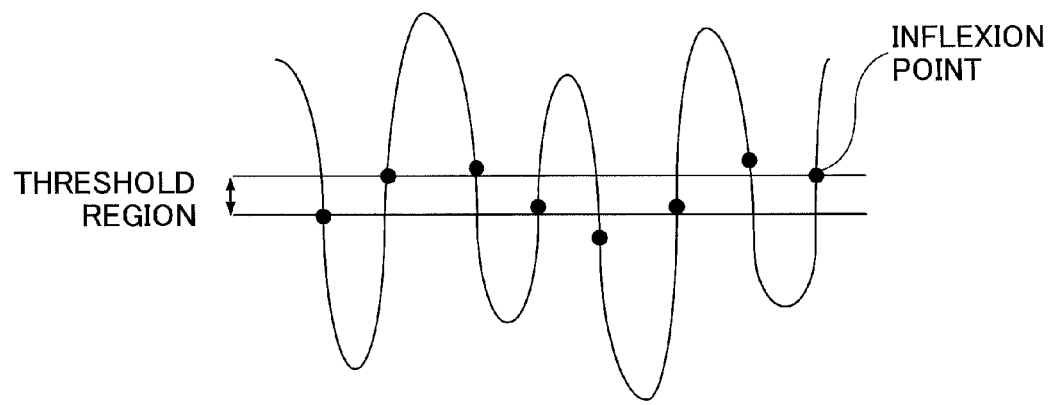
FIGS. 16A and 16B illustrate an exemplary output voltage having an unstable amplitude and an exemplary output voltage after forming a uniform pattern.
Figure 16B:
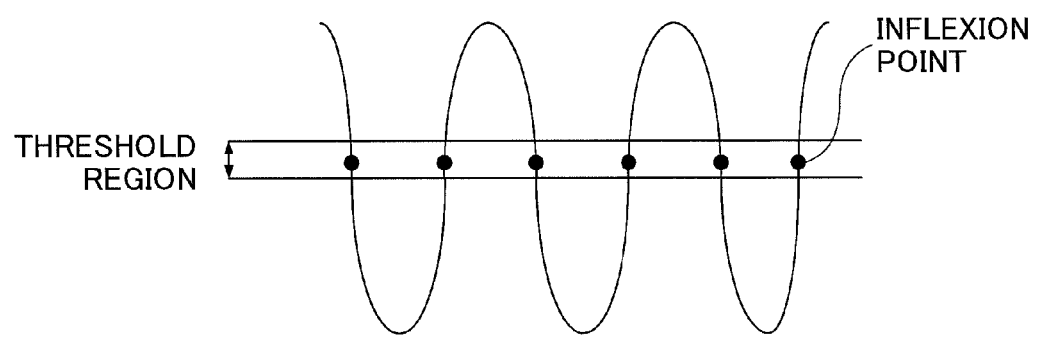

FIG. 16A illustrates exemplary inflexion points in a case where the amplitude of the output voltage is unstable. FIG. 16B illustrates exemplary inflexion points in a case where the amplitude of the output voltage is stabilized more because the uniform pattern is formed. The unstable output voltage as illustrated in FIG. 16A may appear when the print position shift sensor 30 reads a test pattern formed on a sheet material 150 having high transmittance such as tracing paper. Referring to FIG. 16A, when the amplitude is unstable, the inflection points may not be included in the threshold region. If the correction performing unit 526 obtains the intersections C1 and C2 while the threshold region remains unchanged, the intersection points C1 and C2 are obtained from a part of the output voltage in which the inflexion point is not included.

Therefore, the edge position is not accurate. When the threshold region is moved so as to include the inflexion point, it is not assured that the edge position is accurately determined depending on a process of obtaining the intersection points C1 and C2 without forming the uniform pattern on the sheet material having high transmittance.

On the contrary thereto, FIG. 16B illustrates the output voltage obtained using the sheet material 150 having high transmittance formed with the uniform pattern having low transmittance, on which the test pattern is formed, and inflexion points of the output voltage. Because the transmission unevenness is restricted, the light quantity reflected on the surface of the recording medium scarcely varies. Therefore, the local maximum values (on the uniform pattern) and the local minimum values (on the line of the test pattern) are properly arranged without great deviations. As a result, the output voltage is stabilized, in which the inflexion points are arranged around the threshold region.

Within the first embodiment, the tracing paper is exemplified. However, the other sheet material 150 having high transmittance causes similar problems. For example, thin plain paper may cause the above problem as in tracing paper. In this case also, the process of detecting the edge position of the first embodiment is effective. The correction process of the timings of discharging droplets of the first embodiment is not limited to a sheet material made of a specific material, a sheet material of a specific type, and a sheet material having a specific thickness. It is also possible to apply the first embodiment to thick plain paper.

[Diameter of Spotting Light and Line Width of Test Pattern]

Referring to FIG. 11, the spot diameter d is equal to the line width L of the test pattern. However, the spot diameter may be greater than the line width L of the test pattern (d>L), or the spot diameter d is less that the line width L of the test pattern (d<L).

Figure 17A:
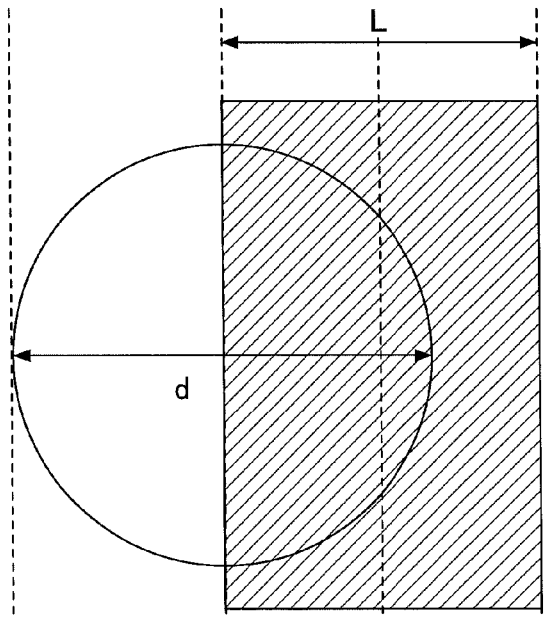
FIGS. 17A to 17D are graphs of an output voltage, an absorption area and an increasing rate obtained depending on positions of a spotting light relative to a test pattern.
Figure 17B:
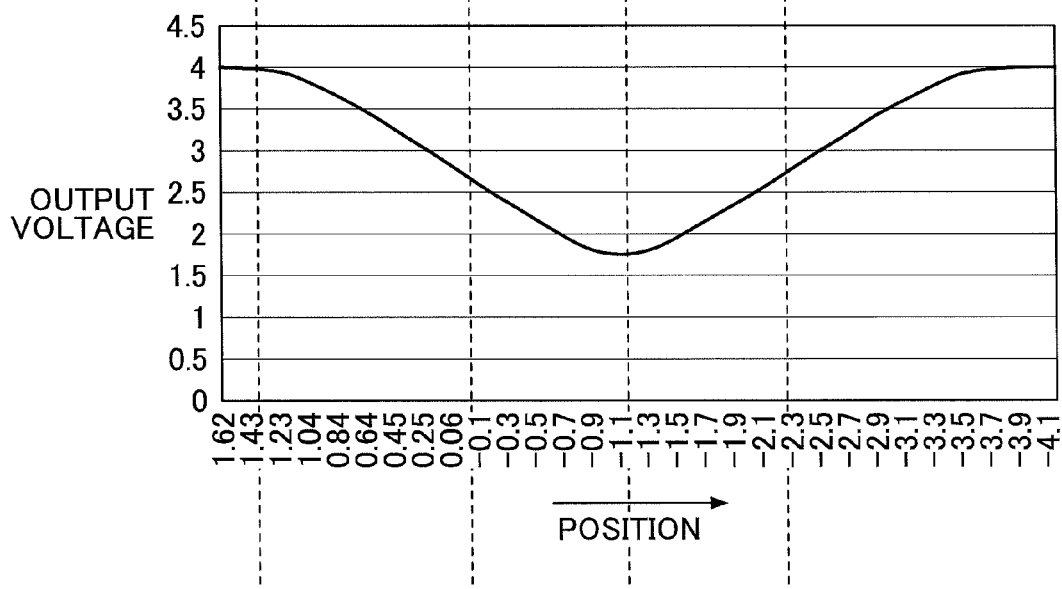
Figure 17C:
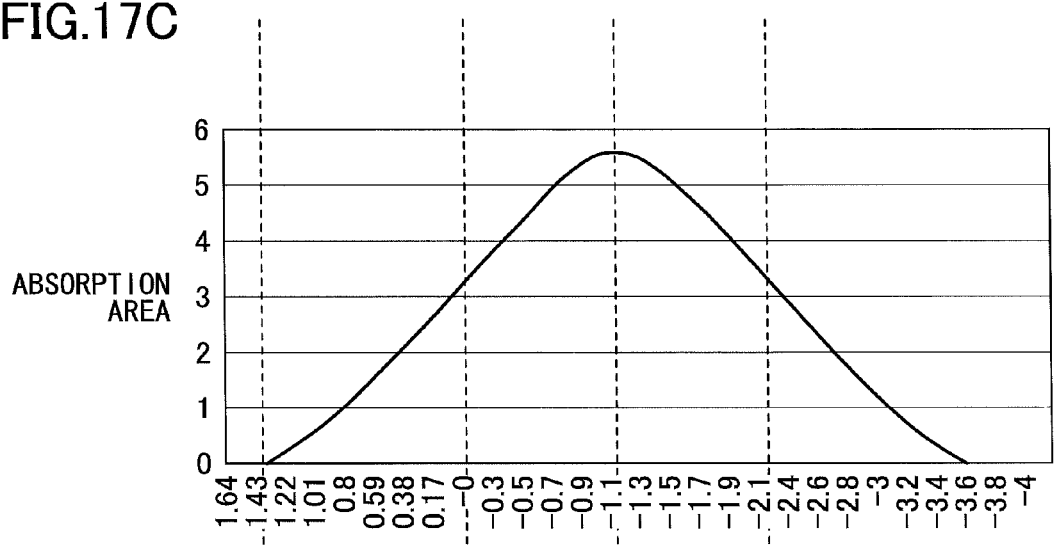
Figure 17D:
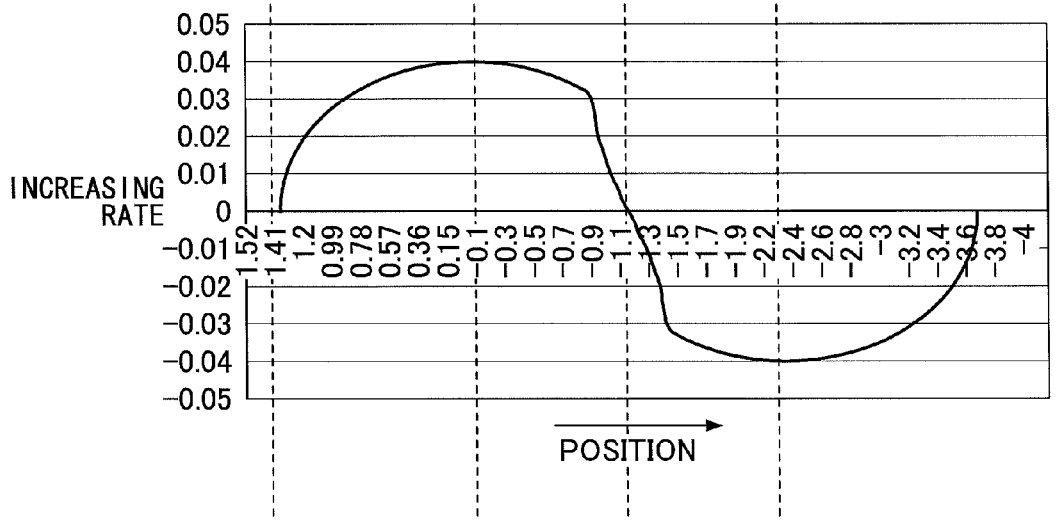

Referring to FIG. 17A, an exemplary relationship between spotting light and a test pattern where the spot diameter d is greater than the line width L of the test pattern (d>L). In this example, the relationship is expressed by d/2<L<d. FIG. 17B illustrates an exemplary output voltage from the light receiving element. FIG. 17C illustrates an exemplary absorption area as an overlapping area of the spot light on the test pattern. FIG. 17D illustrates an exemplary increasing rate of the absorption area obtained by differentiating the absorption area illustrated in FIG. 17C.

If the spot diameter d is greater than the line width L of the test pattern (d>L), the spotting light does not completely overlap the test pattern. As illustrated in the increasing rate of the absorption area of FIG. 17D, the absorption area starts to decrease at a time point when the right end of the spotting light goes over the test pattern. Thus, the increasing rate starts abruptly decreasing.

However, within the first embodiment, if a part of the output voltage around the inflexion point is obtained, the intersection points C1 and C2 are obtained. Therefore, it is sufficient that the spot diameter d of the spotting light satisfy d/2<L. Said differently, it is sufficient that the spot diameter d is not excessively greater than the line width L.

Figure 18A:
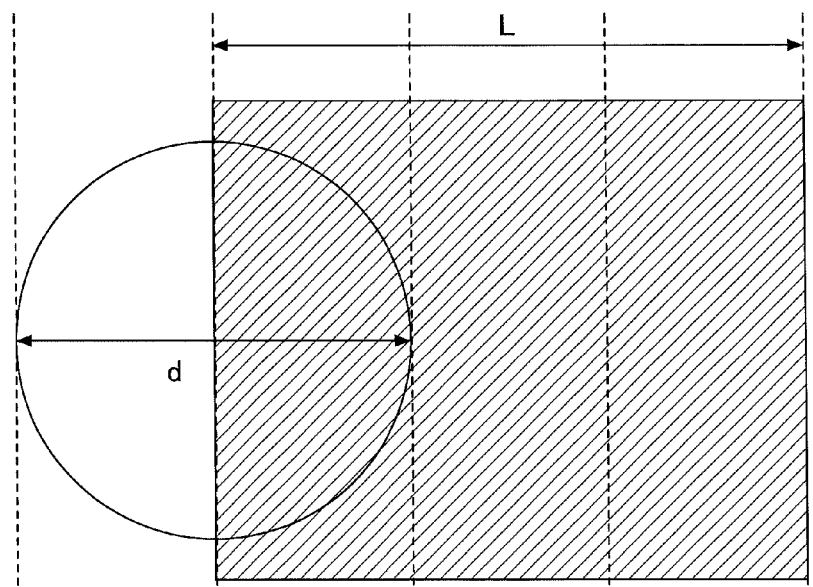
FIGS. 18A to 18D are graphs of an output voltage, an absorption area and an increasing rate obtained depending on positions of a spotting light relative to a test pattern.
Figure 18B:
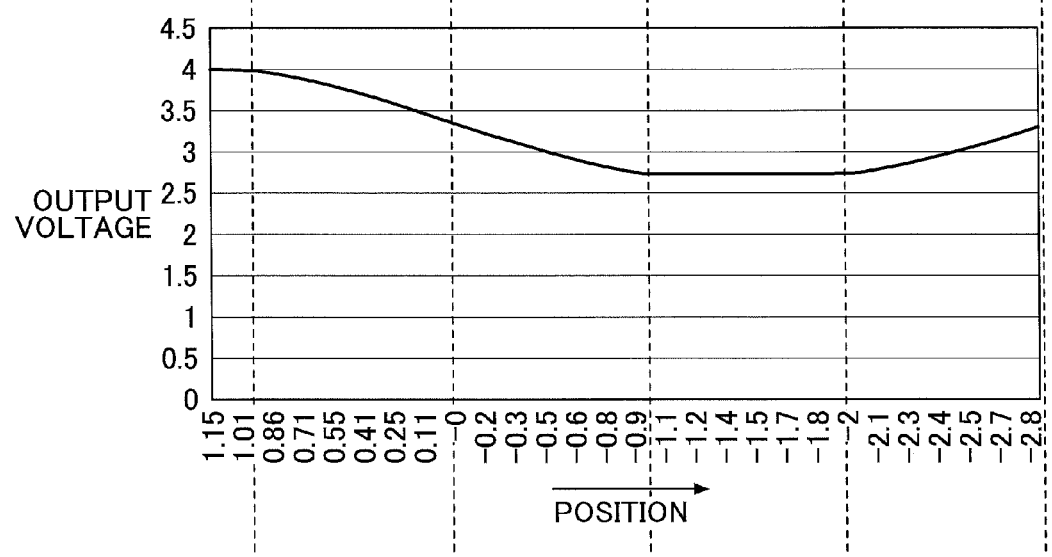
Figure 18C:
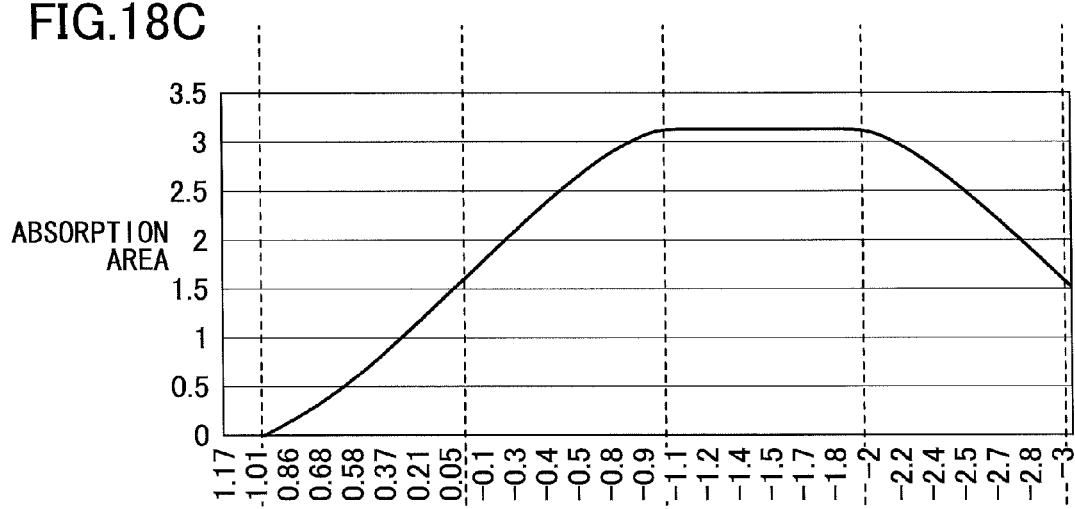
Figure 18D:
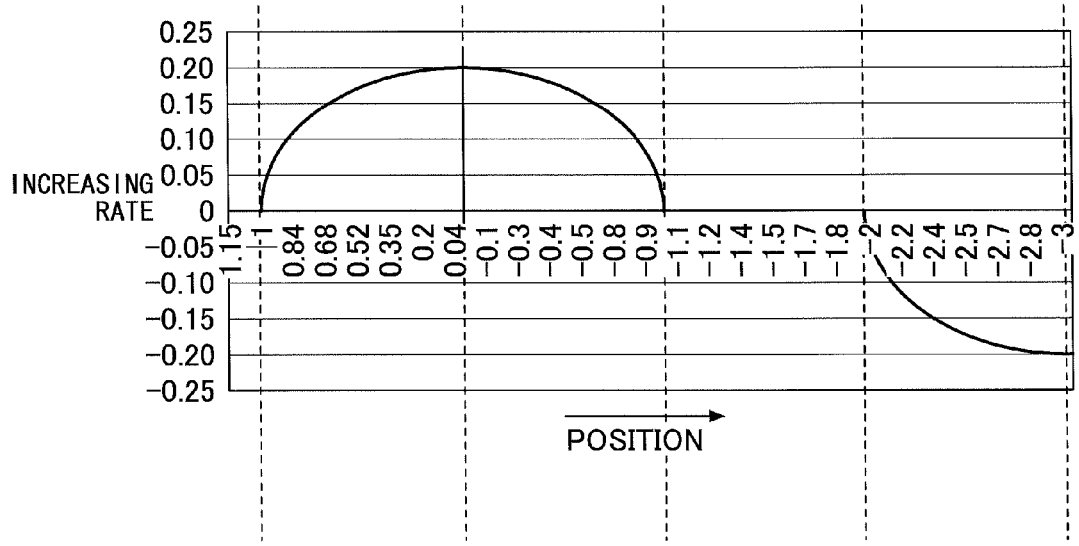

Referring to FIG. 18A, an exemplary relationship between spotting light and a test pattern where the spot diameter d is less than the line width L of the test pattern (d<L). FIG. 18B illustrates an exemplary output voltage from the light receiving element. FIG. 18C illustrates an exemplary absorption area as an overlapping area of the spot light on the test pattern. FIG. 18D illustrates an exemplary increasing rate of the absorption area obtained by differentiating the absorption area illustrated in FIG. 18C.

If the spot diameter d is smaller than the line width L of the test pattern (d<L), the spotting light completely overlaps the test pattern. Therefore, there may appear a region in which the output voltage or the absorption area has a constant value as illustrated in FIGS. 18B and 18C. Referring to FIG. 18D, there is a region where the increasing rate of the absorption area is zero. Thereafter, at a time point when the right end of the spotting light goes over the test pattern, the absorption area starts to decrease and the increasing rate gradually decreases (the decreasing rate increases).

In a manner similar to FIG. 11, the output voltage data near the inflection point is sufficiently high. Therefore, the discharge timing correcting part 616 can certainly obtain the intersection points C1 and C2.

[Image Forming Apparatus of Line Type]

Within the first embodiment, the image forming apparatus 100 of the serial type illustrated in FIGS. 4 and 5 are exemplified. The shift amount of the impact position of droplets can be corrected in a manner to the image forming apparatus 100 of a line type. The image forming apparatus 100 of the line type is briefly explained.

Figure 19:
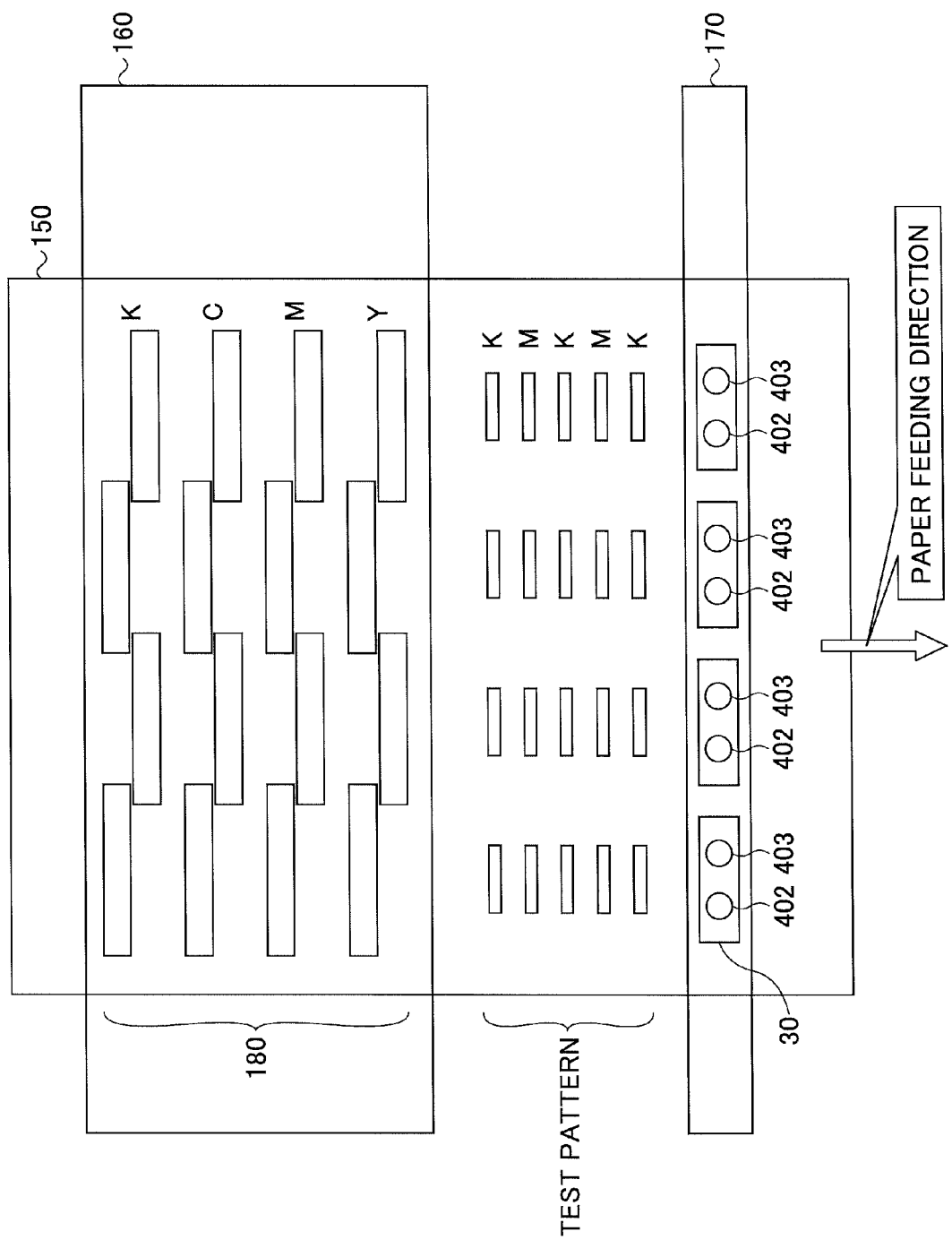
FIG. 19 schematically illustrates a head arrangement and a test pattern of an image forming apparatus of a line type.

FIG. 19 schematically illustrates a head arrangement and a test pattern of the image forming apparatus of the line type. The head fixing bracket 160 is fixed to the carriage 5 so as to bridge side ends of the carriage 5 in the main scanning direction in perpendicular to the feeding direction of the sheet material 150. Recording heads 180 for ink of KCMY are arranged in the head fixing bracket 160 entirely along the main scanning direction from the upstream side in this order. The recording heads are arranged in a zigzag shape so that ends of the recording heads 180 overlap each other. Then, droplets can be properly discharged to form an image having sufficient resolution. Therefore, it is unnecessary to arrange an additional recording head in the head fixing bracket 160 entirely along the main scanning direction to thereby limit cost increment. For example, the recording heads 180 may be arranged entirely along the main scanning direction for each color. The overlapping regions of the recording heads for each color may be further elongated.

The sensor fixing bracket 170 is fixed to the carriage 5 so as to bridge side ends of the carriage 5 in the main scanning direction in perpendicular to the feeding direction of the sheet material 150. The sensor fixing bracket 170 is provided in a downstream side of the head fixing bracket 160 in the feeding direction of the sheet material 150. Print position shift sensors 30 are arranged in the sensor fixing bracket 170. The number of the print position shift sensors 30 is equal to the number of the recording heads 180. Each print position shift sensor 30 partly overlaps corresponding recording head 180 in the main scanning direction. Each print position shift sensor includes a light emitting element 402 and a light receiving element 403. The light emitting element 402 and the light receiving element 403 are paired. The light emitting element 402 and the light receiving element 403 are arranged parallel to the main scanning direction.

The image forming apparatus 100 forms lines of the test pattern so that the longitudinal directions of the lines are arranged parallel to the main scanning direction. For example, when shifts of impact positions of other color droplets are corrected based on the color K, lines of K and M, lines of K and C, lines of K and Y are formed. In a manner similar to the image forming apparatus 100 of the serial type, the edge positions of the test patterns for C, Y, M, and K are detected, and timings of discharging droplets are corrected based on the shift amounts.

As described, in the image forming apparatus 100 of the line type, the shifts of the impact positions can be corrected by properly arranging the print position shift sensors 30.

[Operation Procedure]

FIG. 20A is a flowchart illustrating an exemplary procedure of correcting a signal by the correction performing unit 526.

First, the CPU 301 instructs the main control unit 310 to start correcting the impact positions of droplets. Upon the instruction, the main control unit 310 drives the sub scanning motor 132 via the sub scanning drive part 314 to feed the sheet material 150 immediately below the recording head 21 in step S1.

Next, the main control unit 310 drives the main scanning motor 8 via the main scanning drive part 313 to move the carriage 5 over the sheet material 150. The pre-ink coating part 51 discharges ink having low transmittance from the recording heads 180 installed in the carriage to form a solidly provided uniform pattern on a record medium in step S1-2. After forming the uniform pattern, the sub scanning position controlling part 53 feeds the sheet material in an inverse direction to return the sheet material until the starting position of the pre-ink forming area reaches below the recording head.

Next, the test pattern forming part 52 moves the carriage 5 via the main scanning motor 8, and simultaneously drives the recording heads 21 to 24 via the head drive control part 312 thereby forming the test pattern in step S1-3.

The main control unit 310 drives the main scanning motor 8 via the main scanning drive part 313 to move the carriage 5 over the sheet material 150, and calibrates the light emitting element 402 and the light receiving element 403 at specific positions on the sheet material 150 in step S2.

FIG. 20B is an exemplary flowchart illustrating the process in step S2. The main control unit 310 calibrates the output voltage of the light emitting element 402 to be within a predetermined range (specifically 4±0.4 [V]) by adjusting the light quantity of the light emitting element.

The CPU 301 sets a PWM value for driving the light emitting element 402 of the print position shift sensor 30 in the light emission control part 511. The PWM value is smoothed by the smoothing circuit 512 and then supplied to the drive circuit 513. Thus, the drive circuit 513 drives to emit the light emitting element 402 in step S21.

An intensity signal detected by the light receiving element 403 of the print position shift sensor 30 is stored in the shared memory 525. The CPU 301 checks whether the voltage value of the intensity signal is a predetermined voltage value in step S22.

If the voltage value of the intensity signal is the predetermined value YES in step S22, the process illustrated in FIG. 20B ends. If the voltage value of the intensity signal is not the predetermined value NO in step S22, the CPU 301 changes the PWM value in step S23 thereby readjusting the light quantity.

Next, the scanning part 617 moves the carriage 5 to a home position, scans the test pattern, and stores output voltage data in the shared memory 525 in step S3.

FIG. 20C is an exemplary flowchart illustrating the process in step S3. First, the CPU 301 lights a sensor light source in step S31.

Next, the photoelectric transfer circuit 521 or the like starts importing the output voltage data in step S32. After importing the output voltage data, the main scanning drive part 313 moves the carriage 5 by the main scanning motor 8 in step S33. The photoelectric transfer circuit 521 or the like imports the output voltage data while the carriage 5 moves. The data are sampled at, for example, 20 kHz (an interval of 50 μs).

When the carriage 5 reaches the end in the image forming apparatus, the photoelectric transfer circuit 521 or the like finishes importing the output voltage data in step S34. The main control unit 310 stores sequential output voltage data in the shared memory 525. The main control unit 310 stops the carriage 5 at the home position in step S35.

The discharge timing correcting part 616 reads the output voltage data stored in the shared memory 525, detects the edge positions, and corrects the shifts of the impact positions of droplets in step S12. The discharge timing correcting part 616 obtains the intersection points C1 and C2 from the lower limit threshold value Vrd and the upper limit threshold value Vru. The middle point between the intersection points C1 and C2 is the position of the line forming the test pattern. The discharge timing correcting part 616 compares the distance between the lines with the predetermined distance and calculates the shift amount of the impact position. The discharge timing correcting part 616 calculates the correction amount of the timing of discharging droplets at a time of driving the recording, head 21 used in driving the recording head 21 to cancel the shift of the impact position.

The image forming apparatus 100 forms the test pattern on the pre-ink forming area having the uniform pattern. Then, the variation of the reflectance of light is restricted to make the inflexion point of the output voltage reside in the threshold region. Therefore, it is possible to accurately determine the edge positions of the test pattern thereby highly accurately correcting the shift of the impact position.

Second Embodiment

Within the first embodiment, the amplitude of the output voltage is stabilized by forming the uniform pattern and the test pattern on the pre-ink forming area. However, only with the formation of the uniform pattern, the amplitude of the output voltage may vary depending on the property of the record medium and the color of the uniform pattern. With the second embodiment, the signal of the output voltage is corrected.

[Functional Block Diagram]

The block chart of a control unit 300 is similar to FIG. 6 in the first embodiment. A structure of detecting edges is similar to FIG. 9 of the first embodiment. Therefore, the explanation of these is emitted.

Figure 21:
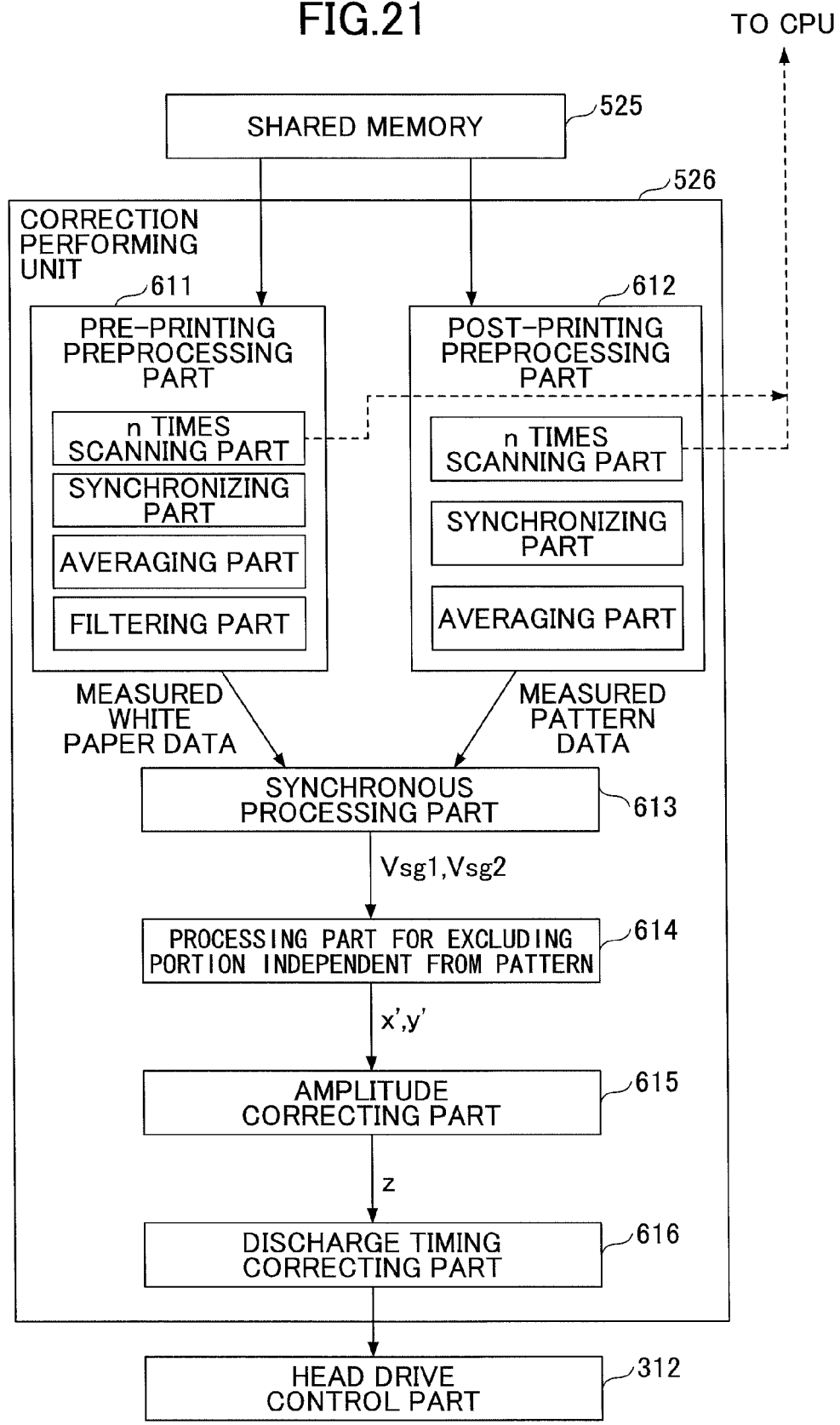
FIG. 21 is an exemplary functional block diagram of the correction performing unit (Second Embodiment)

FIG. 21 is an exemplary functional block diagram of the correction performing unit 526. The correction performing unit 526 includes a pre-printing preprocessing part 611, a post-printing preprocessing part 612, a synchronous processing part 613, a processing part for excluding portion independent from pattern 614, an amplitude correcting part 615, and a discharge timing correcting part 616. The pre-printing preprocessing part 611 provides preprocessing to output voltage data obtained before forming the test pattern and after forming the uniform pattern. The post-printing preprocessing part 612 provides preprocessing to the output voltage data obtained after forming the uniform pattern and the test pattern. The synchronous processing part 613 synchronizes (aligning positions) the output voltage data obtained before forming the test pattern and after forming the uniform pattern with the output voltage data obtained after forming the uniform pattern and test pattern. The processing part for excluding portion independent from pattern 614 subtracts Vp (described later) from the output voltage data. The amplitude correcting part 615 generates data to be calculated z by performing an amplitude correcting process. The discharge timing correcting part 616 corrects timings of discharging droplets based on shift amounts of impact positions of droplets which are obtained from the edge positions of the test pattern.

[Signal Correction]

Figure 22A:
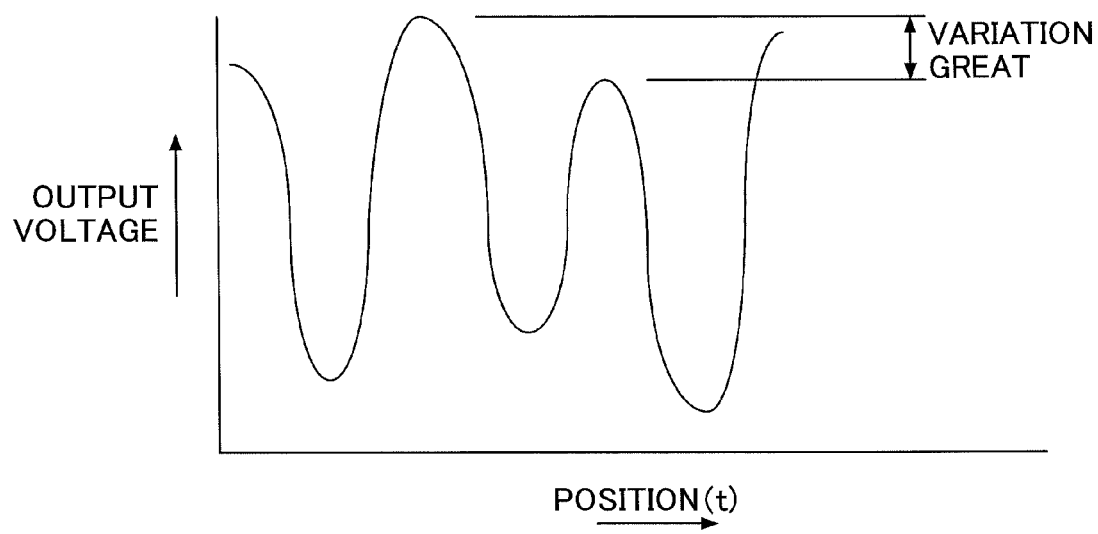
FIGS. 22A and 22B illustrate signal corrections.
Figure 22B:
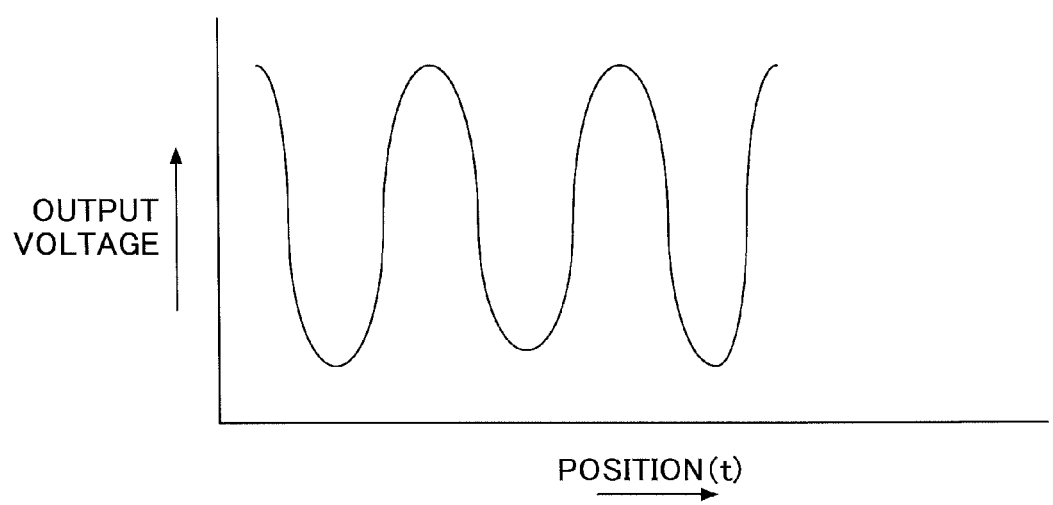

FIG. 22A illustrates an exemplary output voltage from the light receiving element before correction. FIG. 22B illustrates an exemplary output voltage from the light receiving element after amplitude correction.

The waveform of the output voltage in FIG. 22A may be obtained when the light receiving element reads the test pattern printed on a sheet material having high transmittance such as a tracing paper. Even if the uniform pattern is formed, there may be a case where the output voltage varies. In this case, as illustrated in FIG. 22A, local maximum values (on the uniform pattern or the sheet material) and local minimum values (on the line of the test pattern) are unevenly aligned and greatly vary.

Referring to FIG. 22B, a part of a waveform of an output voltage after a processing for excluding portion independent from pattern 614 and an amplitude correcting process 615. By the signal correction of the first embodiment, a voltage output regardless of existence or non-existence of the pattern can be excluded. Therefore, stable output data in which variation of the local maximum and minimum values are reduced are obtainable. Therefore, the shift amounts of the impact positions of droplets can be highly accurately predicted (calculated) and corrected.

The signal corrections of the second embodiment include two corrections of: the processing for excluding portion independent from pattern 614, and the amplitude correcting process 615.

Preprocessing is required for this signal correction. Therefore, the procedure is as follows.

(1) The preprocessing
(2) The signal correction
   (2-1) The processing for excluding portion independent from pattern
   (2-2) The amplitude correcting process <The Preprocessing>

A description is given below of the preprocessing. The preprocessing can be divided into a preprocessing A and a preprocessing B. The preprocessing A includes the following processes for the output voltage data from the sheet material on which the uniform pattern is formed and the test pattern which is not formed yet.

The Preprocessing A
(i) n times scanning
(ii) synchronous processing
(iii) averaging
(iv) filtering The preprocessing B includes the following processes for the output voltage data after forming uniform pattern and the test pattern on the sheet material.

The preprocessing B
(i) n times scanning
(ii) synchronous processing
(iii) averaging <The Preprocessing A>

The Preprocessing A-(i)

FIG. 23A illustrates an exemplary n times scanning measurement result of the preprocessing A-(i). Before the n times scanning, the pre-ink coating part 51 prints the uniform pattern. Before the n times scanning, the n times scanning part performs sensor calibration for the sheet material (ex. plain paper, or tracing paper). The n times scanning part requests the CPU 301 to make the output voltage of the reflected light detected by the light receiving element and finally converted by the A/D conversion circuit 523 be a predetermined value. The CPU 301 performs feedback control so that the output voltage resides in a predetermined range. For example, if the output voltage is greater than 4.4 [V], the light quantity from the light emission control part 511 is reduced. If the output voltage is less than 4.0 [V], the light quantity from the light emission control part 511 is increased. Referring to FIG. 23A and FIG. 23B, the output voltages are controlled to reside within a range of 4.0 to 4.4 [V]. Further, it is possible to perform sensor calibration by PI control or PID control of which target value is set to be 4.0 to 4.4 V.

The output voltage is from the region without the test pattern. The n times scanning part obtains output voltage data up to n amount as illustrated in FIG. 23A and FIG. 23B.

The Preprocessing A-(ii)

FIG. 24 illustrates exemplary synchronous processing of the preprocessing A-(ii). The averaging part calculates an average of the output voltage data up to n amount, which are obtained by the n times scanning part. The output voltage data can be detected even if the spotting light scans a part other than the sheet material. However, the output voltage obtained only from the sheet material 150 is necessary in the preprocessing A-(ii). Therefore, the synchronizing part aligns the starting point of the output voltage data obtained n times at a paper end of the sheet material.

Since the output voltage data obtained n times are started from the paper end, the synchronizing part detects a point where the output voltage data first exceeds a threshold value as the paper ends of the sheet material 150. The output voltage data to be averaged are adopted after the output voltage exceeds the threshold value (the output voltage data having an output voltage exceeding the threshold is the first data to be averaged). When the target value of the sensor calibration is 4.0 [V], the threshold value is about 3.5 to 3.9 [V], slightly smaller than the target value.

Besides this synchronization process, the output voltage data may be stored in association with positional information in the main scanning direction detected by the encoder sensor 42, and the positional information may be kept synchronous with the output voltage data obtained n times.

The Preprocessing A-(iii)

Next, the output voltage data obtained n times have reference positions (zero on the abscissa) in the scanning direction. The reference position is at the paper end of the sheet material 150. This position is that of the carriage 5 detected by the encoder sensor. However, this position may correspond to the center position of the spotting light in one-by-one relationship. Therefore, hereinbelow, this position is described as the center position of the spotting light. Said differently, the averaging part calculates the average of the output voltage data up to n amount for each of the center positions.

The Preprocessing A-(iv)

Figure 25:
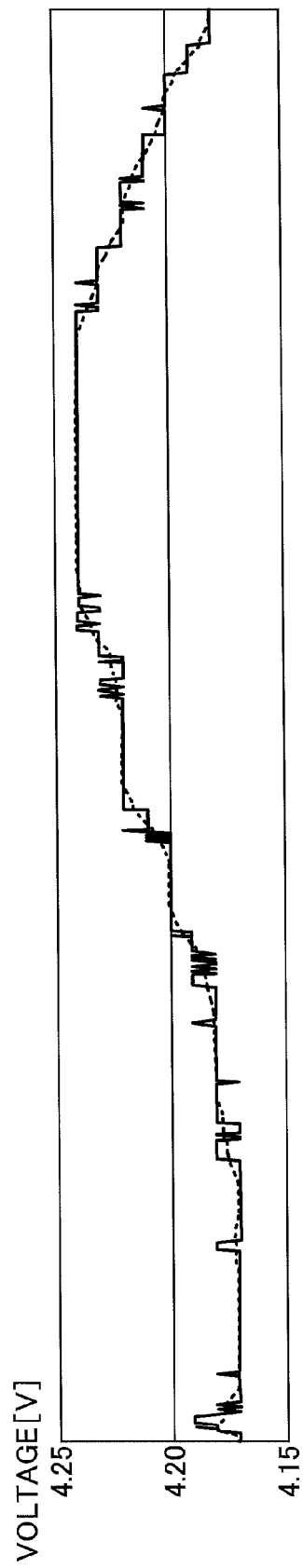
FIG. 25 illustrates a filtering process.

FIG. 25 illustrates a filtering process. The filtering part filters the average values of the output voltage data for each of the center positions. Specifically, the output voltage data up to m amount positioned before and after the output voltage data concerned by a user are extracted. The number of the extracted output voltage data includes the output voltage data concerned by a user. The extracted output voltage data up to m amount are averaged. Thus, measurement noise can be reduced and shifts of the output voltage data which cannot synchronize in the synchronous processing may be decreased.

Referring to FIG. 25, a solid line indicates the waveform before filtering and a dot line indicates the waveform after filtering. It is observed that the output voltage data before filtering have step-like portions due to resolution if the A/D conversion circuit 523, and the output voltage data after filtering are smoothed.

<The Preprocessing B>

The Preprocessing B-(i)

Figure 26A:
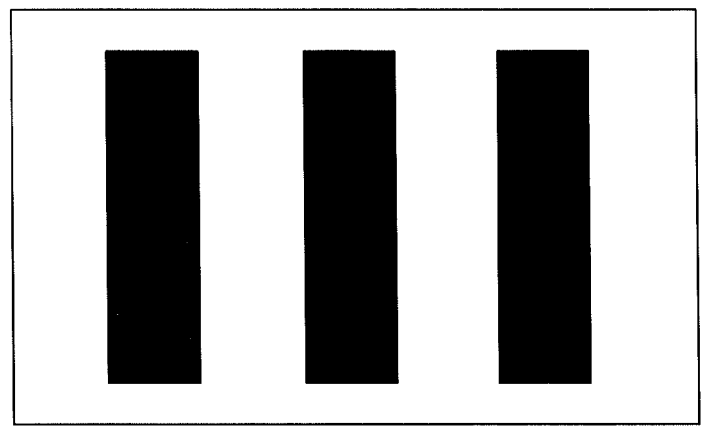
FIGS. 26A and 26B illustrate n times scanning.
Figure 26B:
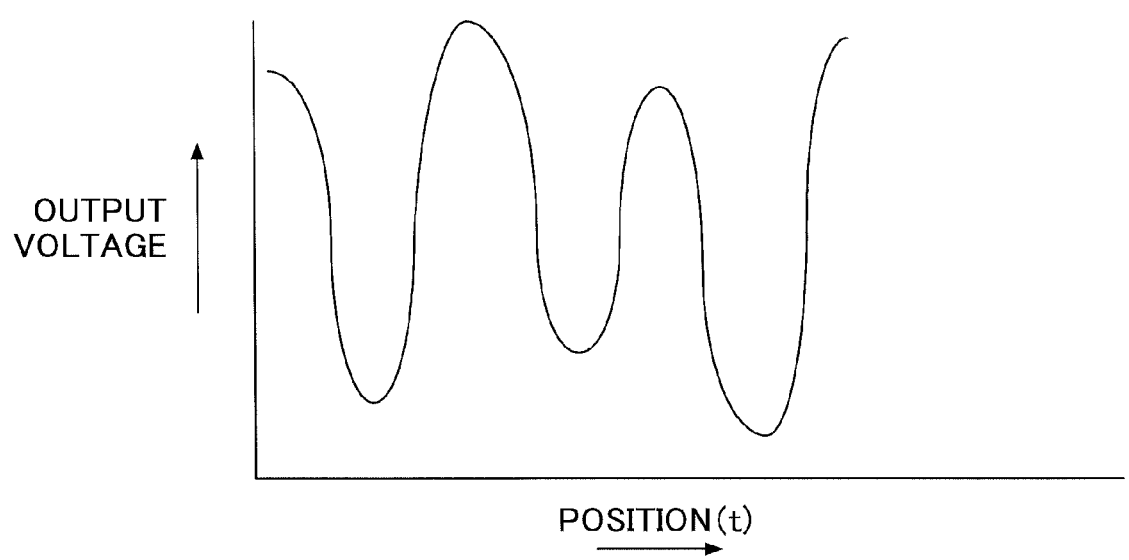

FIGS. 26A and 26B illustrate an exemplary n times scanning of the preprocessing B-(i). Referring to FIG. 26A, the test pattern is formed on the sheet material which had undergone the n times scanning in the preprocessing A-(i). FIG. 26B illustrates a waveform of output voltage data from the light receiving element obtained at a time of receiving light reflected by the sheet material having the test pattern. The n times scanning part obtains these data n times.

The Preprocessing B-(ii)

Figure 27:
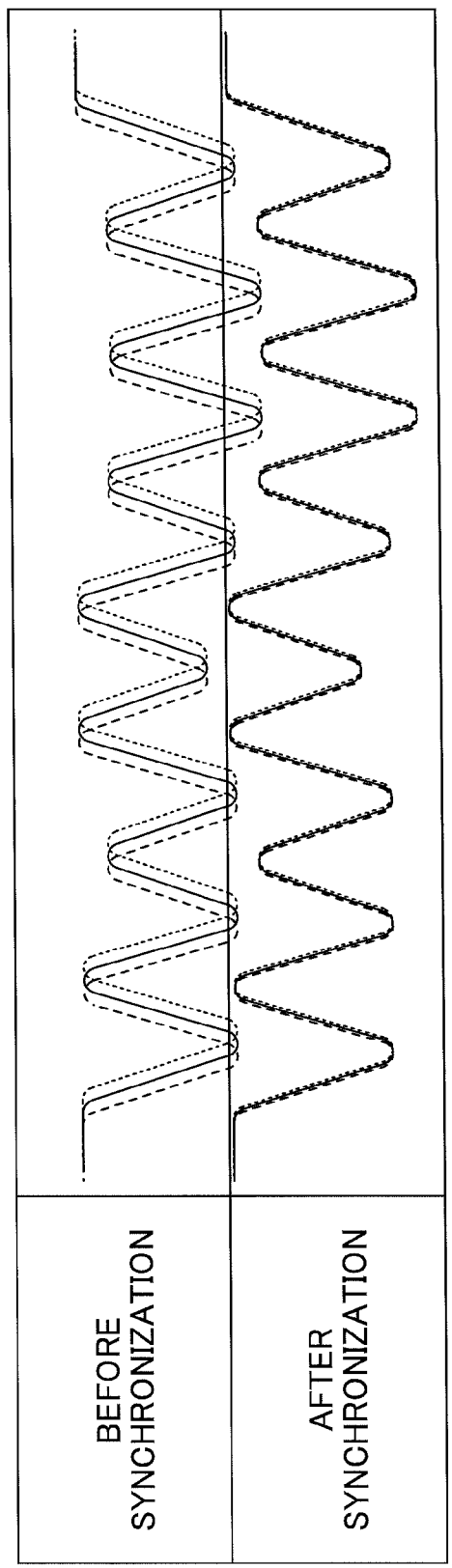
FIG. 27 illustrates exemplary synchronous processing.

FIG. 27 illustrates exemplary synchronous processing. The upper half of FIG. 27 schematically illustrates the output voltage data before the synchronization. The lower half of FIG. 27 schematically illustrates the output voltage data after the synchronization. Unlike the case without the test data, the edge positions are properly aligned in the case with the test data by causing the local maximum and minimum values of the n times output voltage data to substantially coincide. There are several processes for causing the local maximum and minimum values of the n times output voltage data in the waveforms to substantially coincide. In this, it is difficult to cause the local maximum and minimum values of the n times output voltage data to completely coincide.

A relatively easy process is to align the starting point of the output voltage data up to n amount at the paper end of the sheet material 150, in a manner similar to the preprocessing A-(ii). If the test pattern is formed at the corresponding position relative to the paper end, the local maximum and minimum values of the plural output voltage data can be arranged at the same position.

The output voltage data may be stored in association with positional information in the main scanning direction detected by the encoder sensor 42, and the positional information may be kept synchronous with the output voltage data up to n amount, in a manner similar to the preprocessing A-(ii).

Further, the synchronizing part may determine the position of the output data up to n amount to minimize shifts of the output voltage data up to n amount while changing the positions of the output voltage data up to n amount.

The Preprocessing B-(iii)

The averaging part calculates the average of the synchronized output voltage data up to n amount. The output voltage data up to n amount exists respectively at different positions. The averaging part calculates the average value of the output voltage data up to n amount for each center position.

<Signal Correction>

Before correcting the signal, the synchronous processing part 613 performs synchronous processing. The synchronous processing part 613 aligns a paper end for the output voltage data before printing a test pattern provided with the preprocessings A-(i) to A-(ii) with a paper end for the output voltage data after printing the test pattern provided with the preprocessings B-(i) to B-(iii).

The alignment is similar to the preprocessing A-(ii). A point where the output voltage data first exceeds the threshold value is treated as the first data. Hereinafter, the output voltage data before printing the test pattern is referred to as measured white paper data Vsg2, and the output voltage data after printing the test pattern is referred to as the output voltage data before printing the test pattern is referred to as measured white pattern data Vsg1. If these data are not distinguished, data are referred to as output voltage data Vsg.

A description is given below of the signal correction.

(2-1) Processing for Excluding Portion Independent from Pattern

The processing for excluding portion independent from pattern performs to reduce an output voltage generated at a part where the test pattern is formed using the output voltage data Vsg. Referring to FIG. 28, an output voltage Vp is generated by reflected light which has not sufficiently been absorbed by the lines of the test pattern, aerial diffused light, and dark current in the light receiving element 403. The values of the output voltage Vp included in the measured white pattern data Vsg1 and measured white paper data Vsg2 are in the same level.

Therefore, in the processing for excluding portion independent from pattern, Vsg-Vp is calculated and used. Thus, the influences of the reflected light which has not sufficiently been absorbed by the lines of the test pattern, the aerial diffused light, and dark current in the light receiving element 403, or the like can be excluded. The reflected light which has not sufficiently been absorbed by the lines of the test pattern may include light reflected by the platen 40 via the sheet material.

FIG. 28 illustrates Vsg and Vp. As described, Vp is substantially constant regardless of existence or nonexistence of the test pattern. However, it is difficult to accurately obtain Vp. Then, a local minimum value of the output voltage Vsg at a time that the spotting light scans the test pattern is determined as Vp. Therefore, the processing part for excluding portion independent from pattern 614 sequentially searches for the measured pattern data and takes all local minimum values out. Specifically, when the measured pattern data in the paper end becomes lower than a threshold value, the threshold value is replaced by this measured value. The replaced threshold value is used for the comparison, and the finally replaced smallest measured pattern data are determined as Vp. This process is repeated for each local minimum value. It is not always necessary to adopt the smallest local minimum value. For example, an average value, a center value or the greatest local minimum value may be determined as Vp.

The processing part for excluding portion independent from pattern 614 calculates the followings.
Measured white paper data Vsg2-Vp
Measured pattern data Vsg1-Vp FIG. 29A illustrates an exemplary output waveform of the measured pattern data. FIG. 29B illustrates an exemplary output waveform obtained by subtracting Vp from the measured pattern data. Referring to FIG. 29A and FIG. 29B, the measured pattern data are reduced by about 1 [V] in FIG. 29B in comparison with the waveform of FIG. 29A due to the processing for excluding portion independent from pattern 614.

FIG. 29C illustrates an exemplary output waveform of the measured white paper data. FIG. 29D illustrates an exemplary output waveform obtained by subtracting Vp from the measured white paper data. Referring to FIG. 29C and FIG. 29D, the measured white paper data are reduced by about 1 [V] in FIG. 29D in comparison with the waveform of FIG. 29C due to the processing for excluding portion independent from pattern 614.

Regardless of the color of the test pattern, when Vp is subtracted from the measured pattern data, the output voltage to be output independent of the pattern can be cancelled. Thus, Vp can be determined regardless of the color of the test pattern.

Hereinafter, the measured white paper data x' and the measured pattern data y' are defined as follows.
Measured white paper data x'=Measured white paper data Vsg1-Vp
Measured pattern data y'=Measured pattern data Vsg2-Vp (2-2) Amplitude Correcting Process An idea of obtaining data to be calculated for z is explained. Even if the uniform pattern is formed on the sheet material 150, reflected light and reflectance of this sheet material 150 may vary depending on properties such as transmittance and a crystalline structure. The reflectance may vary when an optical axis is shifted because the sheet material 150 has unevenness or the gradient of the platen supporting the sheet material is not constant. The degree of the variation of the reflectance depends on directivity of the sheet material 150.

Further, the reflectance related to the position of the spotting light scanning the sheet material 150 may vary when a distance between the light receiving element and the sheet material 150 is not constant, inaccuracy in a holding mechanism for holding a platen, vibration caused by various events, variation in a power source, or mismatching in an overall control of the image forming apparatus 100.

Even though there are many factors of the variation of the reflectance, the variation of the reflectance may be expressed by a function of a position or a time. The variation of the reflectance is referred to as a background variation.

For easiness, the following example is used to explain the function of the position or the time.
  A function of the time is selected out of the function of the position and the function of the time.
  The background variation is the function of the time Kbg.
  A media to be printed is a white paper.
  The variation to be detected by the light receiving element is an ink position discharged on paper.
  In consideration of maintaining essential figures and convenience in calculations, proper coefficients are adopted as the maximum voltage Vmax.
  A value measured by a sensor is a voltage value V.

First, it is analyzed by inventors how ink pigment absorbs light as follows. A photon impinging on the ink is absorbed when the energy of the photon is lower than an energy condition inherent in the pigment. This can be understood from the principles in which light energy is proportional to frequency of light and color of visible light changes depending on the frequency of light. It is possible to change the energy condition of the pigment by applying energy from the outside. Industrially, the energy condition of the pigment is assumed to be constant as long as the energy condition is not intentionally controlled.

In a case where the energy condition is constant, the energy condition may be assumed to be the probability for the pigment of taking light inside the pigment. A predetermined constant value of the probability is designated as Ki which is smaller than 1 (Ki<1). Then, a probability of causing reflected light is expressed by (1-Ki). A part of the light which reflects is not recovered. For example, if Ki is 0.3, the part of the light equal to 0.7 parts of the light is not recovered.

Within the embodiment, the light receiving element detects variations of the reflected light ratios (1-Ki) which are different relative to the positions of the spotting light. For the quantification of the reflected light ratio (1-Ki), it is preferable that a function of the position (1-Ki) is proportional to a measured voltage V.

Said differently, if the measured voltage V is expressed as V∝(1-Ki), the measured voltage is proportional to the reflected light ratio.

However, because there actually is a background variation, it becomes V∝Kbg×(1-Ki).

If the variation to be processed (1-Ki) (i.e., the reflected light ratio) is designated by Z, V∝Kbg×Z⇔Z∝(1/Kbg)×V. When Vmax is appropriately determined, it becomes $$Z = (Vmax/Kbg) \times V \quad (1)$$

The formula (1) represents that if the time function Kbg and V are the same time function, the measured voltage including the background variation can be corrected as if there is no background function.

However, the property of Kbg prevents Kbg and V from being simultaneously measured. Therefore, Kbg and V are separately measured and the time axis is aligned for Kbg and V. Thus, Kbg and V at the same position can be measured. This process corresponds to synchronous processing of a signal correction process.

The variables in the formula (1) correspond to the symbols described in the embodiments as follows:

Kbg=y'
V=x'
Z=Vsg=z
Vmax=the maximum value of Vsg (e.g., 4V)=Vmax-Vp

Practically, Z is data to be finally calculated. Therefore, Z does not coincide with the actual measured Vsg. However, the data obtained instead of Vsg are Z, therefore it becomes "Z=Vsg" and "Z=z". Further, since Vmax can be appropriately determined, z is used as the maximum value of Vsg. Said differently, an ideal amplitude of Vsg. Since Vp is included in Vmax, it is replaced such that Vmax=Vmax-Vp. The formula (1) is rewritten as follows.

$$z = Vmax \times x'/y' \quad (2)$$

FIGS. 30A and 30B schematically illustrate data z subjected to operations obtained from x' and y'. Referring to FIG. 30A, x' and y' are illustrated. Referring to FIG. 30B, data to be calculated z and Vmax are illustrated.

Using the formula (2), the part of x'/y' can cancel the background variation contained in Vmax and z. Further, when the spotting light impinges on a part without the test pattern, x' becomes equal to y'. When the spotting light impinges on the test pattern, x' becomes substantially zero. Therefore, it is assumed x'/y' represents a ratio of x' having variation at a certain position contained in y'. Said differently, x'/y' is a ratio between measured white paper data and the measured pattern data when the background variation is removed.

Therefore, by multiplying x'/y' by Vmax, the background variation is removed. Then, the data to be calculated z having the constant amplitude, which has a local minimum value on the test pattern and a local maximum value on the part without the test pattern is obtainable.

Based on the above description, the amplitude correcting part 615 calculates as in the formula (2). Since x' and y' are already obtained, Vmax can be obtained by subtracting Vp from a predetermined fixed value such as 4 [V]. Therefore, the amplitude correcting part 615 can obtain the data to be calculated z having the constant amplitude as illustrated in FIG. 30B. Thereafter, the discharge timing correcting part 616 can determine the intersection points C1 and C2 at the edge positions.

It is unnecessary that the fixed value is an average value or a center value of Vsg2 related to the local maximum value. Vsg2 obtained by n times scanning performed by the pre-printing preprocessing part 611 before forming the test pattern becomes the maximum value of the output voltage after forming the test pattern. Therefore, Vsg2 is assumed to be the fixed value Vmax.

[Operation Procedure]

Figure 31:
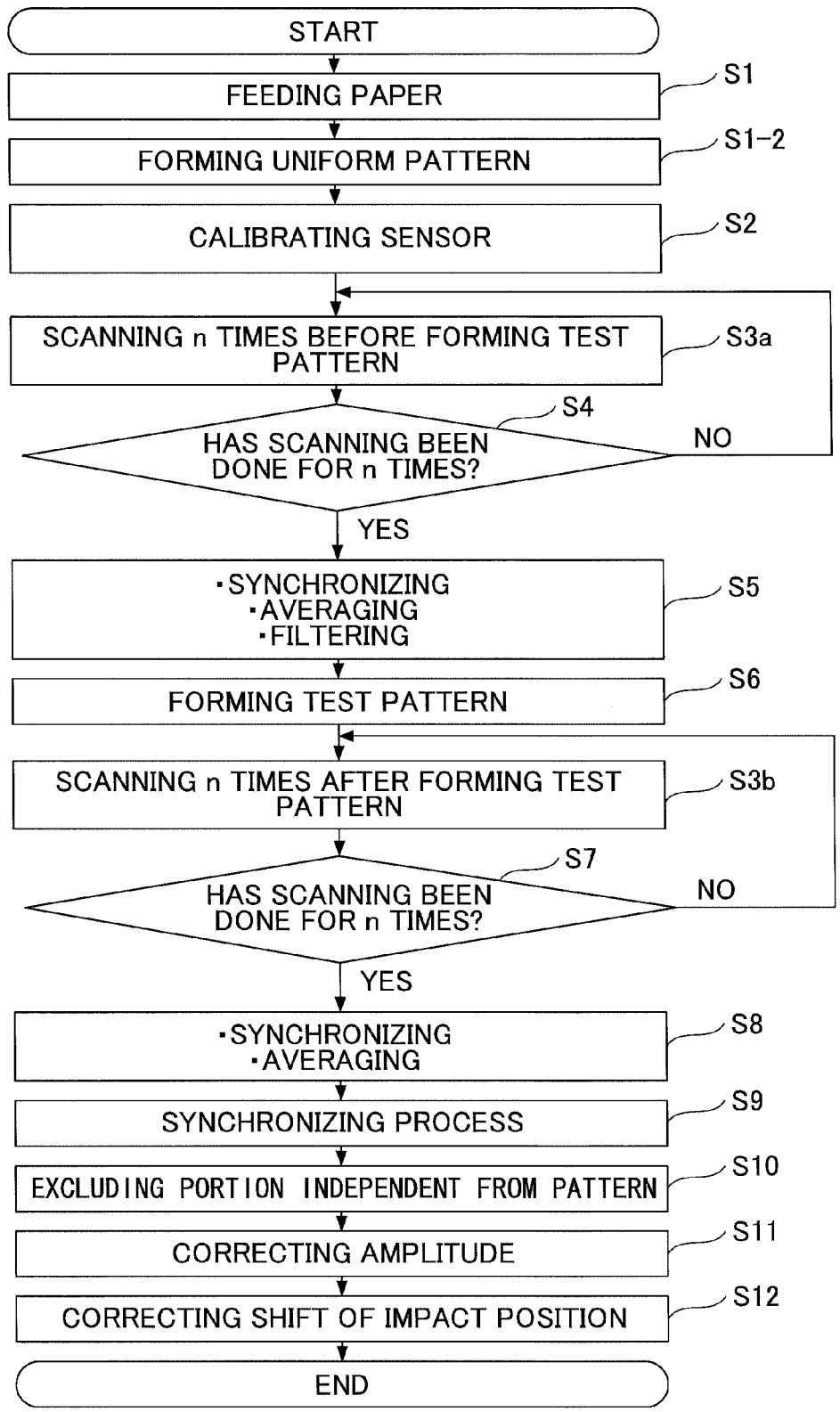
FIG. 31 is a flow chart illustrating an exemplary procedure of correcting a signal by a correction performing unit.

FIG. 31 is a flow chart illustrating an exemplary procedure of correcting a signal by the correction performing unit 526.

First, the CPU 301 instructs the main control unit 310 to start correcting impact positions of droplets. Upon the instruction, the main control unit 310 drives the sub scanning motor 132 via the sub scanning drive part 314 to feed the sheet material 150 immediately below the recording head 21 in step S1.

Next, the main control unit 310 drives the main scanning motor 8 via the main scanning drive part 313 to move the carriage 5 over the sheet material 150. The pre-ink coating part 51 discharges ink having low transmittance from the recording heads 180 installed in the carriage to form a solidly provided uniform pattern on a record medium in step S1-2.

Figure 32A:
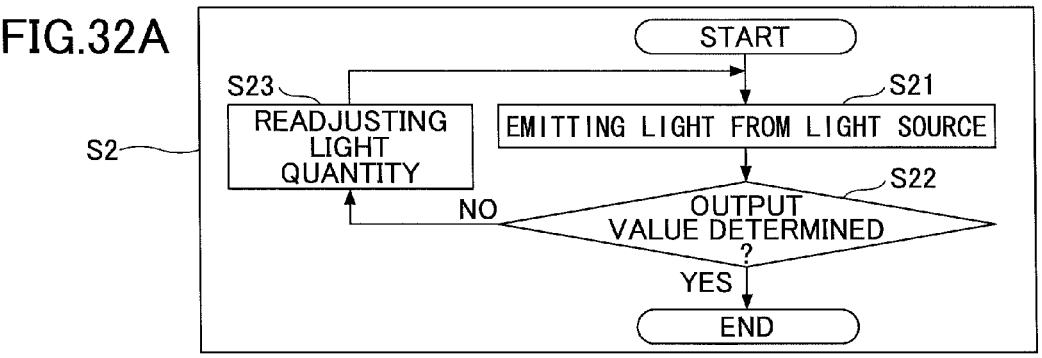
FIGS. 32A to 32D are exemplary flowcharts for explaining processes in the correction performing unit.

Next, the main control unit 310 drives the main scanning motor 8 via the main scanning drive part 313 to move the carriage 5 over the sheet material 150, and calibrates the light emitting element 402 and the light receiving element 403 at specific positions on the sheet material 150 in step S2. Although the sensor calibration is performed as illustrated in FIG. 32A, the sensor calibration is performed in a manner similar to that in the first embodiment, and description is omitted.

Figure 32B:
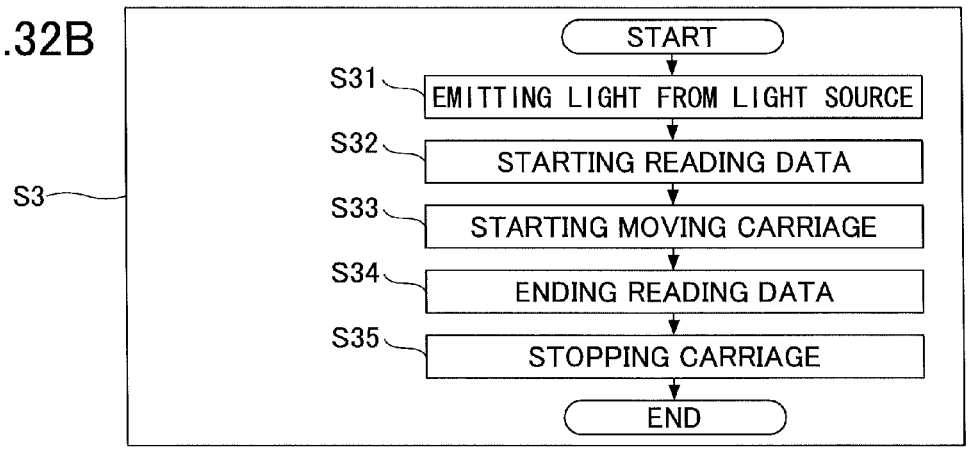

Next, the n times scanning part of the pre-printing preprocessing part 611 moves the carriage 5 to a home position, performs n times scanning for the sheet material before forming the test pattern, and stores output voltage data up to n amount in the shared memory 525 in step S3a. Although the n times scanning is performed as illustrated in FIG. 32B, the n times scanning is performed in a manner similar to that in the first embodiment, and description is omitted.

The CPU 301 confirms whether the output voltage data are read by n times. If the output voltage data are read n times, the process goes to step S5. If the output voltage data are not read n times, the process returns to step S3a to read the output voltage data again in step S4.

Figure 32C:
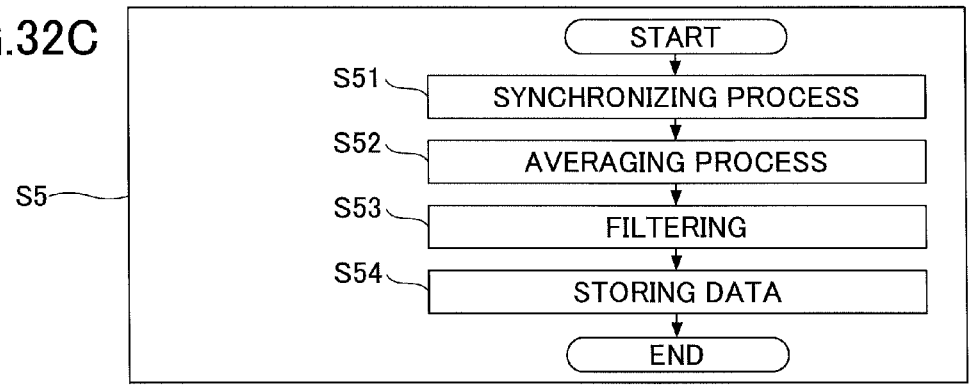

Next, the pre-printing preprocessing part 611 reads out the output voltage data before forming the test pattern stored in the shared memory and performs the preprocessing. The data obtained by the preprocessing are stored in the RAM 303 in step S5. Although the preprocessing is performed as illustrated in FIG. 32C, the preprocessing is performed in a manner similar to that in the first embodiment, and description is omitted.

Next, the test pattern forming part 52 moves the carriage 5 via the main scanning motor 8, and simultaneously drives the recording heads 21 to 24 via the head drive control part 312 thereby forming the test pattern in step S6.

Next, the n times scanning part of the pre-printing preprocessing part 612 moves the carriage 5 to the home position, performs n times scanning for the sheet material after forming the test pattern, and stores output voltage data up to n amount in the shared memory 525 in step S3b. Although the n times scanning is performed as illustrated in FIG. 32B, the n times scanning is performed in a manner similar to that in the first embodiment, and description is omitted.

The CPU 301 confirms whether the output voltage data are read by n times. If the output voltage data are read n times, the process goes to step S8. If the output voltage data are not read n times, the process returns to step S3b to read the output voltage data again in step S7.

Figure 32D:
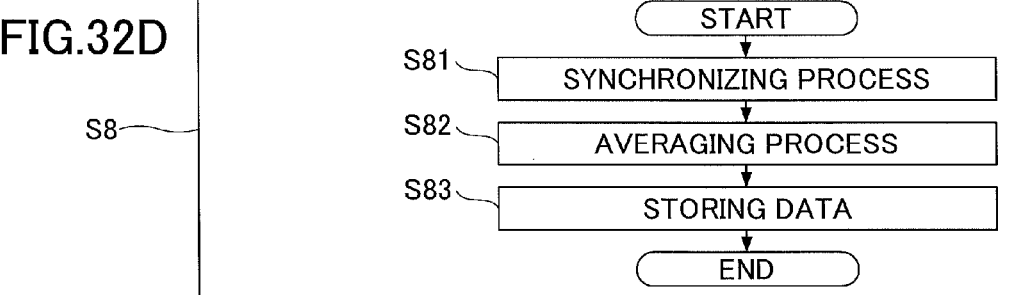

Next, the pre-printing preprocessing part 612 reads out the output voltage data before forming the test pattern stored in the shared memory 525 and performs the preprocessing. The data obtained by the preprocessing are stored in the RAM 303 in step S8. Although the preprocessing is performed as illustrated in FIG. 32D, the preprocessing is performed in a manner similar to that in the first embodiment, and description is omitted.

Next, the synchronous processing part 613 reads the measured white paper data and the measured pattern data, provided with preprocessing, from the RAM 303, and performs position alignment by a synchronizing process in step S9.

Next, the processing part for excluding portion independent from pattern 614 obtains Vp from the local minimum value of the measured pattern data, and subtracts Vp from the measured white paper data and the measured pattern data in step S10.

Next, the amplitude correcting part 615 uses the formula (2) to perform the amplitude correcting process thereby generating the data to be calculated z in step S11. With this, output voltage data in which inflexion points are arranged inside a threshold region is obtainable. The discharge timing correcting part 616 detects the edge positions by the data to be calculated z and corrects the shifts of the impact positions of droplets in step S12. The discharge timing correcting part 616 obtains the intersection points C1 and C2 from the lower limit threshold value Vrd and the upper limit threshold value Vru. The middle point between the intersection points C1 and C2 is the position of the line forming the test pattern. The discharge timing correcting part 616 compares the distance between the lines with a predetermined distance and calculates the shift amount of the impact position. The discharge timing correcting part 616 calculates the correction amount of the timing of discharging droplets at a time of driving the recording head 21 used in driving the recording head 21 to cancel the shift of the impact position.

As described, the image forming apparatus 100 of the second embodiment forms the uniform pattern and corrects the amplitude of the output voltage so as to be substantially constant by restricting the variation of the output voltage. With this, the position of the inflexion point can be aligned inside the threshold region to thereby enable accurately obtaining the edge position and accurately correcting the shifts of the impact positions of droplets.

Third Embodiment

Within the third embodiment, the processing for excluding portion independent from pattern and the amplitude correcting process described in the first and second embodiments are performed by an image forming system including a server instead of the image forming apparatus.

Figure 33:
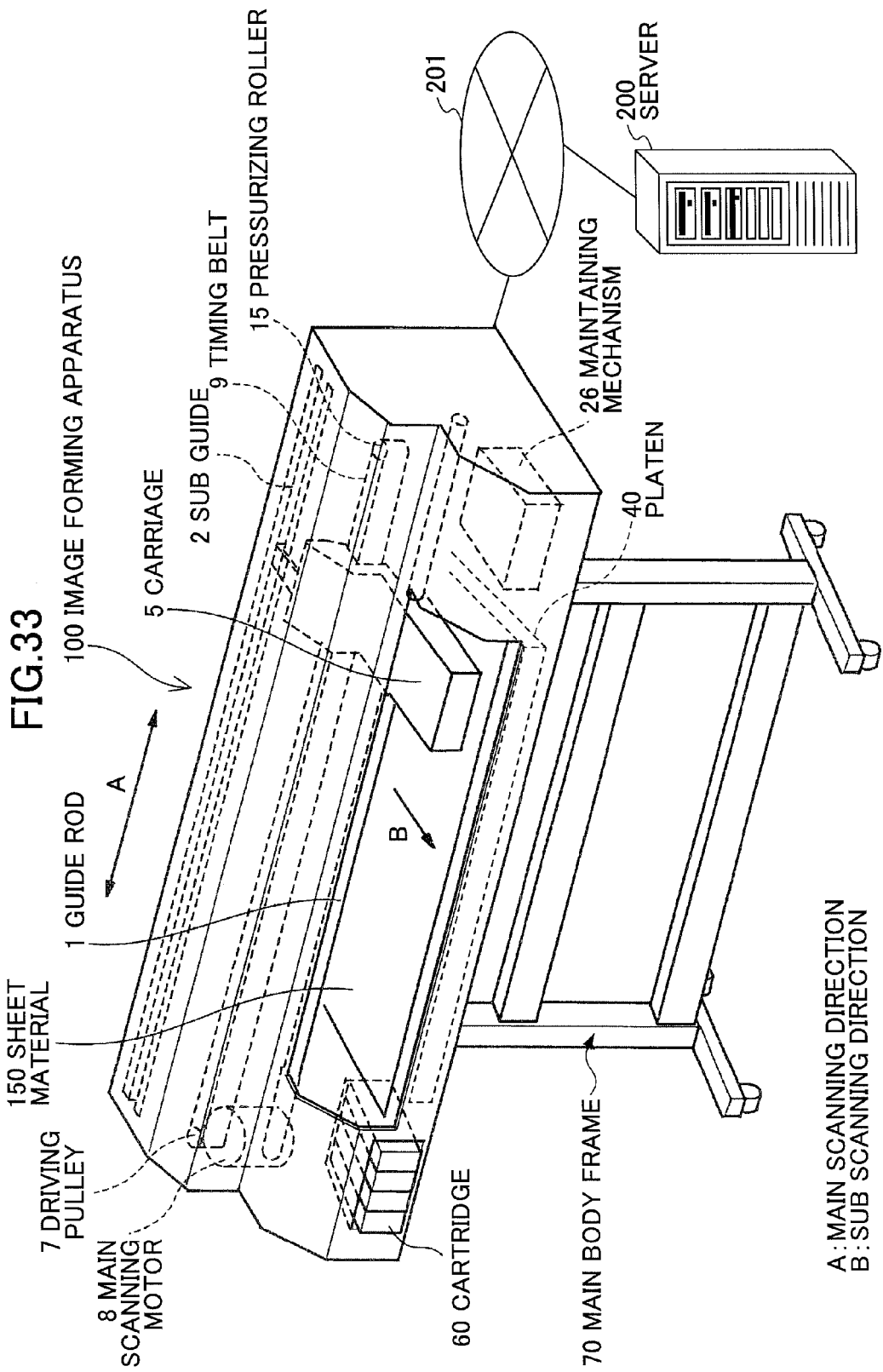
FIG. 33 schematically illustrates an image forming system including an image forming apparatus and a server.

FIG. 33 schematically illustrates an image forming system including an image forming apparatus 100 and a server 200. Referring to FIG. 33, the same reference symbols are attached to the same portions as those in FIG. 3, and description of these portions is omitted. The image forming apparatus 100 is connected to the server 200 via a network 201. The network 201 may be a LAN in one company, a WAN including connected LANs, the internet, or a combination of these. The image forming apparatus 100 may be directly connected to the server 200 instead of or in addition to the connection with the network 201.

Referring to the image forming system 500 of FIG. 33, the image forming apparatus 100 forms the test pattern and scans the test pattern by the print position shift sensor, and the server 200 calculates a correction value of the timing of discharging droplets. Therefore, a processing load of the image forming apparatus 100 can be reduced. Further, calculating functions of the correction values for the timings of discharging droplets can be gathered in the server 200.

Figure 34:
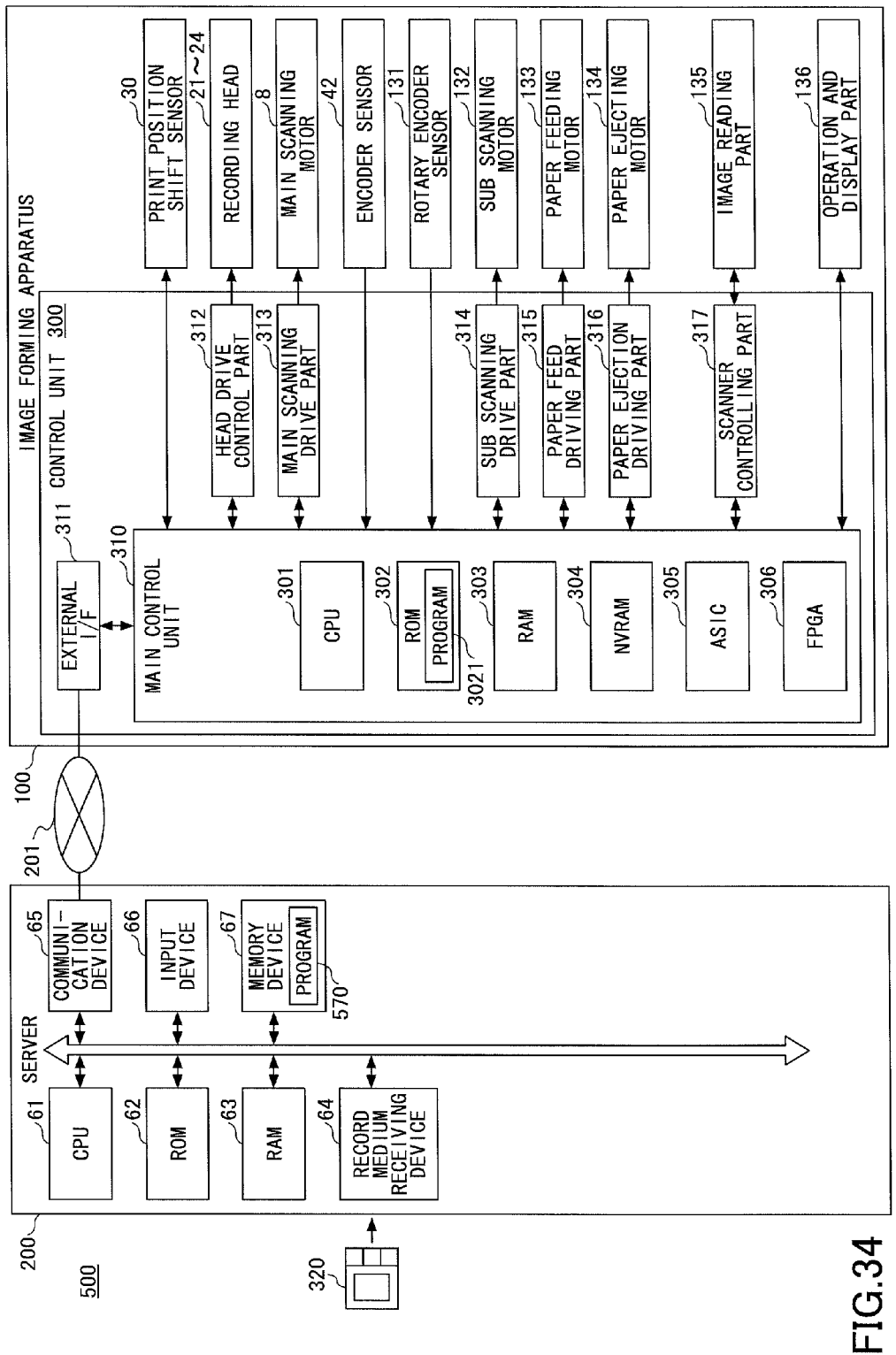
FIG. 34 illustrates an exemplary hardware structure of a server and an image forming apparatus.

FIG. 34 illustrates an exemplary hardware structure of the server 200 and the image forming apparatus 100. The server 200 includes a CPU 61, a ROM 62, a RAM 63, a record medium receiving device 64, a communication device 65, an input device 66, and a memory device 67, which are mutually connected by a bus. The CPU 61 reads an operating system (OS) and a program 570 from the memory device 67 and uses the RAM 63 as a working memory. The program 570 is used to calculate the correction values of the timings of discharging droplets.

The RAM is a working memory (a main memory) for temporarily storing necessary data. The ROM 62 stores BIOS, initial setup data, a bootstrap loader, or the like. The record medium receiving device 64 is an interface for installing a mobile recording medium 320.

The communication device 65 may be a LAN card or an Ethernet card ("Ethernet" is a registered trademark). The server 200 is connected to the network 201 via the communication device 65 so as to communicate with an external I/F of the image forming apparatus 100. An IP address or a domain name of the server 200 is registered in the image forming apparatus 100.

The input device 66 such as a keyboard and a mouse is a user interface for receiving various operation instructions of a user. The input device 66 may be a touch panel or an input device.

The memory device 67 is a non-volatile memory such as a Hard Disk Drive (HDD) and a flash memory, which stores the OS, the program or the like. The program 570 is delivered by the recording medium 320 or downloaded from the server 200.

FIG. 35 is an exemplary functional block diagram of the image forming system 500. The image forming apparatus 100 includes only the correction performing unit 526 and the test pattern forming part 52. The correction performing unit 526 includes the n times scanning part before printing and the n times scanning part after printing. The other functions are included in the server. The function on the server side is referred to as a correction process calculating unit 620. The pattern storing part 54 may be provided in the server 200 or another server (not illustrated). The image forming apparatus 100 may download the pattern from the server 200.

The correction process calculating unit 620 includes a pre-printing preprocessing part 611 including a pre-printing synchronizing part, a pre-printing averaging part, and a pre-printing filtering part, a post-printing preprocessing part 612 including a post-printing synchronizing part, a post-printing averaging part, a post-printing synchronous processing part 613, a processing part for excluding portion independent from pattern 614, an amplitude correcting part 615, a discharge timing correcting part 616, and a pattern storing part 54. The functions of these blocks are similar to those in the second embodiment, and description of these blocks is omitted. The server 200 needs not to have these functions and a part of the functions may be left on the image forming apparatus 100.

In the image forming system 500, the n times scanning part on the side of the image forming apparatus 100 transmits data up to n amount before printing and data up to n amount after printing to the server 200. The correction process calculating unit 620 on the server side performs the processing for excluding portion independent from pattern 614 and the amplitude correcting process 615 thereby calculating the correction values of the timings of discharging droplets. Because the server 200 transmits the correction values of the timings of discharging droplets to the image forming apparatus 100, the head drive control part 312 can change a discharging timing.

FIG. 36 is an exemplary flow chart illustrating an operation procedure of the image forming system 500. As illustrated in FIG. 36, the server performs the steps S5 and S8 to S11 in FIG. 24, the other processes for the n times scanning before and after printing are performed by the image forming apparatus 100.

Because the image forming apparatus 100 communicates with the server 200, the image forming apparatus 100 performs a process of transmitting a result of the n times scanning before printing in step S4-1, and a result of the n times scanning after printing in step S7-1. Further, the image forming apparatus 100 performs a process of receiving the correction values of the timings of discharging droplets in step S7-2.

Meanwhile, the server 200 performs a process of transmitting the correction values of the timings of discharging droplets to the image forming apparatus 100 in step S13 after step S12.

As described, the processes are distributed to different apparatuses. Thus, the image forming system 500 can restrict the influence received from the property of the sheet material 150 in a manner similar to those of the first and second embodiments, thereby highly accurately correcting the timings of discharging droplets.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although embodiments of the present invention has been described in detail, it should be understood that various changes, substitutions, and alterations could be made thereto without departing from the spirit and scope of the invention.

This patent application is based on Japanese Priority Patent Application No. 2011-167769 filed on Jul. 29, 2011, and Japanese Priority Patent Application No. 2012-131994 filed on Jun. 11, 2012, the entire contents of which are hereby incorporated herein by reference.

What is claimed is:

1. An image forming apparatus that reads a test pattern which includes a line and is formed on a record medium and adjusts a discharge timing of a droplet, the image forming apparatus comprising:
    a reading unit that includes
        a light emitting element for emitting light to the record medium, and
        a light receiving element for receiving reflected light reflected on the record medium;
    a print data storing unit configured to store print data of a uniform pattern which has a color different from a color of the test pattern and is to be provided in an area including the test pattern;
    a pattern forming unit configured to print the test pattern and the uniform pattern so that the test pattern contacts the uniform pattern on the record medium;
    a relatively moving unit configured to cause the record medium or the reading unit to move relative to the reading unit or the record medium;
    a first detection data obtaining unit configured to obtain first detection data received as the reflection light by the light receiving element while the light moves and impinges on the test pattern;
    a position detecting unit configured to perform a calculation for determining a position of the line in order to detect a position of the test pattern;
    a second detection data obtaining unit configured to obtain second detection data received as the reflection light by the light receiving element while the light moves and impinges on the record medium after the uniform pattern contacting the test pattern is formed and before the test pattern is formed;
    a subtracting unit configured to subtract a value substantially the same as a local minimum value of the first detection data from the first detection data and from the second detection data in order to obtain subtracted first detection data and subtracted second detection data; and
    a signal correcting unit configured to calculate a ratio between the first subtracted detection data and the second subtracted detection data in order to align local maximum values of the first detection data so as to be substantially constant.

2. The image forming apparatus according to claim 1, wherein the signal correcting unit generates test pattern position determining data for determining a test pattern position by multiplying the ratio by a predetermined voltage value, the test pattern position determining data having substantially the same amplitude.

3. The image forming apparatus according to claim 2, wherein the position detecting unit performs linear approximation to pattern position determining data included in a predetermined upper limit threshold value and a predetermined lower limit threshold value to obtain a liner line and detects an intermediate point of the linear line between the predetermined upper limit threshold value and the predetermined lower limit threshold value as a position of the test pattern.

4. The image forming apparatus according to claim 1, wherein the color of the uniform pattern causes a transmittance lower than the color of the test pattern.

5. The image forming apparatus according to claim 1, wherein the print data storing unit stores print data including the uniform pattern as a back ground and the test pattern formed on the uniform pattern,
wherein the pattern forming unit forms the uniform pattern and the test pattern temporally parallel.

6. An image forming method for an image forming apparatus that includes a reading unit including a light emitting element for emitting light to a record medium, and a light receiving element for receiving reflected light reflected on the record medium, and reads a test pattern which includes a line and is formed on the record medium by discharging a droplet and adjusting a discharge timing of the droplet, the image forming method comprising:
    printing the test pattern and a uniform pattern, which is read from a print data storing unit configured to store print data of the uniform pattern which has a color different from a color of the test pattern and is to be provided in an area including the test pattern so that the test pattern contacts the uniform pattern on the record medium;
    causing, by a relatively moving unit, the record medium or the reading unit to move relative to the reading unit or the record medium;

obtaining, by a first detection data obtaining unit, first detection data received as the reflection light by the light receiving element while the light moves and impinges on the test pattern;

performing, by a position detecting unit, a calculation for determining a position of the line in order to detect a position of the test pattern;

obtaining, by a second detection data obtaining unit, second detection data received as the reflection light by the light receiving element while the light moves and impinges on the record medium after the uniform pattern contacting the test pattern is formed and before the test pattern is formed;

subtracting, by a subtracting unit, a value substantially the same as a local minimum value of the first detection data from the first detection data and from the second detection data in order to obtain subtracted first detection data and subtracted second detection data; and calculating, by a signal correcting unit, a ratio between the first subtracted detection data and the second subtracted detection data in order to align local maximum values of the first detection data so as to be substantially constant.

7. An image forming system comprising:

a print data storing unit configured to store print data of a uniform pattern which has a color different from a color of a test pattern and is to be provided in an area including the test pattern; and an image forming apparatus discharging a droplet including a reading unit including a light emitting element for emitting light to a record medium, and a light receiving element for receiving reflected light reflected on the record medium, a pattern forming unit configured to print the test pattern and the uniform pattern so that the test pattern contacts the uniform pattern on the record medium, a relatively moving unit configured to cause the record medium or the reading unit to move relative to the reading unit or the record medium, a first detection data obtaining unit configured to obtain first detection data received as the reflection light by the light receiving element while the light moves and impinges on the test pattern, a position detecting unit configured to perform a calculation for determining a position of a line forming the test pattern in order to detect a position of the test pattern, and a second detection data obtaining unit configured to obtain second detection data received as the reflection light by the light receiving element while the light moves and impinges on the record medium after the uniform pattern contacting the test pattern is formed and before the test pattern is formed;

a subtracting unit configured to subtract a value substantially the same as a local minimum value of the first detection data from the first detection data and from the second detection data in order to obtain subtracted first detection data and subtracted second detection data; and a signal correcting unit configured to calculate a ratio between the first subtracted detection data and the second subtracted detection data in order to align local maximum values of the first detection data so as to be substantially constant.

* * * * *